(12) United States Patent
Moriwaki et al.

(10) Patent No.: US 7,317,875 B2
(45) Date of Patent: Jan. 8, 2008

(54) OPTICAL COMMUNICATION NETWORK SYSTEM, WAVELENGTH ROUTING APPARATUS, COMMUNICATION NODE, OPTICAL PATH MANAGING METHOD FOR USE IN OPTICAL CROSS CONNECT APPARATUS, AND APPARATUS FOR THAT METHOD

(75) Inventors: Osamu Moriwaki, Zama (JP); Akira Okada, Tokyo (JP); Kazuto Noguchi, Atsugi (JP); Hiromasa Tanobe, Tokyo (JP); Morito Matsuoka, Atsugi (JP); Takashi Sakamoto, Zama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 535 days.

(21) Appl. No.: 10/522,831

(22) PCT Filed: Feb. 19, 2004

(86) PCT No.: PCT/JP2004/001891

§ 371 (c)(1),
(2), (4) Date: Feb. 2, 2005

(87) PCT Pub. No.: WO2004/077716

PCT Pub. Date: Sep. 10, 2004

(65) Prior Publication Data

US 2006/0051094 A1    Mar. 9, 2006

(30) Foreign Application Priority Data

Feb. 27, 2003  (JP)  ............................. 2003-051425
Aug. 12, 2003  (JP)  ............................. 2003-292454

(51) Int. Cl.
*H04B 10/00* (2006.01)
(52) U.S. Cl. .......................................... 398/87; 398/84
(58) Field of Classification Search ............. 398/79–97
See application file for complete search history.

(56) References Cited

U.S. PATENT DOCUMENTS 5,937,117 A    8/1999  Ishida et al.

FOREIGN PATENT DOCUMENTS

JP            06-311108            11/1994

(Continued)

OTHER PUBLICATIONS

Hideaki Okayama, Takeshi Kamijoh, and Masato Kawahara, "Multi Wavelength Highway Photonic Switches Using Wavelength-Sorting Elements-Design", Journal of Lightwave Technology, vol. 15, No. 4, Apr. 1997, pp. 607 to 615.

(Continued)

*Primary Examiner*—Agustin Bello
(74) *Attorney, Agent, or Firm*—Harness, Dickey & Pierce, P.L.C.

(57) ABSTRACT

An optical communication network system and a wavelength-routing device and a communication node therefor are provided which can easily increase the optical paths between communication nodes, which are capable of expanding transmission capacity, and which excel in flexibility and expandability. An optical signal within a wavelength band ($\lambda B_m \pm \Delta \lambda_m$) which has been transmitted from a predetermined communication node (200-1 through 200-4) is subjected to wavelength-band demultiplexing of the wavelength bands by wavelength-band demultiplexers (220-1 through 220-4) of a wavelength-routing device (210), and is then subjected to wavelength-routing by arrayed-waveguide gratings (241 through 244) according to the wavelength bands, and furthermore is multiplexed with optical signals of other wavelength bands by wavelength-band multiplexers (230-1 through 230-4), and after having been outputted, is transmitted to a communication node. In this manner, by varying the wavelength band ($\lambda B_m \pm \Delta \lambda_m$) of the wavelength of the optical signal which is transmitted from the communication node, it becomes possible to establish a single optical path between the communication nodes for each wavelength band.

12 Claims, 29 Drawing Sheets

FOREIGN PATENT DOCUMENTS

| JP | 10-243424 | 9/1998 |
|---|---|---|
| JP | 3020378 | 1/2000 |
| JP | 2000-134649 | 5/2000 |
| JP | 2001-008244 A | 1/2001 |
| JP | 2002-165238 | 6/2002 |
| JP | 2002-262319 A | 9/2002 |
| JP | 2002-300137 | 10/2002 |
| JP | 2004-147035 | 5/2004 |

OTHER PUBLICATIONS

K. Noguchi, "Scalability of Full-Mesh WDM AWG-STAR Network", IEICE Transactions on Communications, vol. E86-B, No. 5, pp. 1493-1497, May 2003.

K. Kato et al., "32×32 Full-Mesh (1024 path) Wavelength Routing WDM Network Based on Uniform Loss Cyclic-Frequency Arrayed-Waveguide Grating", IEE Electron, Lett., vol. 36, No. 15, pp. 1294-1295, Jul. 2000.

K. Kato et al., "10-Tbps Full-Mesh WDM Network Based on Cyclic-Frequency Arrayed-Waveguide Grating Router", ECOC 2000, vol. 1, pp. 105-107, 2000.

Y. Sakai, "Full-Mesh Wavelength-Routing WDM Network based on Arrayed-Waveguide Grating", IEEE LEOS Annual Meeting, vol. 2, ThQ1, pp. 832-833.

Y. Sakai et al., "Management System for Full-Mesh WDM AWG-STAR Network", ECOC 2001, No. We. B. 1. 5, pp. 264-265, 2001.

K. Noguchi et al., "Scalability of Full-Mesh WDM AWG-STAR Network", OECC 2002, 10A1-2, pp. 72-73, Jul. 2002.

K. Noguchi et al., "The First Field Trial of a Wavelength Routing WDM Full-Mesh Network System (AWG-STAR) in a Metropolitan / Local Area", OFC 2003, THAA5, pp. 611-613, 2003.

H. Tanobe et al., "Demonstration of Logical-Topology Reconfiguration in Full-Mesh WDM Networks (AWG-STAR) Based on Wavelength Routing Technology", ECOC 2003, Th2.4.5, 2003, Feb. 22, 2004.

O. Moriwaki et al., "Reconfigurable Wavelength-Routed Network with N×N AWG Arranged in CWDM Bands for Bandwidth on Demand", OFC 2003, MF90.

Y. Sakai et al., "Full-Mesh WDM Network Based on Cyclic-Frequency Arrayed-Waveguide Grating", Technical Report of IEICE, OCS2000-9, pp. 47-52, 2000 (English Abstract).

Y. Sakai et al., "Full-Mesh Wavelength-Routing Network System (AWG-STAR)", Technical Report of IEICE, OCS2001-55, PS2001-26, OFT2001-31, pp. 61-66, 2001 (English Abstract).

K. Noguchi et al., "Scalability of AWG-STAR Network System", Technical Report of IEICE, OCS2001-56, PS2001-27, OFT2001-32, pp. 67-72, 2001 (English Abstract).

K. Noguchi et al., "Full-Mesh-Star Network System with Cyclic Frequency Arrayed Waveguide Grating", Technical Report of IEICE, OCS2001-80, OPE2001-84, LQE2001-78, pp. 47-52, 2001 (English Abstract).

Y. Koike et al., "Field Trial of AWG-STAR Network", Technical Report of IEICE, PS2002-52, pp. 17-22, 2002 (English Abstract).

Y. Koike et al., "A Monitoring and Control for AWG-STAR Network", Technical Report of IEICE NS2002-195, PS2002-69, pp. 53-56, 2002 (English Abstract).

H. Tanobe et al., "Logical Topology Dynamically-Reconfigurable Network with Wavelength Routing Full-Mesh AWG-STAR Technology", Technical Report of IEICE, NS2002-283, IN2002-256, pp. 133-136, 2003 (English Abstract).

K. Kato et al., "10 Tpbs Full-Mesh WDM Network Based on 32×32 Cyclic-Frequency AWG", The Institute of Electronics, Information and Communication Engineers, B-10-1000, p. 475, 2000.

K. Tanaka et al., "Wavelength Routing Experiment in WDM Star Network Using a Cyclic Arrayed-Waveguide Grating", The Institute of Electronics, Information and Communication Engineers, B-10-102, p. 477, 2000.

K. Sakai et al., "Optical Interface Board for Wavelength Division Multiplexing", The Institute of Electronics, Information and Communication Engineers, B-10-103, p. 478, 2000.

K. Noguchi et al., "Transmission Characteristics in Full-Mesh WDM Network Based on Cyblic-Frequency AWG (AWG-STAR)", The Institute of Electronics, Information and Communication Engineers, B-10-118, p. 341, 2000.

K. Sakai, et al., "A Study on Full-Mesh WDM Network Topology", The Institute of Electronics, Information and Communication Engineers, B-10-119, p. 342, 2000.

K. Noguchi et al., "AWG-STAR Network Based on Grouped Wavelength Path Routing", The Institute of Electronics, Information and Communicaiton Engineers, B-12-2, p. 442, 2002.

K. Kato et al., "Full-Mesh Network Based on Cyclic Frequency Arrayed Waveguide Grating", NTT Research and Development, vol. 49, No. 6, pp. 298-308, 2000 (English Abstract).

K. Tanaka et al., "Scalability of AWGSTAR Optical Network", NTT Research and Development, vol. 49, No. 6, pp. 318-323, 2000 (English Abstract).

Y. Sakai et al., "Optical Interface Board for Wavelength-Division Multiplexing", NTT Research and Development, vol. 49, No. 6, pp. 324-330, 2000 (English Abstract).

M. Matsuoka et al., "The Intranet Joint Experiment Using Optical Wavelength Routing Technology is Started", NTT Technical Journal, vol. 14, No. 10, pp. 50-53, 2002.

M. Matsuoka et al., "Wavelength Routing Full-Mesh Network AWG-STAR", NTT Technical Journal, vol. 14, No. 2, pp. 55-61, 2002.

News release, "NTT Develops Logical-Topology Reconfigurable WDM Network System" URL:http://www.ntt.co.jp/news/news03/0309/030917.html, Sep. 17, 2003 (Japanese version).

News release "NTT Develops Logical-Toploloy Reconfigurable WDM Network System", URL:http://www.ntt.co.jp/news/news03e/0309/030917.html, Sep. 17, 2003 (English version).

Press release "The Sale of an AWG Router Which Becomes a Key for a Next-Generation Optical Network is Started.", URL:http://www.nel.co.jp/new/information/2003_03_20/html, Mar. 20, 2003.

R. Ramaswami et al., "Optical Networks", p. 340-343, Morgan Kaufmann Publishers Inc., 1998.

International Search Report for PCT/JP2004/001891; ISA/JP; Dated: May 24, 2004.

FIG. 4

|  | FIRST OUTPUT PORT | SECOND OUTPUT PORT | THIRD OUTPUT PORT | FOURTH OUTPUT PORT |
|---|---|---|---|---|
| FIRST INPUT PORT | $\lambda 11$ | $\lambda 12$ | $\lambda 13$ | $\lambda 14$ |
| SECOND INPUT PORT | $\lambda 12$ | $\lambda 13$ | $\lambda 14$ | $\lambda 11$ |
| THIRD INPUT PORT | $\lambda 13$ | $\lambda 14$ | $\lambda 11$ | $\lambda 12$ |
| FOURTH INPUT PORT | $\lambda 14$ | $\lambda 11$ | $\lambda 12$ | $\lambda 13$ |

FIG. 5

|  | FIRST OUTPUT PORT | SECOND OUTPUT PORT | THIRD OUTPUT PORT | FOURTH OUTPUT PORT |
|---|---|---|---|---|
| FIRST INPUT PORT | $\lambda 21$ | $\lambda 22$ | $\lambda 23$ | $\lambda 24$ |
| SECOND INPUT PORT | $\lambda 22$ | $\lambda 23$ | $\lambda 24$ | $\lambda 21$ |
| THIRD INPUT PORT | $\lambda 23$ | $\lambda 24$ | $\lambda 21$ | $\lambda 22$ |
| FOURTH INPUT PORT | $\lambda 24$ | $\lambda 21$ | $\lambda 22$ | $\lambda 23$ |

FIG. 6

|  | FIRST OUTPUT PORT | SECOND OUTPUT PORT | THIRD OUTPUT PORT | FOURTH OUTPUT PORT |
|---|---|---|---|---|
| FIRST INPUT PORT | $\lambda 31$ | $\lambda 32$ | $\lambda 33$ | $\lambda 34$ |
| SECOND INPUT PORT | $\lambda 32$ | $\lambda 33$ | $\lambda 34$ | $\lambda 31$ |
| THIRD INPUT PORT | $\lambda 33$ | $\lambda 34$ | $\lambda 31$ | $\lambda 32$ |
| FOURTH INPUT PORT | $\lambda 34$ | $\lambda 31$ | $\lambda 32$ | $\lambda 33$ |

FIG. 7

|  | FIRST OUTPUT PORT | SECOND OUTPUT PORT | THIRD OUTPUT PORT | FOURTH OUTPUT PORT |
|---|---|---|---|---|
| FIRST INPUT PORT | $\lambda 41$ | $\lambda 42$ | $\lambda 43$ | $\lambda 44$ |
| SECOND INPUT PORT | $\lambda 42$ | $\lambda 43$ | $\lambda 44$ | $\lambda 41$ |
| THIRD INPUT PORT | $\lambda 43$ | $\lambda 44$ | $\lambda 41$ | $\lambda 42$ |
| FOURTH INPUT PORT | $\lambda 44$ | $\lambda 41$ | $\lambda 42$ | $\lambda 43$ |

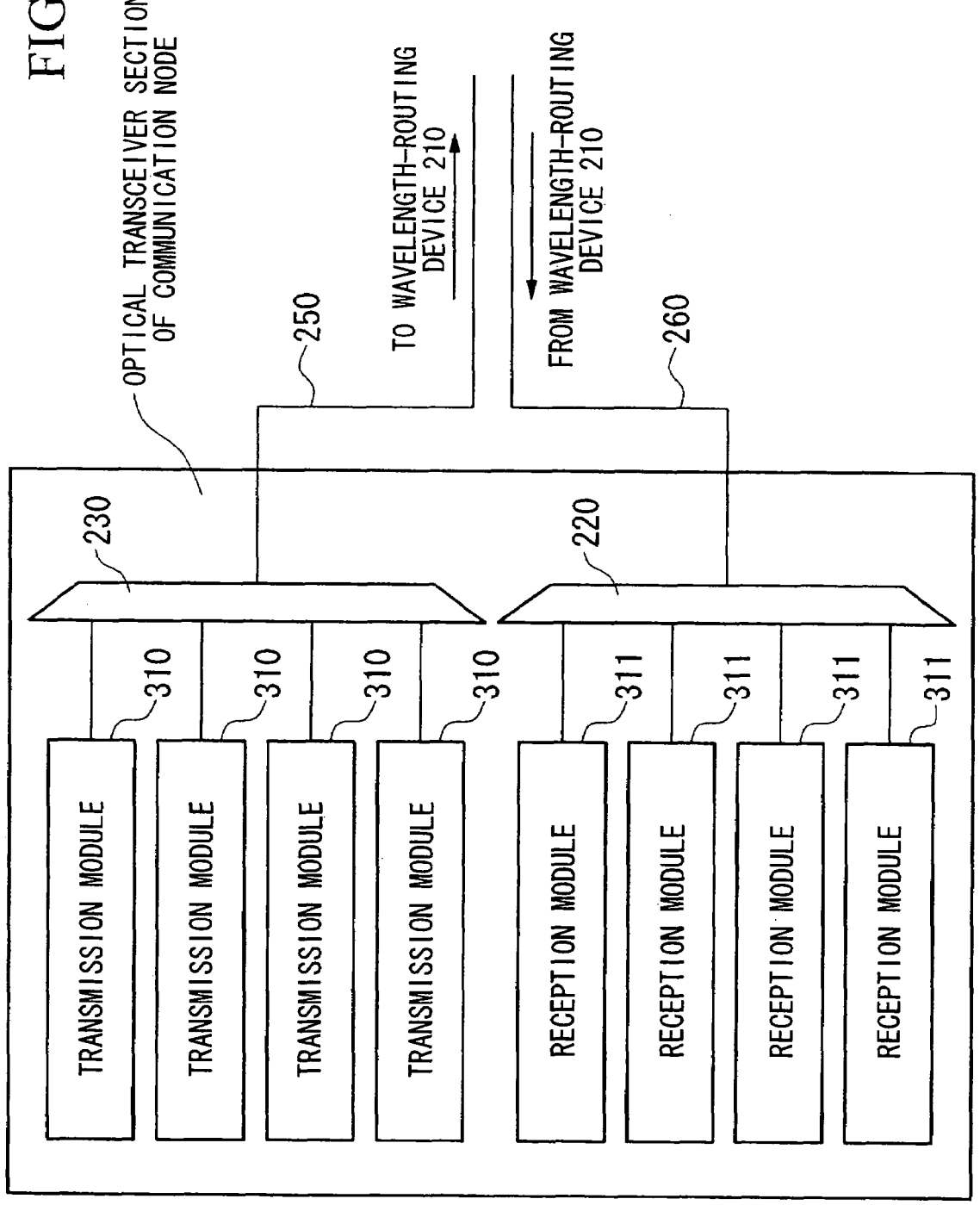

FIG. 17

| | TO 200-1 | TO 200-2 | TO 200-3 | TO 200-4 | MODULE NUMBER | TOTAL TLD NUMBER | NUMBER OF TLD IN USE |
|---|---|---|---|---|---|---|---|
| FROM 200-1 | λ11 NA | λ12 NA | λ13 OFF | λ14 ON | 1 | 0 | 0 |
| FROM 200-2 | λ12 NA | λ13 NA | λ14 ON | λ11 NA | 2 | 0 | 0 |
| FROM 200-3 | λ13 OFF | λ14 1 | λ11 OFF | λ12 OFF | 3 | 1 | 1 |
| FROM 200-4 | λ14 1 | λ11 OFF | λ12 OFF | λ13 OFF | 4 | 2 | 1 |

WAVELENGTH BAND $\lambda B_1 \pm \Delta \lambda_1$

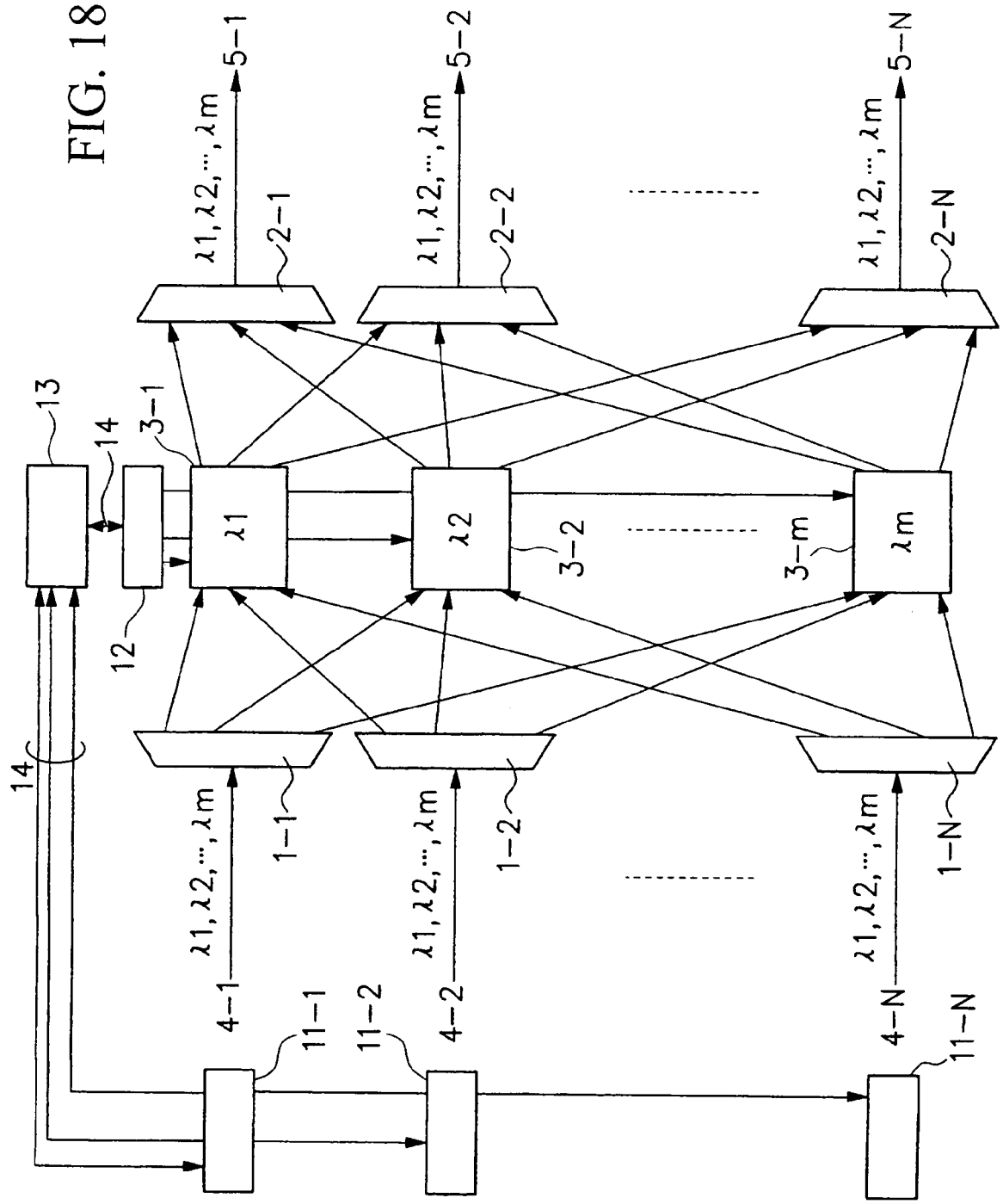

| INPUT COMMUNICATION NODE | DESTINATION COMMUNICATION NODE OF OPTICAL PATH |
|---|---|
| 1 | 3 |
| 2 | 0 |
| 3 | 1 |
| 4 | 0 |
| 5 | 0 |
| 6 | 0 |
| 7 | 0 |
| 8 | 0 |

TABLE GIVING OPTICAL PATH OF λ1

| INPUT COMMUNICATION NODE | DESTINATION COMMUNICATION NODE OF OPTICAL PATH |
|---|---|
| 1 | 0 |
| 2 | 5 |
| 3 | 0 |
| 4 | 0 |
| 5 | 2 |
| 6 | 0 |
| 7 | 0 |
| 8 | 0 |

TABLE GIVING OPTICAL PATH OF λ2

| INPUT COMMUNICATION NODE | DESTINATION COMMUNICATION NODE OF OPTICAL PATH |
|---|---|
| 1 | 0 |
| 2 | 8 |
| 3 | 0 |
| 4 | 0 |
| 5 | 0 |
| 6 | 0 |
| 7 | 0 |
| 8 | 2 |

TABLE GIVING OPTICAL PATH OF λ3

| INPUT COMMUNICATION NODE | DESTINATION COMMUNICATION NODE OF OPTICAL PATH |
|---|---|
| 1 | 3 |
| 2 | 0 |
| 3 | 1 |
| 4 | 0 |
| 5 | 0 |
| 6 | 0 |
| 7 | 0 |
| 8 | 0 |

TABLE GIVING OPTICAL PATH OF λ4

"0" MEANS THAT RELEVANT COMMUNICATION NODE IS NOT IN USE

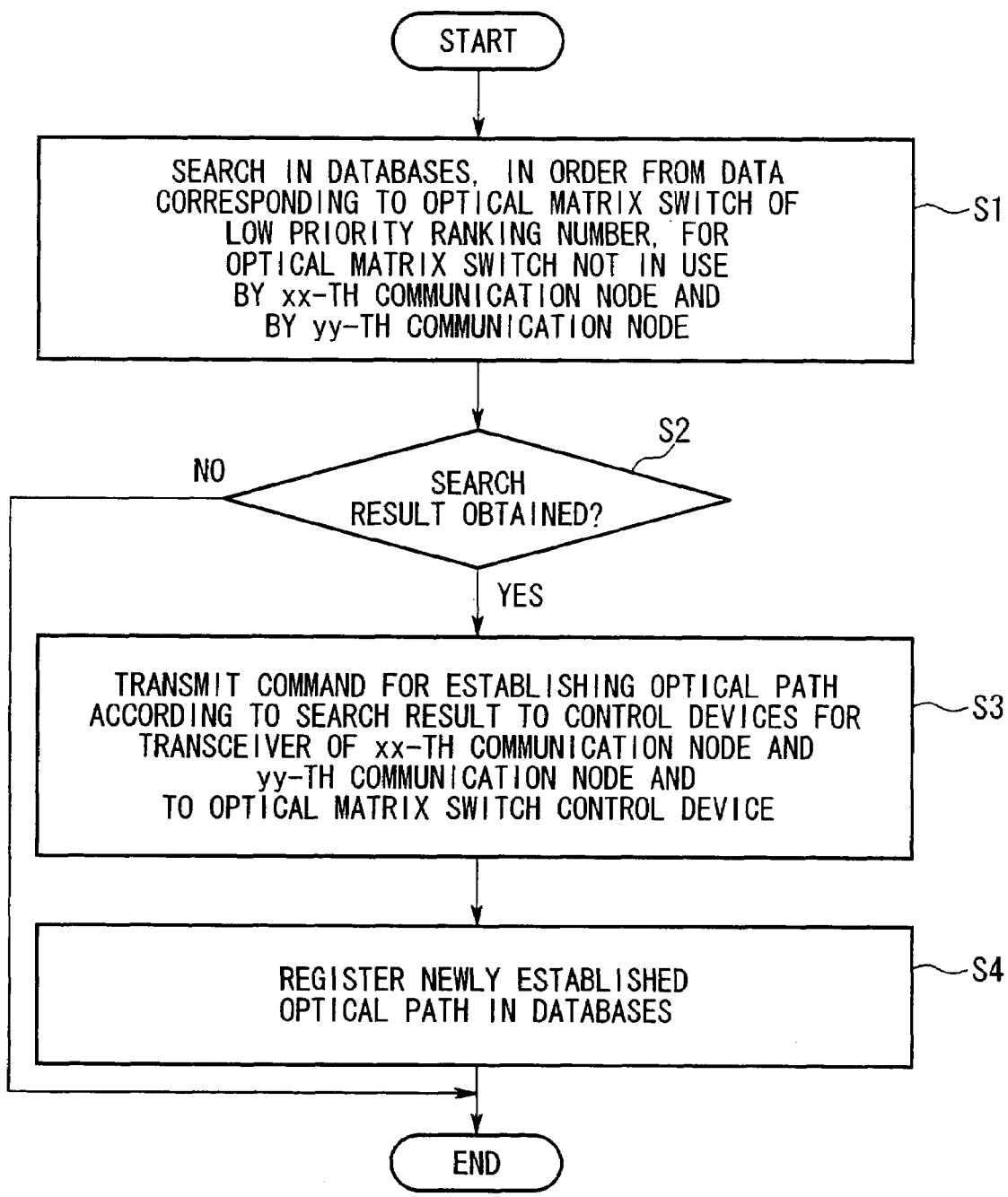

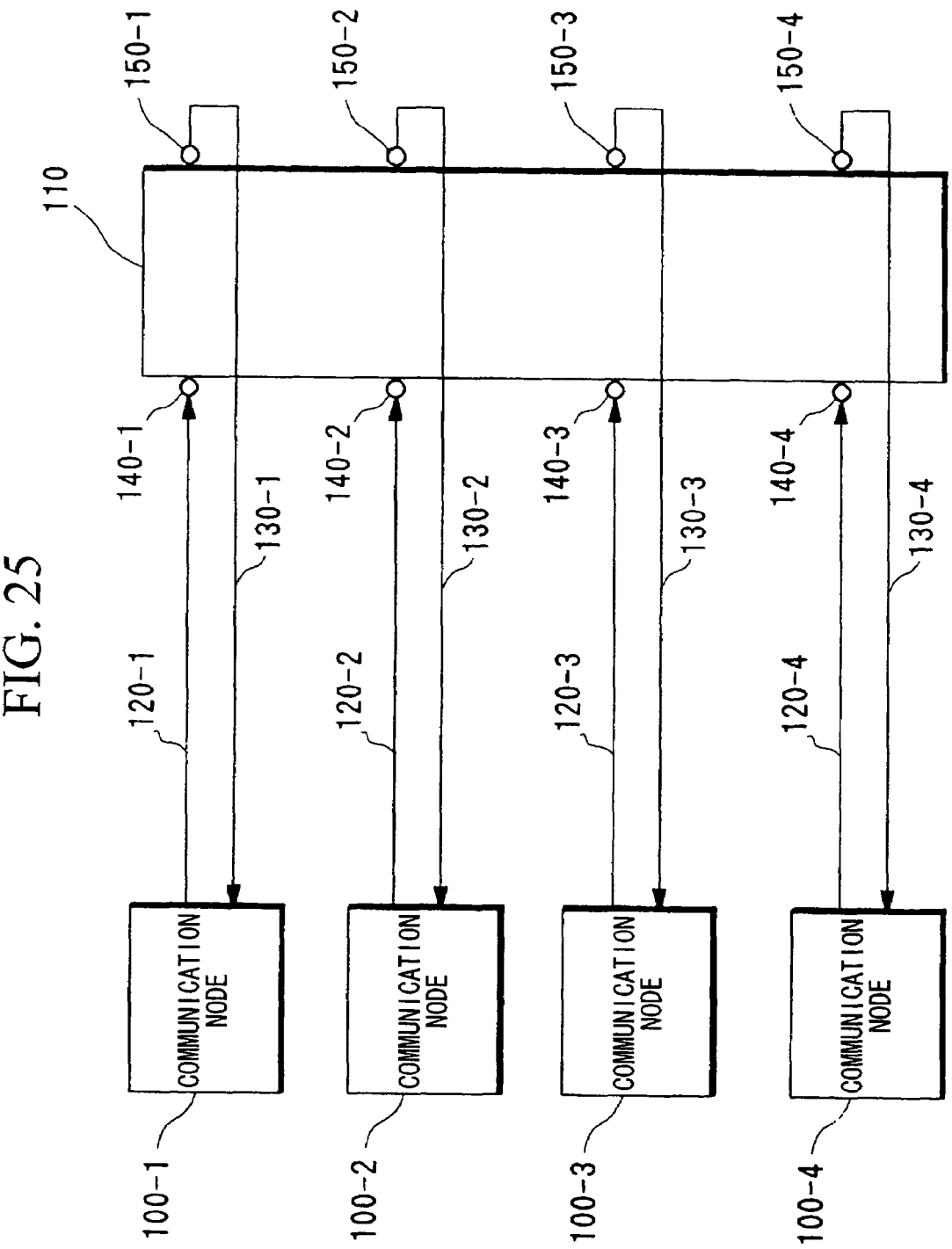

FIG. 26

OUTPUT PORT

| | 150-1 | 150-2 | 150-3 | 150-4 |
|---|---|---|---|---|
| 140-1 | $\lambda 1$ | $\lambda 2$ | $\lambda 3$ | $\lambda 4$ |
| 140-2 | $\lambda 2$ | $\lambda 3$ | $\lambda 4$ | $\lambda 1$ |
| 140-3 | $\lambda 3$ | $\lambda 4$ | $\lambda 1$ | $\lambda 2$ |
| 140-4 | $\lambda 4$ | $\lambda 1$ | $\lambda 2$ | $\lambda 3$ |

INPUT PORT

FIG. 27

OUTPUT PORT

| | 150-1 | 150-2 | 150-3 | 150-4 |
|---|---|---|---|---|
| 140-1 | $\lambda 1$ | $\lambda 2$ | $\lambda 3$ | $\lambda 4$ |
| 140-2 | $\lambda 2$ | $\lambda 3$ | $\lambda 4$ | $\lambda 5$ |
| 140-3 | $\lambda 3$ | $\lambda 4$ | $\lambda 5$ | $\lambda 6$ |
| 140-4 | $\lambda 4$ | $\lambda 5$ | $\lambda 6$ | $\lambda 7$ |

INPUT PORT

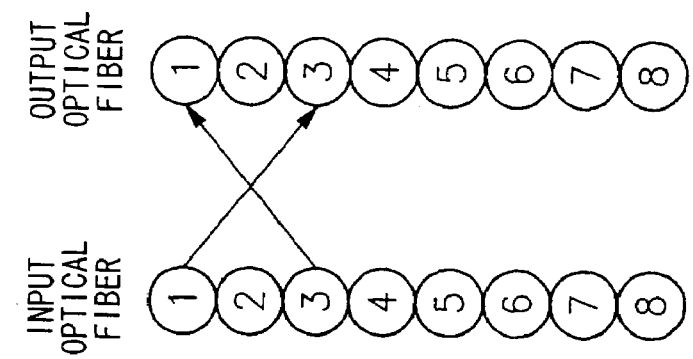
FIG. 31A  OPTICAL PATH OF λ1
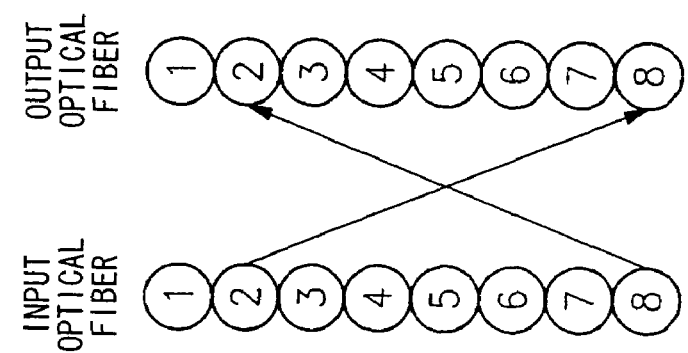
FIG. 31B  OPTICAL PATH OF λ2
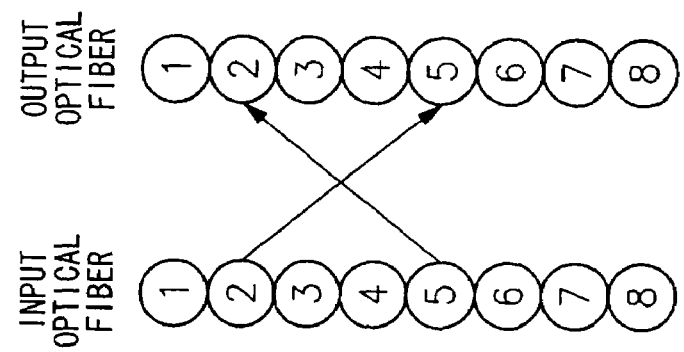
FIG. 31C  OPTICAL PATH OF λ3
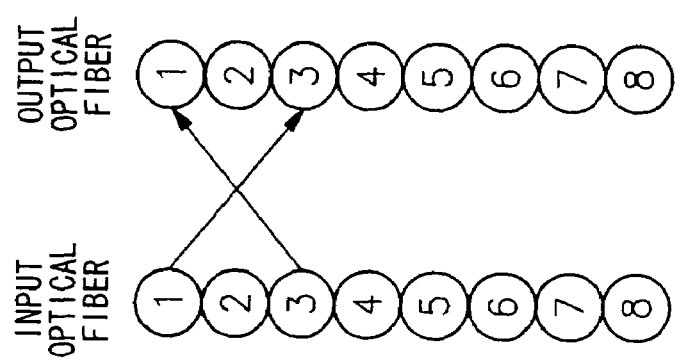
FIG. 31D  OPTICAL PATH OF λ4

OPTICAL COMMUNICATION NETWORK SYSTEM, WAVELENGTH ROUTING APPARATUS, COMMUNICATION NODE, OPTICAL PATH MANAGING METHOD FOR USE IN OPTICAL CROSS CONNECT APPARATUS, AND APPARATUS FOR THAT METHOD

TECHNICAL FIELD

The present invention relates to an optical communication network system which takes advantage of wavelength-routing and which establishes communication between a plurality of communication nodes by route control according to the wavelength of an optical signal, to a wavelength-routing device thereof, and to a communication node.

Furthermore, the present invention relates to an optical path management method and a device therefor which are useful when applied to such an optical communication network system, and to a technique for managing the optical path in an optical cross connect device which forms an optical network using an optical wavelength division multiplexing technique, and in particular an optical cross connect device which consists of a combination of a plurality of small scale optical matrix switches, and which establishes an optical path between any desired communication nodes among a maximum of N (where N is an integer greater than or equal to 2) communication nodes which transmit and receive wavelength division multiplexed signals which are obtained by wavelength division multiplexing optical signals of a maximum of m wavelengths (where m is an integer greater than or equal to 2).

BACKGROUND ART

In recent years, communication traffic is constantly increasing along with the spread of broadband service and the increase in the utilization of information interchange by companies which take advantage of the internet, and demand for increase of the capacity and the rate of communication networks is unrelenting.

The wavelength division multiplexing (WDM) communication technique greatly increases the transmission capacity per one optical fiber, and has realized great capacity increase between two locations. However, when relaying the optical signal at a communication node, it is necessary to demultiplex the wavelength division multiplexed signals for each wavelength, and to route the data packets in each optical signal individually for each packet.

Nowadays, routing of data packets is performed electrically by converting the optical signal to an electrical signal, but, along with increases in the transmission rate and increases in capacity, the routing by electrical processing of a high volume signal will reach a limit in the near future.

As a means for solving this problem, wavelength path routing is proposed, in which the optical signals are not converted into electrical signals, but are routed in the optical state (upon the optical layer).

FIG. 25 is an optical communication network system based upon wavelength path routing which has been implemented using an arrayed-waveguide grating which is provided with a wavelength-routing function (for example, refer to "32×32 full-mesh (1024 path) wavelength-routing WDM network based upon uniform-loss cyclic-frequency arrayed-waveguide grating", IEE Electron. Lett., vol. 36, no., pp. 1294-1295, 2000, by K. Kato et al.).

The optical communication network shown in FIG. 25 shows the case in which the number of the communication nodes is four, and 100-1 through 100-4 are communication nodes, 110 is a 4×4 arrayed-waveguide grating having four input ports and four output ports, 120-1 through 120-4 are upstream optical transmission lines along which pass optical signals which have been transmitted towards the arrayed-waveguide grating 110 from the communication nodes 100-1 through 100-4, and 130-1 through 130-4 are downstream optical transmission lines along which pass optical signals which have been transmitted from the arrayed-waveguide grating 110 towards the communication nodes 100-1 through 100-4.

The arrayed-waveguide grating 110 is an optical component which has input ports 140-1 through 140-4 and output ports 150-1 through 150-4, and the output ports 150-1 through 150-4 which output the optical signals which have been inputted to the input ports 140-1 through 140-4 are determined uniquely according to the wavelengths of these optical signals.

The upstream optical transmission lines 120-1 through 120-4 are respectively connected to the input ports 140-1 through 140-4 of the arrayed-waveguide grating 110, while the downstream transmission lines 130-1 through 130-4 are respectively connected to the output ports 150-1 through 150-4 of the arrayed-waveguide grating 110.

FIGS. 26 and 27 show how the input ports 140-1 through 140-4 and the output ports 150-1 through 150-4 of the 4×4 arrayed-waveguide grating 110, which has the four input ports 140-1 through 140-4 and the four output ports 150-1 through 150-4, are connected together according to wavelength.

FIG. 26 shows the case of a 4×4 arrayed-waveguide grating 110 which is provided with a cyclic-wavelength characteristic, and moreover FIG. 27 shows the case of one which is not provided with a cyclic-wavelength characteristic.

For example, in FIG. 26, when an optical signal of wavelength $\lambda 3$ has been inputted to the input port 140-1, this optical signal of wavelength $\lambda 3$ is outputted from the output port 150-3. Accordingly, when an optical signal of wavelength $\lambda 3$ is transmitted from the communication node 100-1, this optical signal of wavelength $\lambda 3$ is inputted to the input port 140-1 of the arrayed-waveguide grating 110 via the optical transmission line 120-1, and, due to wavelength-routing, this optical signal of wavelength $\lambda 3$ is outputted from the output port 150-3 of the arrayed-waveguide grating 110. Subsequently, the optical signal of wavelength $\lambda 3$ arrives at the communication node 100-3 along the optical transmission line 130-3. In this manner, it is possible to perform routing upon the optical layer based upon the wavelength of the optical signals by utilizing the wavelength-routing function of the arrayed-waveguide grating 110, and to perform communication between the communication nodes 100-1 through 100-4, without converting the optical signals into electrical signals.

Furthermore, an optical communication network having a structure as shown in FIG. 28 is known as a network system which is capable of answering to increase of transmission capacity by providing an optical path of two or more wavelengths between two communication nodes (refer to Japanese Unexamined Patent Application, First Publications Nos. 2000-134649, 2002-165238, and 2002-262319).

The optical communication network shown in FIG. 28 shows the case in which the number of communication nodes is four. In FIG. 28, 1200-1 through 1200-4 denote communication nodes, 1220-1 through 1220-4 denote wavelength-band demultiplexing devices, 1230-1 through 1230-4 denote wavelength-band multiplexing devices, and 1240 denotes an optical switch.

The communication nodes 1200-1 through 1200-4 wavelength division multiplex and output a plurality of optical signals. The optical signals which are outputted are inputted to the respective wavelength-band demultiplexing devices 1220-1 through 1220-4. These wavelength-band demultiplexing devices are provided with the function of distributing the wavelength division multiplexed signals which have been inputted to a plurality of output ports. At this time, the signals which are outputted from the respective output ports are wavelength division multiplexed for each combination of wavelengths which are determined in advance, in other words for each wavelength-band. The routes of the optical signals which are outputted from the wavelength-band demultiplexing devices are changed over by the optical switch 1240, and the outputs thereof are inputted to the wavelength-band multiplexing devices 1230-1 through 1230-4. These wavelength-band multiplexing devices, in a manner opposite to the wavelength-band demultiplexing devices, are provided with the function of bundling together signals which have been wavelength division multiplexed for each wavelength-band to a single output port. The signals which have been outputted from the wavelength-band multiplexing devices 1230-1 through 1230-4 are inputted to the communication nodes 1200-1 through 1200-4, and are received thereby.

Since it is possible to provide an optical path in this type of optical communication network between two communication nodes for each wavelength-band, accordingly it is possible to provide a plurality of optical paths between the communication nodes up to the number of wavelengths which are included within a wavelength-band.

It should be understood that, as shown in FIG. 29, there is also a known method of forming the optical switch 1240 by combining a plurality of small scale optical switches 1240-1 through 1240-3 (refer to Japanese Unexamined Patent Application, First Publication No. 2001-8244).

Moreover, it should be understood that there is known an optical communication network (refer to Japanese Unexamined Patent Application, First Publication No. 2002-300137) which utilizes the CWDM (Coarse WDM) standard having a grid of 20 nm interval in the wavelength-band demultiplexing devices or the wavelength-band multiplexing devices, and which forms wavelength-bands in which DWDM (Dense WDM) signals of 100 GHz (about 0.8 nm) intervals are accommodated in the 20 nm bands.

However, with the above-described conventional optical communication network system based upon wavelength-routing of the arrayed-waveguide grating 110, although the communication node 100-1 can transmit information to the communication node 100-3 with an optical signal of wavelength $\lambda 3$, it is difficult to increase the transmission capacity from the communication node 100-1 to the communication node 100-3 above the transmission capacity of an optical signal of one wavelength.

In other words, it is only possible to establish a single optical path between two communication nodes with the conventional technique shown in FIG. 25. In this manner, with an optical communication network system of the conventional structure which is based upon wavelength-routing by an arrayed-waveguide grating 110, there is the problematical aspect that it is extremely difficult to increase the transmission capacity by increasing the number of optical paths between the communication nodes.

Furthermore, with the method of establishing an optical path between communication nodes for each wavelength-band, the number of communication nodes to which some communication node can transmit information is limited to the number of wavelength-bands, and there is the problem that, if the number of communication nodes exceeds the number of the wavelength-bands, then a combination of the communication nodes is created in which information is not delivered unless it is transmitted via other communication nodes.

On the other hand, FIG. 30 shows an example of a conventional optical cross connect device (refer to "Optical Networks", R. Ramaswami, K. N. Sivarajan, Morgan Kaufman Publishers Inc., 1998, p. 341 etc.). In this figure, 1-1, 1-2, . . . 1-N are wavelength division demultiplexing circuits, 2-1, 2-2, . . . 2-N are wavelength division multiplexing circuits, 3-1, 3-2, . . . 3-m are optical matrix switches, 4-1, 4-2, . . . 4-N are input optical fibers (optical transmission lines upon the input side), and 5-1, 5-2, . . . 5-N are output optical fibers (optical transmission lines upon the output side).

The wavelength division demultiplexing circuits 1-1 through 1-N each have a single input port and m output ports, and the input port is connected via the input optical fibers 4-1 through 4-N to a certain single communication node (not shown in the figure), and a wavelength division multiplexed signal which has been inputted from the certain communication node to the input port is demultiplexed by wavelength and is outputted from the respective output ports.

The wavelength division multiplexing circuits 2-1 through 2-N each has m input ports and a single output port, and the output port is connected to a certain communication node (not shown in the figure) via output optical fibers 5-1 through 5-N, so that optical signals of a maximum of m wavelengths which have been inputted to the respective input ports are wavelength division multiplexed to form a wavelength division multiplexed signal, which is outputted from the output port to the certain communication node.

The optical matrix switches 3-1 through 3-m each has N input ports and N output ports, and each of the input ports is respectively connected to that output port, among the output ports of the wavelength division demultiplexing circuits 1-1 through 1-N, which outputs an optical signal of the same wavelength, while each of the output ports is separately connected to the input ports of the wavelength division multiplexing circuits 2-1 through 2-N.

With this type of optical cross connect device, the wavelength division multiplexed signals of m wavelengths which have been transmitted via the input optical fibers 4-1 through 4-N from the respective communication nodes are inputted to the wavelength division demultiplexing circuits 1-1 through 1-N, are demultiplexed by wavelength, are outputted from the separate output ports, and are respectively inputted by wavelength to the different optical matrix switches 3-1 through 3-m. Routes, that is, the wavelength division multiplexing circuits 2-1 through 2-N which are the output destination, are changed over so that the optical signals which have been inputted to the optical matrix switches 3-1 through 3-m are outputted to the desired output optical fibers 5-1 through 5-N under the condition that optical signals of the same wavelength are not outputted from the same output optical fiber, in other words, under the condition that optical signals of the same wavelength are not inputted to the same wavelength division multiplexing circuit, and the optical signals of m wavelengths which have been inputted to the wavelength division multiplexing circuits 2-1 through 2-N are wavelength division multiplexed, and are transmitted to the respective communication nodes via the output optical fibers 5-1 through 5-N.

With the circuit of FIG. 30, it is possible to establish settings so that all the optical signals of all the wavelengths which have been multiplexed upon the input optical fibers are outputted from the desired output optical fibers. However, due to the condition that optical signals of the same wavelength are not outputted from the same output optical fiber, the optical paths between the input optical fibers and the output optical fibers cannot be set freely.

For example, the case may be considered in which the number of the input optical fibers and the number of the output optical fibers are both 8, and the number of multiplexed wavelengths is 4. At this time, under the conditions that the optical paths between the input optical fibers and the output optical fibers are not arranged, that is, as shown in FIGS. 31A through 31D, optical paths which use the wavelength λ1 are established between the #1 input optical fiber and the #3 output optical fiber and between the #3 input optical fiber and the #1 output optical fiber, optical paths which use the wavelength λ2 are established between the #2 input optical fiber and the #5 output optical fiber and between the #5 input optical fiber and the #2 output optical fiber, optical paths which use the wavelength λ3 are established between the #2 input optical fiber and the #8 output optical fiber and between the #8 input optical fiber and the #2 output optical fiber; and optical paths which use the wavelength λ4 are established between the #1 input optical fiber and the #3 output optical fiber and between the #3 input optical fiber and the #1 output optical fiber, it is not possible to implement setting of the optical matrix switches so as to establish an optical path between the #1 input optical fiber and the #2 output optical fiber, or between the #2 input optical fiber and the #1 output optical fiber, even using the optical matrix switches through which any of the wavelengths from λ1 through λ4 passes, since a signal of the same wavelength as an already existing optical path is being outputted from the same output optical fiber.

On the other hand, as another method for implementing the establishment of optical paths between the input optical fibers and output optical fibers, there is a method as shown in FIGS. 32A through 32D, in which the optical paths between the input optical fibers and the output optical fibers are arranged. In detail, there is the method in which: optical paths which use the wavelength λ1 are established between the #1 input optical fiber and the #3 output optical fiber and between the #3 input optical fiber and the #1 output optical fiber; optical paths which use the wavelength λ1 are established between the #2 input optical fiber and the #5 output optical fiber and between the #5 input optical fiber and the #2 output optical fiber; optical paths which use the wavelength λ2 are established between the #2 input optical fiber and the #8 output optical fiber and between the #8 input optical fiber and the #2 output optical fiber; and optical paths which use the wavelength λ2 are established between the #1 input optical fiber and the #3 output optical fiber and between the #3 input optical fiber and the #1 output optical fiber.

In these circumstances, it is possible to utilize the wavelength λ3 or the wavelength λ4 for setting of the optical matrix switches so as to establish a further optical path between the #1 optical fiber and the #2 optical fiber, and, as compared with the previous case, it is possible to enhance the efficiency of utilization of the optical matrix switches.

In this manner, in order to utilize an optical cross connect device formed by combining small scale optical matrix switches efficiently, it is necessary to establish an optical path by planning a method of utilizing wavelengths so as to enhance efficiency.

DISCLOSURE OF INVENTION

The present invention has been conceived in the light of the above-described problems, and its object is to provide an optical communication network system and a wavelength-routing device and a communication node therefor, which can easily increase the number of optical paths between the communication nodes and are capable of increasing the transmission capacity, and which excel in flexibility and expandability.

Furthermore, an object of the present invention is to provide an optical communication network system and a wavelength-routing device and a communication node therefor which provide full mesh connectivity in which optical paths are established between all the communication nodes by utilizing an arrayed-waveguide grating for wavelength-routing.

Yet furthermore, an object of the present invention is to provide an optical path management method and a device therefor, which can increase the efficiency of utilization of an optical cross connect device which is formed by combining small scale optical matrix switches.

In order to attain the above-described objects, the present invention is an optical communication network system comprising: a plurality of communication nodes; a wavelength-routing device which establishes communication between the communication nodes based upon route control according to the wavelength of an optical signal; and an optical transmission line which forms a communication path which connects the communication nodes and the wavelength-routing device, wherein the wavelength-routing device comprises: N device input ports, where N being an integer greater than or equal to 2, which are connected via the optical transmission line to the communication nodes; N device output ports which are connected via the optical transmission line to the communication nodes; a plurality of wavelength-band demultiplexers which are provided to each of the N device input ports, and each has a single input port and a plurality of output ports, and the input port is connected to one of the device input ports; a plurality of wavelength-band multiplexers which are provided to each of the N device output ports, and each has a plurality of input ports and a single output port, and the output port is connected to one of the device output ports; and R K×K arrayed-waveguide gratings, where R being an integer greater than or equal to J and J being an integer greater than or equal to 2, which have K input ports and K output ports, where K being an integer that satisfies K=N, which have wavelength-routing characteristics in which optical signals having different wavelengths which are inputted to one input port are output at different output ports depending on the wavelengths of the inputted optical signals and in which optical signals having different wavelengths which are outputted from one output port are optical signals which have been inputted to different input ports, and wherein the wavelength-band demultiplexers comprise a means which demultiplexes by wavelength band a wavelength division multiplexed signal in which a respective predetermined number of wavelengths have been wavelength division multiplexed for each wavelength band which is transmitted from the communication nodes, where wavelength band=central wavelength $\lambda B_m$±wavelength band width $\Delta\lambda_m$, with $\lambda B_m + \Delta\lambda_m = \lambda B_{m+1} - \Delta\lambda_{m+1}$, where $1 = m = R-1$, with m being an integer, and outputs the results at different output ports, the wavelength-band multiplexers comprise a means which multiplexes optical signals which have been inputted from the plurality of input ports for each wavelength band and which outputs a wavelength division multiplexed signal in which a predetermined number of wavelengths have been wavelength division multiplexed at the output port, the K×K arrayed-waveguide gratings are provided with a wavelength-routing characteristic for each wavelength band of central wavelength $\lambda B_1 \pm$ wavelength band width $\Delta\lambda_1$, central wavelength $\lambda B_2 \pm$ wavelength band width $\Delta\lambda_2$ ($\lambda B_1 + \Delta\lambda_1 < \lambda B_2 - \Delta\lambda_2$), central wavelength $\lambda B_3 \pm$ wavelength band width $\Delta\lambda_3$ ($\lambda B_2 + \Delta\lambda_2 < \lambda B_3 - \Delta\lambda_3$), . . . , central wavelength $\lambda B_R \pm$ wavelength band width $\Delta\lambda_R$ ($\lambda B_{R-1} + \Delta\lambda_{R-1} < \lambda B_R - \Delta\lambda_R$), the output ports of the wavelength-band demultiplexers which are respectively connected to the N device input ports are one to one connected to the input ports of the K×K arrayed-waveguide gratings which have wavelength-routing characteristics at the wavelength bands of the optical signals which are outputted from the output ports of the wavelength-band demultiplexers, and the output ports of the K×K arrayed-waveguide gratings are one to one connected to the input ports of any one of the plurality of wavelength-band multiplexers which can multiplex optical signals of wavelengths which belong to the wavelength bands of the optical signals which are outputted from the output ports of the K×K arrayed-waveguide gratings.

According to the present invention, when, for example, an optical signal within the $\lambda B_m \pm \Delta\lambda_m$ wavelength band is outputted from a predetermined communication node, this optical signal is transmitted along the optical transmission line and arrives at an input port of the wavelength-band demultiplexer of the wavelength-routing device, wavelength-band demultiplexing of the wavelength bands is performed by the wavelength-band demultiplexer, and the results are outputted from a predetermined output port. The optical signal which is outputted from the output port of the wavelength-band demultiplexer is inputted to an input port of the arrayed-waveguide grating according to its wavelength band.

From the relationship between the input ports/output ports of the arrayed-waveguide grating and wavelengths, the optical signal which has been inputted to the input port of the arrayed-waveguide grating is outputted at a predetermined output port of the arrayed-waveguide grating.

An optical signal which has been outputted from the output port of the arrayed-waveguide grating is inputted to an input port of the wavelength-band multiplexer, and is multiplexed by the wavelength-band multiplexer with optical signals of other wavelength bands, then being outputted from an output port.

The optical signal which has been outputted from the output port of the wavelength-band multiplexer is transmitted along the optical transmission line, and arrives at a communication node.

By doing this, when transmitting data from one communication node to another communication node, it is possible to utilize the optical paths for each wavelength band by varying the wavelength band $\lambda B_m \pm \Delta\lambda_m$ of the wavelength of the optical signal which is transmitted from the communication node.

The communication nodes and the wavelength-routing device which make up the optical communication network system are connected by pairs of optical fibers in the same manner as in the conventional example, but, with the present invention, an arrayed-waveguide grating is arranged independently for each wavelength band in the wavelength-routing device, and by performing wavelength-band multiplexing of wavelength bands and wavelength-band demultiplexing of wavelength bands in each communication node and the wavelength-routing device, it is possible to form one optical path for each wavelength band between the communication nodes.

Accordingly, although with the conventional technique shown in FIG. 25 it is possible to form only a single optical path between the communication nodes with a pair of optical transmission lines, by applying the structure of the present invention, it is possible to form, at a maximum, the same number of optical paths as the number of wavelength bands, and it is possible easily to increase the transmission capacity between the communication nodes.

Furthermore, with the optical communication network system of the present invention, when increasing the number of optical paths, it will be sufficient to add the required equipment only between the communication nodes for which this increase of the number of optical paths is required, so that the flexibility and the economy are superb.

Yet further, with a conventional optical communication system in which the optical paths are formed between the communication nodes by taking the wavelength-bands as units, when the number of communication nodes exceeds the number of the wavelength-bands, it is necessary to pass via a different communication node. In contrast, according to the present invention, it is possible to implement an optical communication network system which provides full mesh connectivity in which optical paths are provided between all the communication nodes. Accordingly, even if the number of communication nodes exceeds the number of the wavelength-bands, it is not necessary to pass via a different communication node.

Furthermore, in the optical communication network system of the above-described structure, each of the communication nodes may comprise: a J×1 wavelength-band multiplexer, where J being an integer greater than or equal to 2, which has J input ports IP [1], IP [2], IP [3], . . . IP [J] and a single output port, and outputs at the single output port optical signals of wavelengths which belong to the wavelength bands of central wavelength $\lambda B_1 \pm$ wavelength band width $\Delta\lambda_1$, central wavelength $\lambda B_2 \pm$ wavelength band width $\Delta\lambda_2$, central wavelength $\lambda B_3 \pm$ wavelength band width $\Delta\lambda_3$, . . . , central wavelength $\lambda B_J \pm$ wavelength band width $\Delta\lambda_J$, which are inputted to the respective J input ports, where $\lambda B_m + \Delta\lambda_m = \lambda B_{m+1} - \alpha\Delta\lambda_{m+1}$, for 1=m=J−1, where m being an integer; a plurality of wavelength division multiplexers which are provided at each of the input ports IP [1], IP [2], IP [3], . . . IP [J] of the J×1 wavelength-band multiplexer, and which have two or more input ports and one output port, with the output ports being connected to the input ports of the J×1 wavelength-band multiplexer; and a plurality of optical transmitters which are connected to the input ports of the wavelength division multiplexers, and which emit light of wavelengths which belong to wavelength bands of central wavelengths, $\lambda B_m \pm$ wavelength band width $\Delta\lambda m$, and wherein the output port of the J×1 wavelength-band multiplexer may be connected via an optical waveguide to the device input ports of the wavelength-routing device.

According to this structure, a communication node can transmit optical signals of different wavelengths within a different plurality of communication wavelength bands. Accordingly, whereas the conventional technique shown in FIG. 25 can form only a single optical path between the communication nodes with a pair of optical transmission lines, by applying the structure of the present invention, it is possible to form, as a maximum, the same number of optical paths as the number of wavelength bands, so that it is possible easily to increase the transmission capacity between the communication nodes. Furthermore, with the optical communication network system of the present invention, when increasing the number of optical paths, it will be sufficient to add the required equipment only between the communication nodes for which this increase of the number of optical paths is required, so that the flexibility and the economy are superb.

Furthermore, in an optical communication network system of the above-described structure, each of the communication nodes may comprise: a 1×J wavelength-band demultiplexer, where J being an integer greater than or equal to 2, which has J output ports OP[1], OP[2], OP[3], . . . OP[J] and a single input port, and which outputs at the J output ports optical signals of wavelengths which belong to the wavelength band widths which are inputted to the single input port of central wavelength $\lambda B_1 \pm$wavelength band width $\Delta\lambda_1$, central wavelength $\lambda B_2 \pm$wavelength band width $\Delta\lambda_2$, central wavelength $\lambda B_3 \pm$wavelength band width $\Delta\lambda_3$, . . . , central wavelength $\lambda B_J \pm$wavelength band width $\Delta\lambda_J$, where $\lambda B_m + \Delta\lambda_m = \lambda B_{m+1} - \Delta\lambda_{m+1}$, where m being an integer; a plurality of wavelength division demultiplexers which are provided to each of the output ports OP[1], OP[2], OP[3], . . . OP[J] of the 1×J wavelength-band demultiplexer, each of which has two or more output ports and a single input port, and the input port is connected to one of the output ports of the 1×J wavelength-band demultiplexer; and a plurality of optical receivers which are connected to the output ports of the wavelength division demultiplexers, and wherein the single input port of the 1×J wavelength-band demultiplexer may be connected via an optical waveguide to one of the device output ports of the wavelength-routing device.

According to this structure, a communication node can receive optical signals of different wavelengths within a different plurality of communication wavelength bands. Accordingly, whereas the conventional technique shown in FIG. 25 can form only a single optical path between the communication nodes with a pair of optical transmission lines, by applying the structure of the present invention, it is possible to form, as a maximum, the same number of optical paths as the number of wavelength bands, so that it is possible easily to increase the transmission capacity between the communication nodes. Furthermore, with the optical communication network system of the present invention, when increasing the number of optical paths, it will be sufficient to add the required equipment only between the communication nodes for which this increase of the number of optical paths is required, so that the flexibility and the economy are superb.

Furthermore, in an optical communication network system of the above-described structure, each of the communication nodes may comprise: a J×1 wavelength-band multiplexer, where J being an integer greater than or equal to 2, which has J input ports IP [1], IP [2], IP [3], . . . IP [J] and a single output port, and outputs at the single output port optical signals of wavelengths which belong to the wavelength bands of central wavelength $\lambda B_1 \pm$wavelength band width $\Delta\lambda_1$, central wavelength $\lambda B_2 \pm$wavelength band width $\Delta\lambda_2$, central wavelength $\lambda B_3 \pm$wavelength band width $\alpha\lambda_3$, . . . , central wavelength $\lambda B_J \pm$wavelength band width $\Delta\lambda_J$, which are inputted to each of the J input ports, where $\lambda B_m + \Delta\lambda_m = \lambda B_{m+1} - \Delta\lambda_{m+1}$, for $1 \leq m \leq J-1$, where m being an integer; at least one wavelength-tunable optical light source integrated optical transmitter which is connected to any one of the input ports IP [1], IP [2], IP [3], . . . IP [J] of the J×1 wavelength-band multiplexer, which is provided with a wavelength-tunable optical light source which can be set to a wavelength within a wavelength band which belongs to the input port which is connected, and which outputs light of the wavelength; a plurality of wavelength division multiplexers which are provided to each of the input ports of the J×1 wavelength-band multiplexer, other than the input port to which the wavelength-tunable optical light source integrated optical transmitter is connected, and which have two or more input ports and one output port, with the output port being connected to one of the input ports of the J×1 wavelength-band multiplexer; a plurality of optical transmitters which are connected to the input ports of the wavelength division multiplexer, and which emit light of wavelength which belongs to a wavelength band of central wavelength $\lambda B_m \pm$wavelength band width $\Delta\lambda m$; a 1×J wavelength-band demultiplexer, where J being an integer greater than or equal to 2, which has J output ports OP[1], OP[2], OP[3], . . . OP[J] and a single input port, and outputs at the J output ports optical signals of wavelengths which belong to the wavelength band widths of central wavelength $\lambda B_1 \pm$wavelength band width $\Delta\lambda_1$, central wavelength $\lambda B_2 \pm$wavelength band width $\Delta\lambda_2$, central wavelength $\lambda B_3 \pm$wavelength band width $\alpha\lambda_3$, . . . , central wavelength $\lambda B_J \pm$wavelength band width $\Delta\lambda_J$, which are inputted to the single input port, where $\lambda B_m + \Delta\lambda_m = \lambda B_{m+1} - \Delta\lambda_{m+1}$, for $1 \leq m \leq J$, where m being an integer; an optical receiver which is connected to that output port, among the output ports OP[1], OP[2], OP[3], . . . OP[J] of the 1×J wavelength-band demultiplexer, which belongs to the wavelength band to which the wavelength-tunable optical light source integrated optical transmitter is provided, and which receives an optical signal of the wavelength which is outputted from the wavelength-tunable optical light source integrated optical transmitter; a plurality of wavelength division demultiplexers which are provided to each of the output ports of the 1×J wavelength-band demultiplexer, except for the output port to which the optical receiver is connected, which have two or more, output ports and a single input port, and the input port is connected to one of the output ports of the 1×J wavelength-band demultiplexer; and a plurality of optical receivers which are connected to the output ports of the wavelength division demultiplexers, and wherein the single input port of the 1×J wavelength-band demultiplexer is connected via an optical waveguide to one of the device output ports of the wavelength-routing device.

According to this structure, an optical signal is inputted at any one of the input ports IP [1], IP [2], IP [3], . . . IP [J] of the J×1 wavelength-band multiplexer from at least one wavelength-tunable optical light source integrated optical transmitter which is provided with the wavelength-tunable optical light source which can be set to a wavelength within the wavelength band which belongs to the input port without passing through the wavelength division multiplexer, and, among the output ports OP[1], OP[2], OP[3], . . . OP[J] of the 1×J wavelength-band demultiplexer, an optical signal which has been outputted from an output port which belongs to a wavelength band which is provided to the wavelength-tunable optical light source integrated optical transmitter, in other words an optical signal of the wavelength which has been outputted from the wavelength-tunable optical light source integrated optical transmitter, is inputted to an optical receiver without passing through the optical division demultiplexer.

Furthermore, the optical communication network system of the above-described structure may further comprise an optical path management means which controls an optical path between two different communication nodes, and wherein if at least one group of the wavelength-tunable optical light source integrated optical transmitters exists which are provided to all the communication nodes and which output optical signals of the same wavelength band, and if there are K wavelength bands, where K being an integer greater than or equal to 2, which belong to the input ports of the J×1 wavelength-band multiplexer which are connected to the wavelength-tunable optical light source integrated optical transmitters, the optical path management means may assign mutually different priority rankings from 1 to K to the wavelength bands which belong to the input ports of the J×1 wavelength-band multiplexer which are connected to the wavelength-tunable optical light source integrated optical transmitters, and when, among the wavelength bands which belong to the input ports of the J×1 wavelength-band multiplexer which are connected to the wavelength-tunable optical light source integrated optical transmitters, the highest numbered priority ranking among the wavelength bands for which optical paths exist between x-th communication node and y-th communication node is number b, and the lowest numbered priority ranking among the wavelength bands for which an optical path whose start point is the x-th communication node, an optical path whose end point is the x-th communication node, an optical path whose start point is the y-th communication node, and an optical path whose end point is the y-th communication node do not exist is number a, and the number a is smaller than the number b, the optical path management means may establish an optical path between the x-th communication node and the y-th communication node upon the wavelength band of a-th priority ranking, and thereafter controls ON/OFF and an oscillation wavelength of the wavelength-tunable optical light source integrated optical transmitter so as to cancel the optical path which was established between the x-th communication node and the y-th communication node upon the wavelength band of b-th priority ranking.

Furthermore, in the above-described optical network communication system, there may be further comprised: a database which records an optical path for each wavelength band; a first search means which, when a requirement has arisen newly to establish an optical path between xx-th communication node and yy-th communication node, searches in the database, in order from data which correspond to a wavelength band whose priority ranking is the lowest, for a wavelength band which is not in use by the xx-th communication node and the yy-th communication node; a first transmission means which transmits to the optical path management means a command for establishing an optical path according to the result of searching by the first search means; a first database update means which registers an optical path which has been newly established in the database; a second search means which, when a requirement for an optical path which is already established between xxx-th communication node and yyy-th communication node has ceased, searches in the database, in order from data which correspond to a wavelength band whose priority ranking is the highest, for a wavelength band upon which an optical path is established between the xxx-th communication node and the yyy-th communication node; a second transmission means which transmits to the optical path management means a command for canceling an optical path according to the result of searching by the second search means; a second database update means which deletes an optical path which has been cancelled from the database; an extraction means which searches in the database the number b of the highest priority ranking among the wavelength bands upon which optical paths are established between the x-th communication node and the y-th communication node, and the number a of the lowest priority ranking among the wavelength bands which do not use both the x-th communication node and the y-th communication node, for all the combinations of x and y in a predetermined order, and extracts combinations of x, y, a, and b for which the number a is smaller than the number b; a third transmission means which, when an applicable combination exists, transmits to the optical path management means a command for establishing an optical path using the a-th wavelength band between the x-th communication node and the y-th communication node, and thereafter transmits to the optical path management means a command for canceling an optical path using the b-th wavelength band between the x-th communication node and the y-th communication node; and a database update means which registers an optical path which has been newly established in the database, and deletes an optical path which has been cancelled from the database.

By employing this type of structure, the state is brought about in which the optical paths between the communication nodes are always arranged, so that it is possible to enhance the efficiency of use of the optical cross connect device.

Yet further, in the optical communication network system of the above-described structure, the K×K arrayed-waveguide gratings may have cyclic-wavelength characteristics.

Even further, the present invention is a wavelength-routing device which is provided to an optical communication network system comprising a plurality of communication nodes and an optical transmission line which forms a communication path, connected with the communication nodes by the optical transmission line, and which establishes communication between the communication nodes based upon route control according to the wavelength of an optical signal, the wavelength-routing device comprising: N device input ports, where N being an integer greater than or equal to 2, which are connected via the optical transmission line to the communication nodes; N device output ports which are connected via the optical transmission line to the communication nodes; a plurality of wavelength-band demultiplexers which are provided to each of the N device input ports, and each has a single input port and a plurality of output ports, and the input port is connected to one of the device input ports; a plurality of wavelength-band multiplexers which are provided to each of the N device output ports, and each has a plurality of input ports and a single output port, and the output port is connected to one of the device output ports; and R K×K arrayed-waveguide gratings, where R being an integer greater than or equal to J and J being an integer greater than or equal to 2, which have K input ports and K output ports, where K being an integer that satisfies K=N, which have wavelength-routing characteristics in which optical signals having different wavelengths which are inputted to one input port are output at different output ports depending on the wavelengths of the inputted optical signals and in which optical signals having different wavelengths which are outputted from one output port are optical signals which have been inputted to different input ports, and wherein the wavelength-band demultiplexers comprise a means which demultiplexes by wavelength band a wavelength division multiplexed signal in which a predetermined number of wavelengths have been wavelength division multiplexed for each wavelength band which is transmitted from the communication nodes, where wavelength band=central wavelength $\lambda B_m$±wavelength band width $\Delta\lambda_m$, with $\lambda B_m + \Delta\lambda_m = \lambda B_{m+1} - \Delta\lambda_{m+1}$, where $1=m=R-1$, with m being an integer, and outputs the results at different output ports, the wavelength-band multiplexers comprise a means which multiplexes optical signals which have been inputted from the plurality of input ports for each wavelength band and which outputs a wavelength division multiplexed signal in which a predetermined number of wavelengths have been wavelength division multiplexed at the output port, the K×K arrayed-waveguide gratings are provided with a wavelength-routing characteristic for each wavelength band of central wavelength $\lambda B_1 \pm$ wavelength band width $\Delta\lambda_1$, central wavelength $\lambda B_2 \pm$ wavelength band width $\Delta\lambda_2$ ($\lambda B_1 + \Delta\lambda_1 < \lambda B_2 - \Delta\lambda_2$), central wavelength $\lambda B_3 \pm$ wavelength band width $\Delta\lambda_3$ ($\lambda B_2 + \Delta\lambda_2 < \lambda B_3 - \Delta\lambda_3$), . . . , central wavelength $\lambda B_R \pm$ wavelength band width $\Delta\lambda_R$ ($\lambda B_{R-1} + \Delta\lambda_{R-1} < \lambda B_R - \Delta\lambda_R$), the output ports of the wavelength-band demultiplexers which are respectively connected to the N device input ports are one to one connected to the input ports of the K×K arrayed-waveguide gratings which have wavelength-routing characteristics at the wavelength bands of the optical signals which are outputted from the output ports of the wavelength-band demultiplexers, and the output ports of the K×K arrayed-waveguide gratings are one to one connected to the input ports of any one of the plurality of wavelength-band multiplexers which can multiplex optical signals of wavelengths which belong to the wavelength bands of the optical signals which are outputted from the output ports of the K×K arrayed-waveguide gratings.

Furthermore, the present invention is an optical path management device which controls an optical path between two different communication nodes in an optical communication network system which comprises a plurality of communication nodes, a wavelength-routing device which establishes communication between the communication nodes based upon route control according to the wavelength of an optical signal, and an optical transmission line which forms a communication path which connects the communication nodes and the wavelength-routing device wherein the wavelength-routing device comprises: N device input ports, where N being an integer greater than or equal to 2, which are connected via the optical transmission line to the communication nodes; N device output ports which are connected via the optical transmission line to the communication nodes; a plurality of wavelength-band demultiplexers which are provided to each of the N device input ports, and each has a single input port and a plurality of output ports, and the input port is connected to one of the device input ports; a plurality of wavelength-band multiplexers which are provided to each of the N device output ports, and each has a plurality of input ports and a single output port, and the output port is connected to one of the device output ports; and R K×K arrayed-waveguide gratings, where R being an integer greater than or equal to J and J being an integer greater than or equal to 2, which have K input ports and K output ports, where K being an integer that satisfies K=N, which have wavelength-routing characteristics in which optical signals having different wavelengths which are inputted to one input port are output at different output ports depending on the wavelengths of the inputted optical signals and in which optical signals having different wavelengths which are outputted from one output port are optical signals which have been inputted to different input ports, and wherein the wavelength-band demultiplexers comprise a means which demultiplexes by wavelength band a wavelength division multiplexed signal in which a predetermined number of wavelengths have been wavelength division multiplexed for each wavelength band which is transmitted from the communication nodes, wherein wavelength band=central wavelength $\lambda B_m \pm$ wavelength band width $\Delta\lambda_m$, with $\lambda B_m + \Delta\lambda_m = \lambda B_{m+1} - \Delta\lambda_{m+1}$, where $1=m=R-1$, with m being an integer, and outputs the results at different output ports, the wavelength-band multiplexers comprise a means which multiplexes optical signals which have been inputted from the plurality of input ports for each wavelength band and which outputs a wavelength division multiplexed signal in which a predetermined number of wavelengths have been wavelength division multiplexed at the output port, the K×K arrayed-waveguide gratings are provided with a wavelength-routing characteristic for each wavelength band of central wavelength $\lambda B_1 \pm$ wavelength band width $\Delta\lambda_1$, central wavelength $\lambda B_2 \pm$ wavelength band width $\Delta\lambda_2$ ($\lambda B_1 + \Delta\lambda_1 < \lambda B_2 - \Delta\lambda_2$), central wavelength $\lambda B_3 \pm$ wavelength band width $\Delta\lambda_3$ ($\lambda B_2 + \Delta\lambda_2 < \lambda B_3 - \Delta\lambda_3$), . . . , central wavelength $\lambda B_3 \pm$ wavelength band width $\Delta\lambda_R$ ($\lambda B_{R-1} + \Delta\lambda_{R-1} < \lambda B_R - \Delta\lambda_R$), the output ports of the wavelength-band demultiplexers which are respectively connected to the N device input ports are one to one connected to the input ports of the K×K arrayed-waveguide gratings which have wavelength-routing characteristics at the wavelength bands of the optical signals which are outputted from the output ports of the wavelength-band demultiplexers, and the output ports of the K×K arrayed-waveguide gratings are one to one connected to the input ports of any one of the plurality of wavelength-band multiplexers which can multiplex optical signals of wavelengths which belong to the wavelength bands of the optical signals which are outputted from the output ports of the K×K arrayed-waveguide gratings, and each of the communication nodes comprises: a J×1 wavelength-band multiplexer, where J being an integer greater than or equal to 2, which has J input ports IP [1], IP [2], IP [3], . . . IP [J] and a single output port, and outputs at the single output port optical signals of wavelengths which belong to the wavelength bands of central wavelength $\lambda B_1 \pm$ wavelength band width $\Delta\lambda_1$, central wavelength $\lambda B_2 \pm$ wavelength band width $\Delta\lambda_2$, central wavelength $\lambda B_3 \pm$ wavelength band width $\Delta\lambda_3$, . . . , central wavelength $\lambda B_J \pm$ wavelength band width $\Delta\lambda_J$, which are inputted to each of the J input ports, where $\lambda B_m + \Delta\lambda_m = \lambda B_{m+1} - \Delta\lambda_{m+1}$, for $1=m=J-1$, where m being an integer; at least one wavelength-tunable optical light source integrated optical transmitter which is connected to any one of the input ports IP [1], IP [2], IP [3], . . . IP [J] of the J×1 wavelength-band multiplexer, which is provided with a wavelength-tunable optical light source which can be set to a wavelength within a wavelength band which belongs to the input port which is connected, and which outputs light of the wavelength; a plurality of wavelength division multiplexers which are provided to each of the input ports of the J×1 wavelength-band multiplexer, other than the input port to which the wavelength-tunable optical light source integrated optical transmitter is connected, and which have two or more input ports and one output port, with the output port being connected to one of the input ports of the J×1 wavelength-band multiplexer; a plurality of optical transmitters which are connected to the input ports of the wavelength division multiplexer; and which emit light of wavelength which belongs to a wavelength band of central wavelength $\lambda B_m \pm$ wavelength band width $\Delta\lambda m$; a 1×J wavelength-band demultiplexer, where J being an integer greater than or equal to 2, which has J output ports OP[1], OP[2], OP[3], . . . OP[J] and a single input port, and outputs at the J output ports optical signals of wavelengths which belong to the wavelength band widths of central wavelength $\lambda B_1 \pm$ wavelength band width $\Delta\lambda_1$, central wavelength $\lambda B_2 \pm$ wavelength band width $\Delta\lambda_2$, central wavelength $\lambda B_3 \pm$wavelength band width $\Delta\lambda_3, \ldots$, central wavelength $\lambda B_J \pm$wavelength band width $\Delta\lambda_J$, which are inputted to the single input port, where $\lambda B_m + \Delta\lambda_m = \lambda B_{m+1} - \Delta\lambda_{m+1}$, for 1=m=J, where m being an integer; an optical receiver which is connected to that output port, among the output ports OP[1], OP[2], OP[3], ... OP[J] of the 1×J wavelength-band demultiplexer, which belongs to the wavelength band to which the wavelength-tunable optical light source integrated optical transmitter is provided, and which receives an optical signal of the wavelength which is outputted from the wavelength-tunable optical light source integrated optical transmitter; a plurality of wavelength division demultiplexers which are provided to each of the output ports of the 1×J wavelength-band demultiplexer, except for the output port to which the optical receiver is connected, which have two or more output ports and a single input port, and the input port is connected to one of the output ports of the 1×J wavelength-band demultiplexer; and a plurality of optical receivers which are connected to the output ports of the wavelength division demultiplexers; and wherein the single input port of the 1×J wavelength-band demultiplexer is connected via an optical waveguide to one of the device output ports of the wavelength-routing device, and wherein the optical path management device comprises: a means which, if at least one group of the wavelength-tunable optical light source integrated optical transmitters exists which are provided to all the communication nodes and which output optical signals of the same wavelength band, and if there are K wavelength bands, where K being an integer greater than or equal to 2, which belong to the input ports of the J×1 wavelength-band multiplexer which are connected to the wavelength-tunable optical light source integrated optical transmitters, assigns mutually different priority rankings from 1 to K to the wavelength bands which belong to the input ports of the J×1 wavelength-band multiplexer which are connected to the wavelength-tunable optical light source integrated optical transmitters; a means which detects that, among the wavelength bands which belong to the input ports of the J×1 wavelength-band multiplexer which are connected to the wavelength-tunable optical light source integrated optical transmitters, the highest numbered priority ranking among the wavelength bands of optical paths between x-th communication node and y-th communication node is number b, and the lowest numbered priority ranking among the wavelength bands which are not used for an optical path whose start point is the x-th communication node, an optical path whose end point is the x-th communication node, an optical path whose start point is the y-th communication node, and an optical path whose end point is the y-th communication node is number a, and the number a is smaller than the number b; and a means which, if it has been detected that the number a is smaller than the number b, establishes an optical path between the x-th communication node and the y-th communication node upon the wavelength band of a-th priority ranking, and thereafter controls ON/OFF and an oscillation wavelength of the wavelength-tunable optical light source integrated optical transmitter so as to cancel the optical path which was established between the x-th communication node and the y-th communication node upon the wavelength band of b-th priority ranking.

Furthermore, the present invention is an optical path management method which controls an optical path between two different communication nodes in an optical communication network system which comprises a plurality of communication nodes, a wavelength-routing device which establishes communication between the communication nodes based upon route control according to the wavelength of an optical signal, and an optical transmission line which forms a communication path which connects the communication nodes and the wavelength-routing device, wherein the wavelength-routing device comprises: N device input ports, where N being an integer greater than or equal to 2, which are connected via the optical transmission line to the communication nodes; N device output ports which are connected via the optical transmission line to the communication nodes; a plurality of wavelength-band demultiplexers which are provided to each of the N device input ports, and each has a single input port and a plurality of output ports, and the input port is connected to one of the device input ports; a plurality of wavelength-band multiplexers which are provided to each of the N device output ports, and each has a plurality of input ports and a single output port, and the output port is connected to one of the device output ports; and R K×K arrayed-waveguide gratings, where R being an integer greater than or equal to J and J being an integer greater than or equal to 2, which have K input ports and K output ports, where K being an integer that satisfies K=N, which have wavelength-routing characteristics in which optical signals having different wavelengths which are inputted to one input port are output at different output ports depending on the wavelengths of the inputted optical signals and in which optical signals having different wavelengths which are outputted from one output port are optical signals which have been inputted to different input ports, wherein the wavelength-band demultiplexers comprise a means which demultiplexes by wavelength band a wavelength division multiplexed optical signal in which a predetermined number of wavelengths have been wavelength division multiplexed for each wavelength band which is transmitted from the communication nodes, where wavelength band=central wavelength $\lambda B_m \pm$wavelength band width $\Delta\lambda_m$, with $\lambda B_m + \Delta\lambda_m = \lambda B_{m+1} - \Delta\lambda_{m+1}$, where 1=m=R−1, with m being an integer, and outputs the results at different output ports, the wavelength-band multiplexers comprise a means which multiplexes optical signals which have been inputted from the plurality of input ports for each wavelength band and which outputs a wavelength division multiplexed signal in which a predetermined number of wavelengths have been wavelength division multiplexed at the output port, the K×K arrayed-waveguide gratings are provided with a wavelength-routing characteristic for each wavelength band of central wavelength $\lambda B_1 \pm$wavelength band width $\Delta\lambda_1$, central wavelength $\lambda B_2 \pm$wavelength band width $\Delta\lambda_2$ ($\lambda B_1 + \alpha\lambda_1 < \lambda B_2 - \Delta\lambda_2$), central wavelength $\lambda B_3 \pm$wavelength band width $\Delta\lambda_3$ ($\lambda B_2 + \Delta\lambda_2 < \lambda B_3 - \Delta\lambda_3$), . . . central wavelength $\lambda B_R \pm$wavelength band width $\Delta\lambda_R$ ($\lambda B_{R-1} + \Delta\lambda_{R-1} < \lambda B_R - \Delta\lambda_R$), the output ports of the wavelength-band demultiplexers which are respectively connected to the N device input ports are one to one connected to the input ports of the K×K arrayed-waveguide gratings which have wavelength-routing characteristics at the wavelength bands of the optical signals which are outputted from the output ports of the wavelength-band demultiplexers, and the output ports of the K×K arrayed-waveguide gratings are one to one connected to the input ports of any one of the plurality of wavelength-band multiplexers which can multiplex optical signals of wavelengths which belong to the wavelength bands of the optical signals which are outputted from the output ports of the K×K arrayed-waveguide gratings, and each of the communication nodes comprises: a J×1 wavelength-band multiplexer, where J being an integer greater than or equal to 2, which has J input ports IP[1], IP[2], IP[3], . . . IP[J] and a single output port, and outputs at the single output port optical signals of wavelengths which belong to the wavelength bands of central wavelength $\lambda B_1 \pm$ wavelength band width $\Delta\lambda_1$, central wavelength $\lambda B_2 \pm$ wavelength band width $\Delta\lambda_2$, central wavelength $\lambda B_3 \pm$ wavelength band width $\Delta\lambda_3$, . . . , central wavelength $\lambda B_J \pm$ wavelength band width $\Delta\lambda_J$, which are inputted to each of the J input ports, where $\lambda B_m + \Delta\lambda_m = \lambda B_{m+1} - \Delta\lambda_{m+1}$, for 1=m=J-1, where m being an integer; at least one wavelength-tunable optical light source integrated optical transmitter which is connected to any one of the input ports IP [1], IP [2], IP [3], . . . IP [J] of the J×1 wavelength-band multiplexer, which is provided with a wavelength-tunable optical light source which can be set to a wavelength within a wavelength band which belongs to the input port which is connected, and which outputs light of the wavelength; a plurality of wavelength division multiplexers which are provided to each of the input ports of the J×1 wavelength-band multiplexer, other than the input port to which the wavelength-tunable optical light source integrated optical transmitter is connected, and which have two or more input ports and one output port, with the output port being connected to one of the input ports of the J×1 wavelength-band multiplexer; a plurality of optical transmitters which are connected to the input ports of the wavelength division multiplexer, and which emit light of wavelength which belongs to a wavelength band of central wavelength $\lambda Bm \pm$ wavelength band width $\Delta\lambda m$; a 1×J wavelength-band demultiplexer, where J being an integer greater than or equal to 2, which has J output ports OP[1], OP[2], OP[3], . . . OP[J] and a single input port, and outputs at the J output ports optical signals of wavelengths which belong to the wavelength band widths of central wavelength $\lambda B_1 \pm$ wavelength band width $\Delta\lambda_1$, central wavelength $\lambda B_2 \pm$ wavelength band width $\Delta\lambda_2$, central wavelength $\lambda B_3 \pm$ wavelength band width $\Delta\lambda_3$, . . . central wavelength $\lambda B_J \pm$ wavelength band width $\Delta\lambda_J$, which are inputted to the single input port, where $\lambda B_m + \Delta\lambda_m = \lambda B_{m+1} - \Delta\lambda_{m+1}$, for 1=m=J, where m being an integer; an optical receiver which is connected to that output port, among the output ports OP[1], OP[2], OP[3], . . . OP[J] of the 1×J wavelength-band demultiplexer, which belongs to the wavelength band to which the wavelength-tunable optical light source integrated optical transmitter is provided, and which receives an optical signal of the wavelength which is outputted from the wavelength-tunable optical light source integrated optical transmitter; a plurality of wavelength division demultiplexers which are provided to each of the output ports of the 1×J wavelength-band demultiplexer, except for the output port to which the optical receiver is connected, which have two or more output ports and a single input port, and the input port is connected to one of the output ports of the 1×J wavelength-band demultiplexer; and a plurality of optical receivers which are connected to the output ports of the wavelength division demultiplexers, and wherein the single input port of the 1×J wavelength-band demultiplexer is connected via an optical waveguide to one of the device output ports of the wavelength-routing device, and the optical path management method comprises: a step of, if at least one group of the wavelength-tunable optical light source integrated optical transmitters exists which are provided to all the communication nodes and which output optical signals of the same wavelength band, and if there are K wavelength bands, where K being an integer greater than or equal to 2, which belong to the input ports of the J×1 wavelength-band multiplexer which are connected to the wavelength-tunable optical light source integrated optical transmitters, assigning mutually different priority rankings from 1 to K to the wavelength bands which belong to the input ports of the J×1 wavelength-band multiplexer which are connected to the wavelength-tunable optical light source integrated optical transmitters; a step of, when, among the wavelength bands which belong to the input ports of the J×1 wavelength-band multiplexer which are connected to the wavelength-tunable optical light source integrated optical transmitter, the highest numbered priority ranking among the wavelength bands for which an optical path exists between x-th communication node and y-th communication node is number b, and the lowest numbered priority ranking among the wavelength bands for which an optical path whose start point is the x-th communication node, an optical path whose end point is the x-th communication node, an optical path whose start point is the y-th communication node, and an optical path whose end point is the y-th communication node do not exist is number a, and the number a is smaller than the number b; and controlling ON/OFF and an oscillation wavelength of the wavelength-tunable optical light source integrated optical transmitter so as to establish an optical path between the x-th communication node and the y-th communication node upon the wavelength band of a-th priority ranking; and a step of establishing an optical path between the x-th communication node and the y-th communication node upon the wavelength band of the a-th priority ranking, and thereafter controlling ON/OFF and the oscillation wavelength of the wavelength-tunable optical light source integrated optical transmitter so as to cancel the optical path which was established between the x-th communication node and the y-th communication node upon the wavelength band of b-th priority ranking.

Yet further, the present invention is an optical path management program which causes a computer to execute the steps of the above-described optical path management method.

Even yet further, the present invention is a recording medium which can be read by a computer, upon which this optical path management program is recorded.

BRIEF DESCRIPTION OF DRAWINGS

FIG. 4 is a figure showing the relationship between the input and output ports of an arrayed-waveguide grating and wavelengths, for the first embodiment according to the present invention.

FIG. 5 is a figure showing the relationship between the input and output ports of an arrayed-waveguide grating and wavelength, for the first embodiment according to the present invention.

FIG. 6 is a figure showing the relationship between the input and output ports of an arrayed-waveguide grating and wavelength, for the first embodiment according to the present invention.

FIG. 7 is a figure showing the relationship between the input and output ports of an arrayed-waveguide grating and wavelength, for the first embodiment according to the present invention.

FIG. 13 is a block diagram for explanation of the structure of an optical transceiver section of respective communication nodes of the fourth embodiment according to the present invention.

FIG. 17 is a figure showing an example of a database of an optical path management device of the fourth embodiment according to the present invention.

FIG. 18 is a structural diagram of the fifth embodiment according to the present invention.

FIGS. 19A through 19D are explanatory figures showing an example of a database in which optical paths of an optical matrix switch is recorded.

FIG. 20 is a flowchart of the processing of the optical path management device of the fifth embodiment according to the present invention.

FIG. 25 is a block diagram showing the structure of a conventional optical communication network system based on wavelength path routing which is implemented using an arrayed-waveguide grating.

FIG. 26 is a figure showing the relationship between the input and output ports of the conventional arrayed-waveguide grating and wavelengths.

FIG. 27 is a figure showing the relationship between the input and output ports of the conventional arrayed-waveguide grating and wavelengths.

FIGS. 31A through 31D are explanatory figures showing an example of optical paths between input optical fibers and output optical fibers, when the optical paths are not arranged.

BEST MODE FOR CARRYING OUT THE INVENTION

In the following, respective embodiments according to the present invention will be explained based upon the figures.

It should be understood that although, in the first through the fourth embodiments according to the present invention, the explanation is made by taking 4 as the number N of both the device input ports and the device output ports of the wavelength-routing device in the optical communication network system according to the present invention, this is not to be considered as being limiting; provided that N is an integer greater than or equal to 2, this will be acceptable.

The First Embodiment

Figure 1:
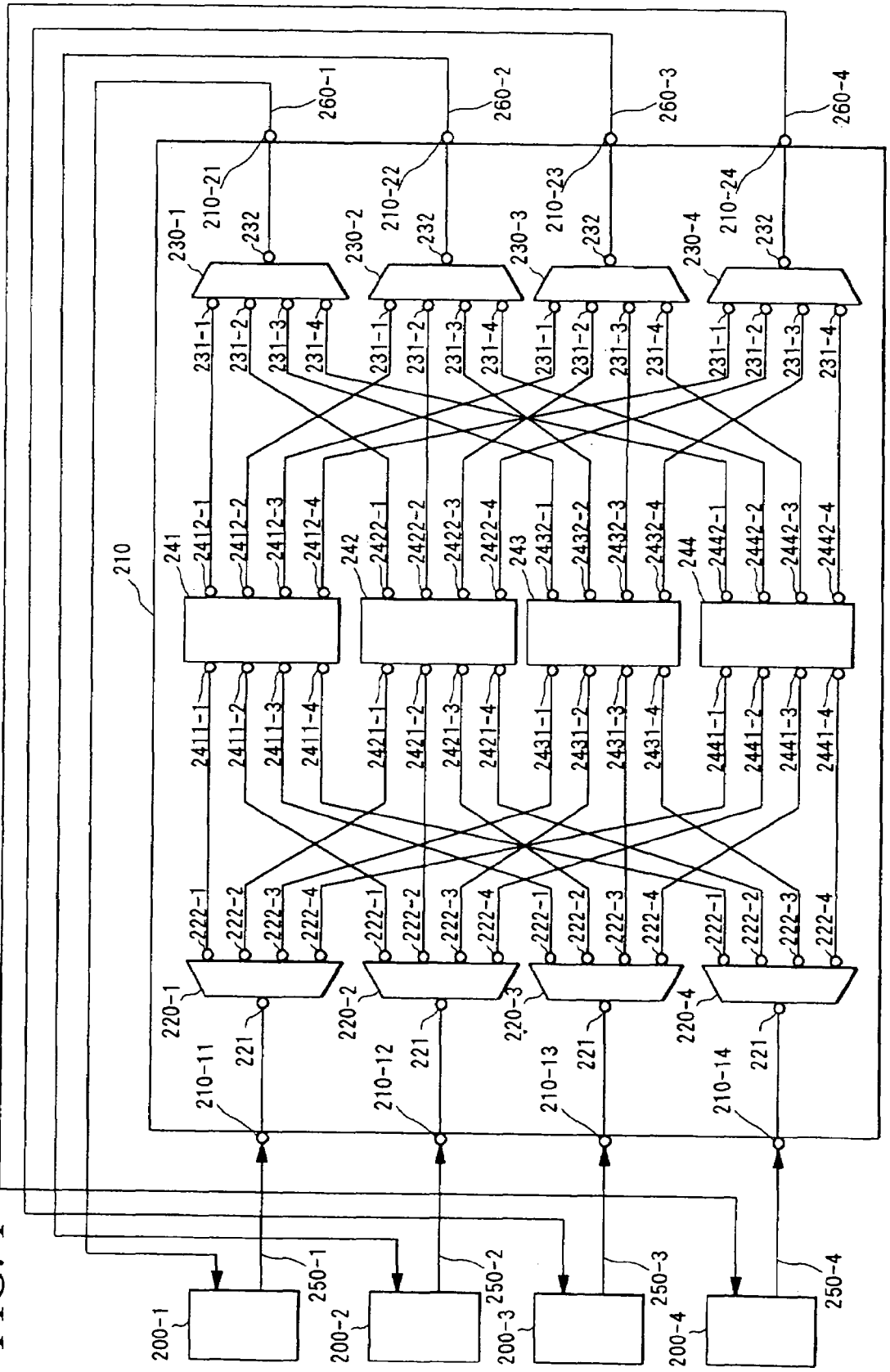
FIG. 1 is a figure showing the overall structure of an optical communication system according to the first embodiment according to the present invention.

FIG. 1 is a structural figure showing the optical communication network system of the first embodiment according to the present invention. In FIG. 1, 200-1 through 200-4 are communication nodes, 210 is a wavelength-routing device, and 250-1 through 250-4 and 260-1 through 260-4 are optical transmission lines (optical fibers) which connect the communication nodes 200-1 through 200-4 and the wavelength-routing device 210.

Furthermore, the wavelength-routing device 210 comprises four device input ports 210-11 through 210-14 and four device output ports 210-21 through 210-24, wavelength-band demultiplexers 220-1 through 220-4, wavelength-band multiplexers 230-1 through 230-4, and 4×4 arrayed-waveguide gratings 241 through 244.

The communication node 200-1, along with being connected to the first device input port 210-11 of the wavelength-routing device 210 via the optical transmission line 250-1, is also connected to the first device output port 210-21 of the wavelength-routing device 210 via the optical transmission line 260-1.

The communication node 200-2, along with being connected to the second device input port 210-12 of the wavelength-routing device 210 via the optical transmission line 250-2, is also connected to the second device output port 210-22 of the wavelength-routing device 210 via the optical transmission line 260-2.

The communication node 200-3, along with being connected to the third device input port 210-13 of the wavelength-routing device 210 via the optical transmission line 250-3, is also connected to the third device output port 210-23 of the wavelength-routing device 210 via the optical transmission line 260-3.

The communication node 200-4, along with being connected to the fourth device input port 210-14 of the wavelength-routing device 210 via the optical transmission line 250-4, is also connected to the fourth device output port 210-24 of the wavelength-routing device 210 via the optical transmission line 260-4.

Each of the wavelength-band demultiplexers 220-1 through 220-4 comprises a single input port 221 and four output ports 222-1 through 222-4, and the input port 221 of the first wavelength-band demultiplexer 220-1 is connected to the first device input port 210-11. Furthermore, the input port 221 of the second wavelength-band demultiplexer 220-2 is connected to the second device input port 210-12, the input port 221 of the third wavelength-band demultiplexer 220-3 is connected to the third device input port 210-13, and the input port 221 of the fourth wavelength-band demultiplexer 220-4 is connected to the fourth device input port 210-14.

Each of the wavelength-band multiplexers 230-1 through 230-4 comprises a single output port 232 and four input ports 232-1 through 232-4, and the output port 232 of the first wavelength-band multiplexer 230-1 is connected to the first device output port 210-11. Furthermore, the output port 232 of the second wavelength-band multiplexer 230-2 is connected to the second device output port 210-22, the output port 232 of the third wavelength-band multiplexer 230-3 is connected to the third device output port 210-23, and the output port 232 of the fourth wavelength-band multiplexer 230-4 is connected to the fourth device output port 210-24.

It should be understood that each of the wavelength-band demultiplexers 220-1 through 220-4 and each of the wavelength-band multiplexers 230-1 through 230-4 may, for example, be made using a dielectric multilayer filter, an optical coupler which is made with an optical fiber, or an optical coupler which is made with a planar optical waveguide, or the like.

The 4×4 arrayed-waveguide grating 241 is made, for example, from a quartz type optical waveguide, and, along with having a cyclic-wavelength characteristic, also has four input ports 2411-1 through 2411-4 and four output ports 2412-1 through 2412-4; and the first through the fourth input ports 2411-1 through 2411-4 are respectively connected in one to one correspondence to the first output ports 222-1 of the first through the fourth wavelength-band demultiplexers 220-1 through 220-4 in the order described, while the first through the fourth output ports 2412-1 through 2412-4 are respectively connected in one to one correspondence to the first input ports 231-1 of the first through the fourth wavelength-band multiplexers 230-1 through 230-4 in the order described.

The 4×4 arrayed-waveguide grating 242 has four input ports 2421-1 through 2421-4 and four output ports 2422-1 through 2422-4; and the first through the fourth input ports 2421-1 through 2421-4 are respectively connected in one to one correspondence to the second output ports 222-2 of the first through the fourth wavelength-band demultiplexers 220-1 through 220-4 in the order described, while the first through the fourth output ports 2422-1 through 2422-4 are respectively connected in one to one correspondence to the second input ports 231-2 of the first through the fourth wavelength-band multiplexers 230-1 through 230-4 in the order described.

The 4×4 arrayed-waveguide grating 243 has four input ports 2431-1 through 2431-4 and four output ports 2432-1 through 2432-4; and the first through the fourth input ports 2431-1 through 2431-4 are respectively connected in one to one correspondence to the third output ports 222-3 of the first through the fourth wavelength-band demultiplexers 220-1 through 220-4 in the order described, while the first through the fourth output ports 2432-1 through 2432-4 are respectively connected in one to one correspondence to the third input ports 231-3 of the first through the fourth wavelength-band multiplexers 230-1 through 230-4 in the order described.

The 4×4 arrayed-waveguide grating 244 has four input ports 2441-1 through 2441-4 and four output ports 2442-1 through 2442-4; and the first through the fourth input ports 2441-1 through 2441-4 are respectively connected in one to one correspondence to the fourth output ports 222-4 of the first through the fourth wavelength-band demultiplexers 220-1 through 220-4 in the order described, while the first through the fourth output ports 2442-1 through 2442-4 are respectively connected in one to one correspondence to the fourth input ports 231-4 of the first through the fourth wavelength-band multiplexers 230-1 through 230-4 in the order described.

Next, the components which make up the wavelength-routing device 210 will be explained in detail.

Figure 2:
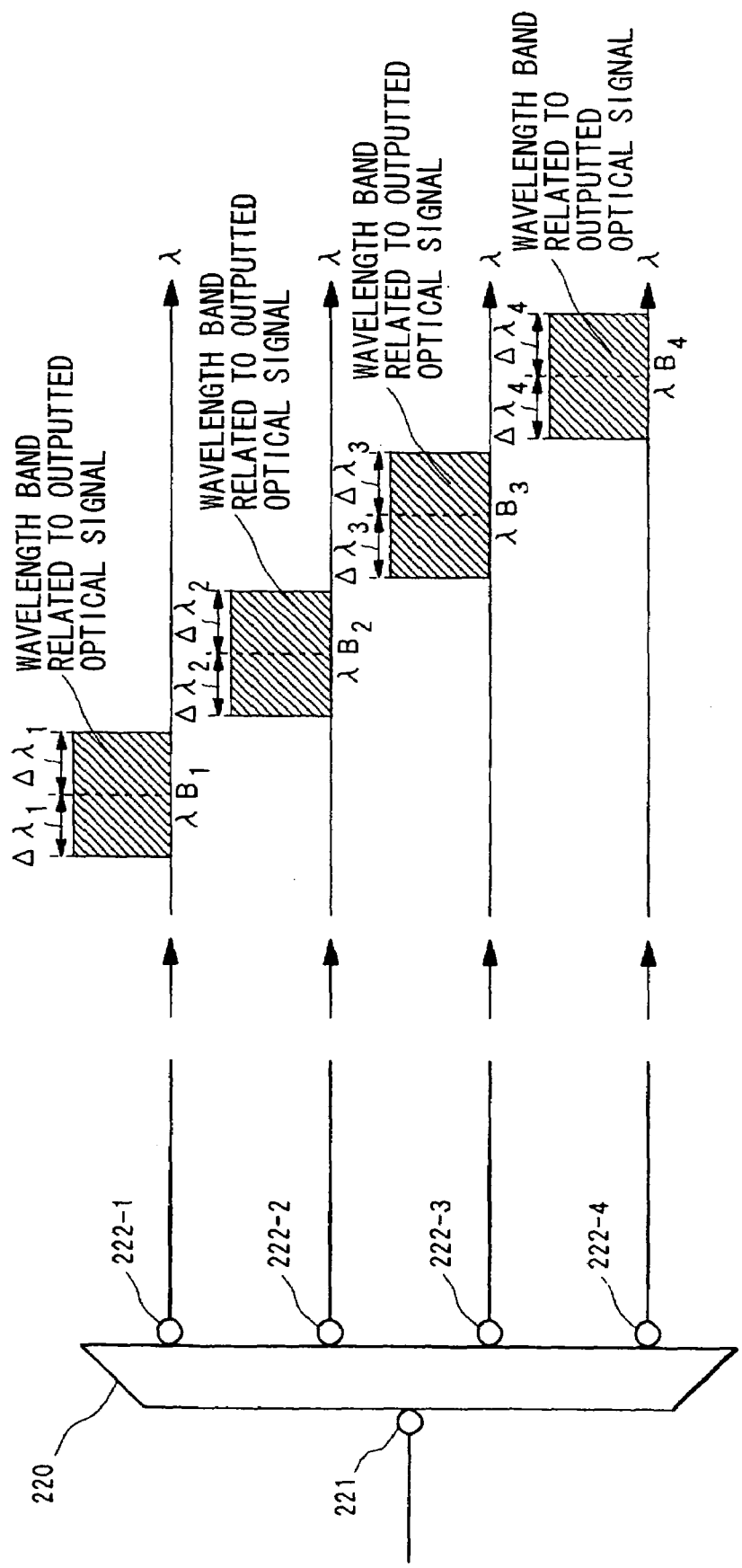
FIG. 2 is a figure for explanation of a wavelength-band demultiplexer of the optical communication system according to the first embodiment according to the present invention.

As shown in FIG. 2, the wavelength-band demultiplexer 220 (220-1 through 220-4) has a single input port 221 and four output ports 222-1 through 222-4, and an optical signal whose wavelength is included in the wavelength band $\lambda B_1 \pm \Delta\lambda_1$ (where $\lambda B_1$ and $\Delta\lambda_1$ respectively denote wavelengths) is outputted from the first output port 222-1, while an optical signal whose wavelength is included in the wavelength band $\lambda B_2 \pm \Delta\lambda_2$ (where $\lambda B_2$ and $\Delta\lambda_2$ respectively denote wavelengths) is outputted from the second output port 222-2. Furthermore, an optical signal whose wavelength is included in the wavelength band $\lambda B_3 \pm \Delta\lambda_3$ (where $\lambda B_3$ and $\Delta\lambda_3$ respectively denote wavelengths) is outputted from the third output port 222-3, while an optical signal whose wavelength is included in the wavelength band $\lambda B_4 \pm \Delta\lambda_4$ (where $\lambda B_4$ and $\Delta\lambda_4$ respectively denote wavelengths) is outputted from the fourth output port 222-4.

This embodiment employs the wavelength-band demultiplexers 220-1 through 220-4 which use dielectric multilayer filters, $\lambda B_1 = 1511$ nm, $\lambda B_2 = 1531$ nm, $\lambda B_3 = 1551$ nm, $\lambda B_4 = 1571$ nm, and $\Delta\lambda_1 = \Delta\lambda_2 = \Delta\lambda_3 = \Delta\lambda_4 = 9$ nm.

Figure 3:
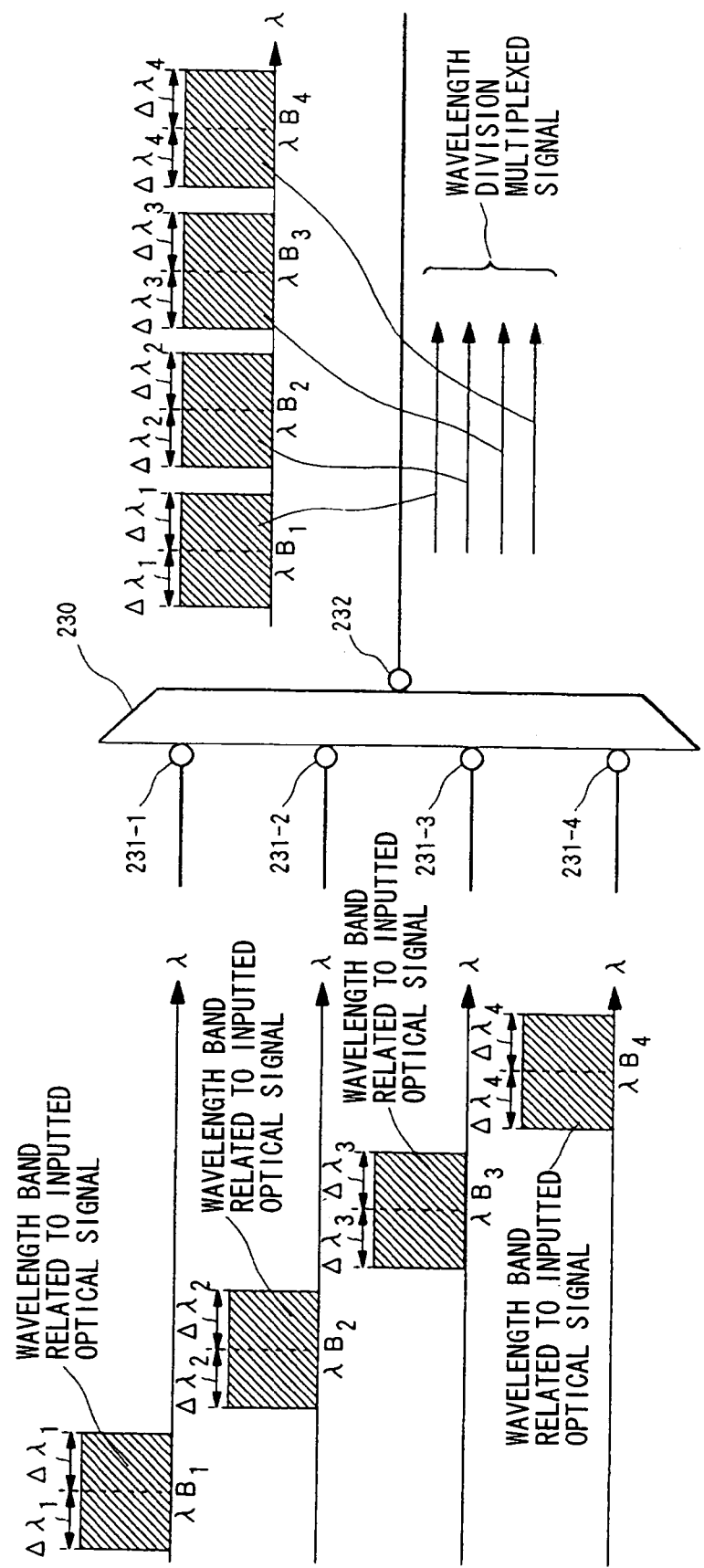
FIG. 3 is a figure for explanation of a wavelength-band multiplexer of the optical communication system according to the first embodiment according to the present invention.

As shown in FIG. 3, the wavelength-band multiplexer 230 (230-1 through 230-4) has four input ports 231-1 through 231-4 and a single output port 232; and: an optical signal whose wavelength is included in the wavelength band $\lambda B_1 \pm \Delta\lambda_1$ (where $\lambda B_1$ and $\Delta\lambda_1$ respectively denote wavelengths) is inputted to the first input port 231-1; an optical signal whose wavelength is included in the wavelength band $\lambda B_2 \pm \Delta\lambda_2$ (where $\lambda B_2$ and $\Delta\lambda_2$ respectively denote wavelengths) is inputted to the second input port 231-2; an optical signal whose wavelength is included in the wavelength band $\lambda B_3 \pm \Delta\lambda_3$ (where $\lambda B_3$ and $\alpha\lambda_3$ respectively denote wavelengths) is inputted to the third input port 231-3; and an optical signal whose wavelength is included in the wavelength band $\lambda B_4 \pm \Delta\lambda_4$ (where $\lambda B_4$ and $\Delta\lambda_4$ respectively denote wavelengths) is inputted to the fourth input port 231-4; and the optical signals which have been inputted to these four input ports 231-1 through 231-4 are multiplexed and are outputted from the output port 232.

This embodiment uses the wavelength-band multiplexers 230-1 through 230-4 which use dielectric multilayer filters, $\lambda B_1 = 1511$ nm, $\lambda B_2 = 1531$ nm, $\lambda B_3 = 1551$ nm, $\lambda B_4 = 1571$ nm, and $\Delta\lambda_1 = \Delta\lambda_2 = \Delta\lambda_3 = \Delta\lambda_4 = 9$ nm.

As previously described, the arrayed-waveguide gratings 241 through 244 have four input ports and four output ports, and the arrayed-waveguide grating 241 is one whose wavelength-routing characteristic is designed for a wavelength which is included in the wavelength band $\lambda B_1 \pm \alpha\lambda_1$, and the relationship between its respective input and output ports and the wavelengths $\lambda 11$, $\lambda 12$, $\lambda 13$, and $\lambda 14$ is as shown in FIG. 4. Moreover, it is arranged for $\lambda 11$, $\lambda 12$, $\lambda 13$, and $\lambda 14$ to be mutually different, and for the relationship $\lambda B_1 - \Delta\lambda_1 < \lambda 11, \lambda 12, \lambda 13, \lambda 14 < \lambda B_1 + \Delta\lambda_1$ to be satisfied.

The arrayed-waveguide grating 242 is one whose wavelength-routing characteristic is designed for a wavelength which is included in the wavelength band $\lambda B_2 \pm \Delta\lambda_2$, and the relationship between its respective input and output ports and the wavelengths $\lambda 21, \lambda 22, \lambda 23$, and $\lambda 24$ is as shown in FIG. 5. Moreover, it is arranged for $\lambda 21, \lambda 22, \lambda 23$, and $\lambda 24$ to be mutually different, and for the relationship $\lambda B_2 - \Delta\lambda_2 < \lambda 21, \lambda 22, \lambda 23, \lambda 24 < \lambda B_2 + \Delta\lambda_2$ to be satisfied.

The arrayed-waveguide grating 243 is one whose wavelength-routing characteristic is designed for a wavelength which is included in the wavelength band $\lambda B_3 \pm \Delta\lambda_3$, and the relationship between its respective input and output ports and the wavelengths $\lambda 31, \lambda 32, \lambda 33$, and $\lambda 34$ is as shown in FIG. 6. Moreover, it is arranged for $\lambda 31, \lambda 32, \lambda 33$, and $\lambda 34$ to be mutually different, and for the relationship $\lambda B_3 - \Delta\lambda_3 < \lambda 31, \lambda 32, \lambda 33, \lambda 34 < \lambda B_3 + \Delta\lambda_3$ to be satisfied.

The arrayed-waveguide grating 244 is one whose wavelength-routing characteristic is designed for a wavelength in included in the wavelength band $\lambda B_4 \pm \Delta\lambda_4$, and the relationship between its respective input and output ports and the wavelengths $\lambda 41, \lambda 42, \lambda 43$, and $\lambda 44$ is as shown in FIG. 7. Moreover, it is arranged for $\lambda 41, \lambda 42, \lambda 43$, and $\lambda 44$ to be mutually different, and for the relationship $\lambda B_4 - \Delta\lambda_4 < \lambda 41, \lambda 42, \lambda 43, \lambda 44 < \lambda B_4 + \Delta\lambda_4$ to be satisfied.

It should be understood that, in this embodiment, quartz type optical waveguide types are used as the arrayed-waveguide gratings 241 through 244.

Next, the structure of the communication nodes 200-1 through 200-4 will be explained.

Figure 8:
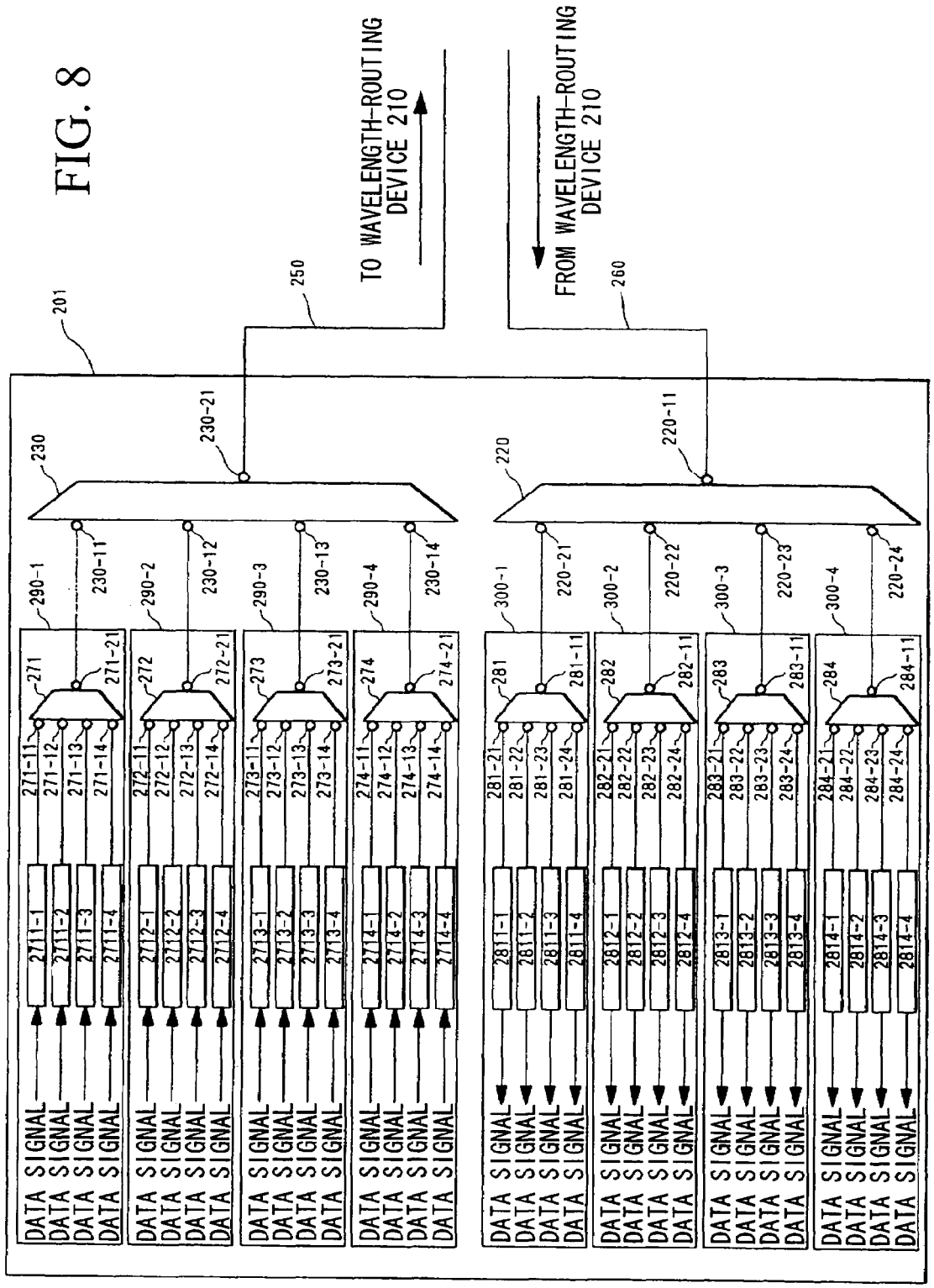
FIG. 8 is a block diagram showing the structure of optical transceiver sections of respective communication nodes, in the first embodiment according to the present invention.

FIG. 8 is a block diagram showing the structure of the optical transceiver section of each of the communication nodes 200-1 through 200-4. In FIG. 8, 201 denotes an optical transceiver section, 250 denotes an optical transmission line which conducts the optical signals which have been outputted from the communication node 200-1 through 200-4 to the wavelength-routing device 210, and 260 is an optical transmission line which conducts the optical signal which has been outputted from the wavelength-routing device 210 to the communication nodes 200-1 through 200-4.

The optical transceiver section 201 comprises a wavelength-band multiplexer 230 which has four input ports and one output port, a wavelength-band demultiplexer 220 which has one input port and four output ports, four optical transmission sections 290-1 through 290-4, and four optical reception sections 300-1 through 300-4.

It should be understood that each of the wavelength-band demultiplexer 220 and the wavelength-band multiplexer 230 is made using, for example, a dielectric multilayer filter, an optical coupler which is made with an optical fiber, or an optical coupler which is made with a planar optical waveguide, or the like.

The optical transmission line 250 is connected to the output port 230-21 of the wavelength-band multiplexer 230, and the optical signal output from the first optical transmission section 290-1 is inputted to the first input port 230-11. Furthermore, the optical signal output from the second optical transmission section 290-2 is inputted to the second input port 230-12 of the wavelength-band multiplexer 230; the optical signal output from the third optical transmission section 290-3 is inputted to the third input port 230-13; and the optical signal output from the fourth optical transmission section 290-4 is inputted to the fourth input port 230-14.

The first optical transmission section 290-1 is an optical transmission section of the wavelength band $\lambda B_1 \pm \Delta\lambda_1$, and comprises a wavelength division multiplexer 271 which has four input ports 271-11 through 271-14 and one output port 271-21, and four optical transmitters 2711-1 through 2711-4 which are connected to the input ports 271-11 through 271-14. Furthermore, the optical transmitters 2711-1 through 2711-4 convert electrical data signals which have been inputted into optical signals of respective wavelengths $\lambda 11, \lambda 12, \lambda 13$, and $\lambda 14$ and outputs them.

The second optical transmission section 290-2 is an optical transmission section of the wavelength band $\lambda B_2 \pm \Delta\lambda_2$, and comprises a wavelength division multiplexer 272 which has four input ports 272-11 through 272-14 and one output port 272-21, and four optical transmitters 2712-1 through 2712-4 which are connected to the input ports 272-11 through 272-14. Furthermore, the optical transmitters 2712-1 through 2712-4 convert electrical data signals which have been inputted into optical signals of respective wavelengths $\lambda 21, \lambda 22, \lambda 23$, and $\lambda 24$ and outputs them.

The third optical transmission section 290-3 is an optical transmission section of the wavelength band $\lambda B_3 \pm \Delta\lambda_3$, and comprises a wavelength division multiplexer 273 which has four input ports 273-11 through 273-14 and one output port 273-21, and four optical transmitters 2713-1 through 2713-4 which are connected to the input ports 273-11 through 273-14. Furthermore, the optical transmitters 2713-1 through 2713-4 convert electrical data signals which have been inputted into optical signals of respective wavelengths $\lambda 31, \lambda 32, \lambda 33$, and $\lambda 34$ and outputs them.

The fourth optical transmission section 290-4 is an optical transmission section of the wavelength band $\lambda B_4 \pm \Delta\lambda_4$, and comprises a wavelength division multiplexer 274 which has four input ports 274-11 through 274-14 and one output port 274-21, and four optical transmitters 2714-1 through 2714-4 which are connected to the input ports 274-11 through 274-14. Furthermore, the optical transmitters 2714-1 through 2714-4 convert electrical data signals which have been inputted into optical signals of respective wavelengths $\lambda 41, \lambda 42, \lambda 43$, and $\lambda 44$ and outputs them.

The optical transmission line 260 is connected to the input port 220-11 of the wavelength-band demultiplexer 220, and the optical signal which is outputted from the first output port 220-21 is inputted to the first optical reception section 300-1. Furthermore, the optical signal which is outputted from the second output port 220-22 of the wavelength-band demultiplexer 220 is inputted to the second optical reception section 300-2, the optical signal which is outputted from the third output port 220-23 is inputted to the third optical reception section 300-3, and the optical signal which is outputted from the fourth output port 220-24 is inputted to the fourth optical reception section 300-4.

The first optical reception section 300-1 comprises a wavelength division demultiplexer 281 which comprises one input port 281-11 and four output ports 281-21 through 281-24, and four optical receivers 2811-1 through 2811-4 which are connected to the output ports 281-21 through 281-24.

The wavelength division demultiplexer 281 is one whose wavelength division demultiplexing characteristic is designed for a wavelength which is included in the wavelength band $\lambda B_1 \pm \Delta\lambda_1$, and, when optical signals of wavelengths $\lambda 11, \lambda 12, \lambda 13$, and $\lambda 14$ are inputted to its input port 281-11, the optical signal of the wavelength $\lambda 11$ is outputted at the first output port 281-21, the optical signal of the wavelength $\lambda 12$ is outputted at the second output port 281-22, the optical signal of the wavelength $\lambda 13$ is outputted at the third output port 281-23, and the optical signal of the wavelength $\lambda 14$ is outputted at the fourth output port 281-

24. Furthermore, each of the four optical receivers 2811-1 through 2811-4 converts the optical signal which has been inputted into an electrical signal, and outputs it as a data signal.

The second optical reception section 300-2 comprises a wavelength division demultiplexer 282 which comprises one input port 282-11 and four output ports 282-21 through 282-24, and four optical receivers 2812-1 through 2812-4 which are connected to the output ports 282-21 through 282-24.

The wavelength division demultiplexer 282 is one whose wavelength division demultiplexing characteristic is designed for a wavelength which is included in the wavelength band $\lambda B_2 \pm \Delta \lambda_2$, and, when optical signals of wavelengths $\lambda 21$, $\lambda 22$, $\lambda 23$, and $\lambda 24$ are inputted to its input port 282-11, the optical signal of the wavelength $\lambda 21$ is outputted at the first output port 282-21, the optical signal of the wavelength $\lambda 22$ is outputted at the second output port 282-22, the optical signal of the wavelength $\lambda 23$ is outputted at the third output port 282-23, and the optical signal of the wavelength $\lambda 24$ is outputted at the fourth output port 282-24. Furthermore, each of the four optical receivers 2812-1 through 2812-4 converts the optical signal which has been inputted into an electrical signal, and outputs it as a data signal.

The third optical reception section 300-3 comprises a wavelength division demultiplexer 283 which comprises one input port 283-11 and four output ports 283-21 through 283-24, and four optical receivers 2813-1 through 2813-4 which are connected to the output ports 283-21 through 283-24.

The wavelength division demultiplexer 283 is one whose wavelength division demultiplexing characteristic is designed for a wavelength which is included in the wavelength band $\lambda B_3 \pm \alpha \lambda_3$, and, when optical signals of wavelengths $\lambda 31$, $\lambda 32$, $\lambda 33$, and $\lambda 34$ are inputted to its input port 283-11, the optical signal of the wavelength $\lambda 31$ is outputted at the first output port 283-21, the optical signal of the wavelength $\lambda 32$ is outputted at the second output port 283-22, the optical signal of the wavelength $\lambda 33$ is outputted at the third output port 283-23, and the optical signal of the wavelength $\lambda 34$ is outputted at the fourth output port 283-24. Furthermore, each of the four optical receivers 2813-1 through 2813-4 converts the optical signal which has been inputted into an electrical signal, and outputs it as a data signal.

The fourth optical reception section 300-4 comprises a wavelength division demultiplexer 284 which comprises one input port 284-11 and four output ports 284-21 through 284-24, and four optical receivers 2814-1 through 2814-4 which are connected to the output ports 284-21 through 284-24.

The wavelength division demultiplexer 284 is one whose wavelength division demultiplexing characteristic is designed for a wavelength which is included in the wavelength band $\lambda B_4 \pm \Delta \lambda_4$, and, when optical signals of wavelengths $\lambda 41$, $\lambda 42$, $\lambda 43$, and $\lambda 44$ are inputted to its input port 284-11, the optical signal of the wavelength $\lambda 41$ is outputted at the first output port 284-21, the optical signal of the wavelength $\lambda 42$ is outputted at the second output port 284-22, the optical signal of the wavelength $\lambda 43$ is outputted at the third output port 284-23, and the optical signal of the wavelength $\lambda 44$ is outputted at the fourth output port 284-24. Furthermore, each of the four optical receivers 2814-1 through 2814-4 converts the optical signal which has been inputted into an electrical signal, and outputs it as a data signal.

Next, the operation of the optical communication network system according to this first embodiment according to the present invention will be explained with reference to FIGS. 1 through 8. Here, by way of example, the case in which the communication node 200-1 performs data communication with the communication node 200-3 will be explained.

At the communication node 200-1, the optical signal S13-p of the wavelength $\lambda p3$ which has been outputted from the optical transmitter 271p-3 of the optical transmission section 290-p which is included in the optical transmitter which sends out the optical signal of the wavelength band $\lambda B_p \pm \Delta \lambda_p$ (where p is an integer variable, and, in this embodiment, p is 1, 2, 3, or 4, and can take the same value in the explanation below) is outputted to the optical transmission line 250 via the wavelength division multiplexer 27p and the wavelength-band multiplexer 230.

Furthermore, the optical signal S13-p is transmitted along the optical transmission line 250, and arrives at the input port 221 of the wavelength-band demultiplexer 220-1 of the wavelength-routing device 210 and is outputted from the output port 222-p.

The optical signal S13-p which has been outputted from the output port 222-p is inputted to the first input port 24p1-1 of the arrayed-waveguide grating 24p.

From the relationships between the input and output ports of the arrayed-waveguide grating 24p and wavelengths shown in FIGS. 4 through 7, the optical signal S13-p is outputted by the third output port 24p2-3 of the arrayed-waveguide grating 24p.

The optical signal S13-p which has been outputted from the third output port 24p2-3 of the arrayed-waveguide grating 24p is inputted to the p-th input port 231-p of the wavelength-band multiplexer 230-3, and is outputted from the output port 232.

The optical signal S13-p which has been outputted from the output port 232 of the wavelength-band multiplexer 230-3 is transmitted along the optical transmission line 260-3, and arrives at the input port 220-11 of the wavelength-band demultiplexer 220 of the communication node 200-3.

The optical signal S13-p is outputted from the output port 220-2p of the wavelength-band demultiplexer 220 of the communication node 200-3, is inputted to the wavelength division demultiplexer 28p, is outputted from the output port 28p-23 of the wavelength division demultiplexer 28p, and is received by the optical receiver 281p-3.

In this manner, when transmitting data from the communication node 200-1 to the communication node 200-3, it is possible to do this by using the optical signal S13-p of the wavelength $\lambda p3$ which is sent out from the optical transmitter 271p-3, which is provided in the optical transmission section 290-p of the wavelength band $\lambda B p \pm \Delta \lambda p$ of the communication node 200-1.

In other words, in this embodiment, it is possible to use the four optical paths S13-1, S13-2, S13-3, and S13-4. By doing the same as above, in this embodiment, it is possible to perform communication via four optical paths between two communication nodes.

In the above manner, although with this embodiment, just as in the conventional example, the communication nodes 200-1 through 200-4 and the wavelength-routing device 210 which make up the optical communication system are connected by a pair of optical fibers, in this embodiment, by arranging the arrayed-wavelength gratings 241 through 244 independently in each wavelength band in the wavelength-routing device 210, and by performing the wavelength-band multiplexing of wavelength bands and the wavelength-band demultiplexing of wavelength bands in each of the communication nodes 200-1 through 200-4 and the wavelength-routing device 210, it is possible to establish a single optical path between the communication nodes for each wavelength band.

Accordingly, although in the conventional example it was possible to establish only a single optical path between the communication nodes with one pair of optical fibers, by utilizing the structure of this embodiment, it is possible to establish, at maximum, the same number of optical paths as wavelength bands, and thus it is possible to increase the transmission capacity between the communication nodes in an easy manner.

The Second Embodiment

Next, the second embodiment according to the present invention will be explained.

Figure 9:
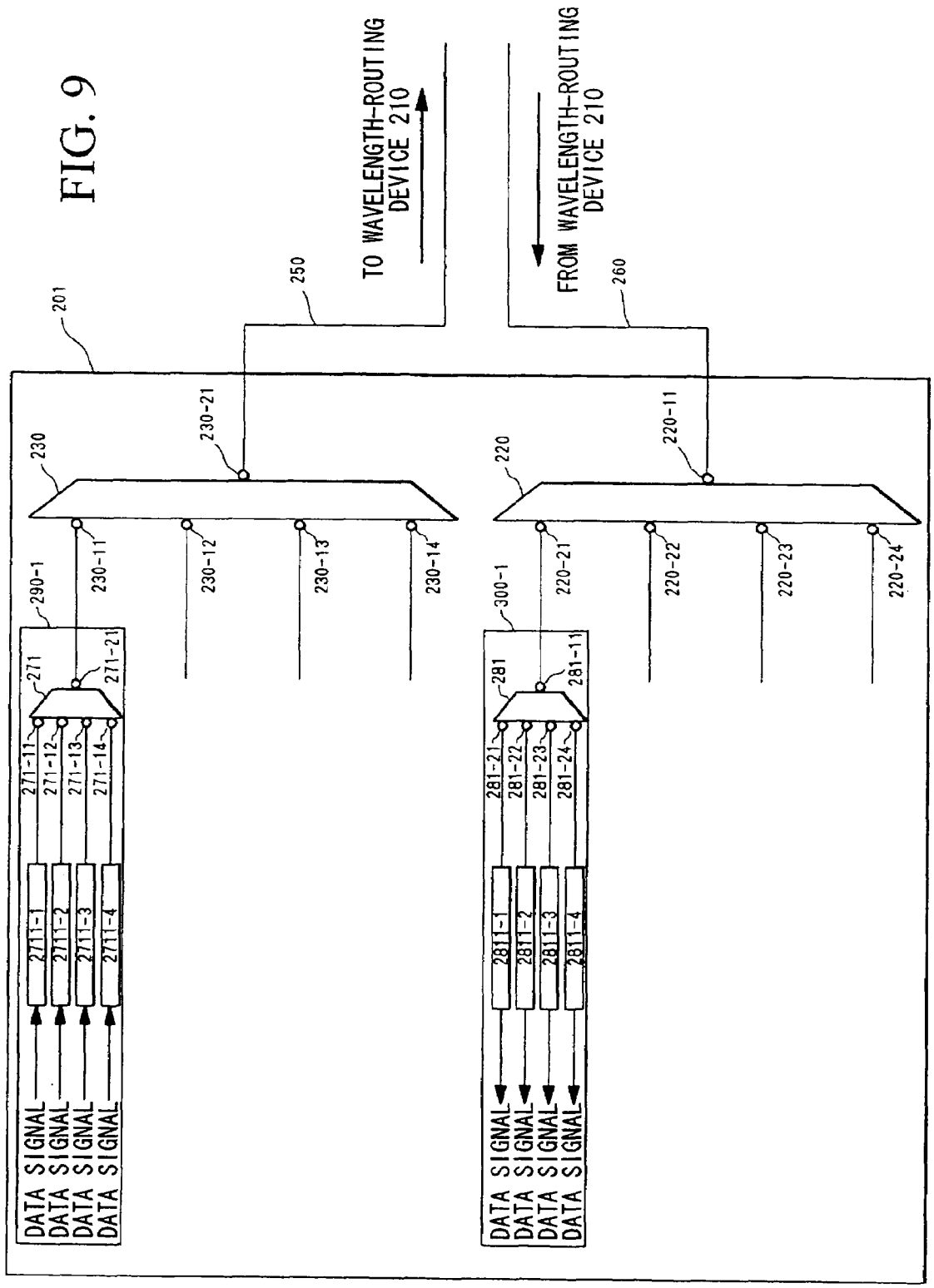
FIG. 9 is a block diagram for the second embodiment according to the present invention, showing a structural example of initial construction of an optical transceiver section of a communication node.

As has already been explained with regard to the first embodiment, although it is possible to establish four optical paths using four wavelength bands (the wavelength band $\lambda B_1 \pm \Delta \lambda_1$, the wavelength band $\lambda B_2 \pm \Delta \lambda_2$, the wavelength band $\lambda B_3 \pm \Delta \lambda_3$, and the wavelength band $\lambda B_4 \pm \Delta \lambda_4$), in the initial construction of an optical communication network system, as shown in FIG. 9, it is possible to provide an optical transmission section and an optical reception section of the single wavelength band $\lambda B_p \pm \Delta \lambda_p$ (where p is an integer variable, and p is any one of 1, 2, 3, and 4) to each of the communication nodes 200-1 through 200-4, and thus to increase the wavelength bands according to the transmission capacity between the communication nodes (in FIG. 9, by way of example, the case of p=1 is shown).

Figure 10:
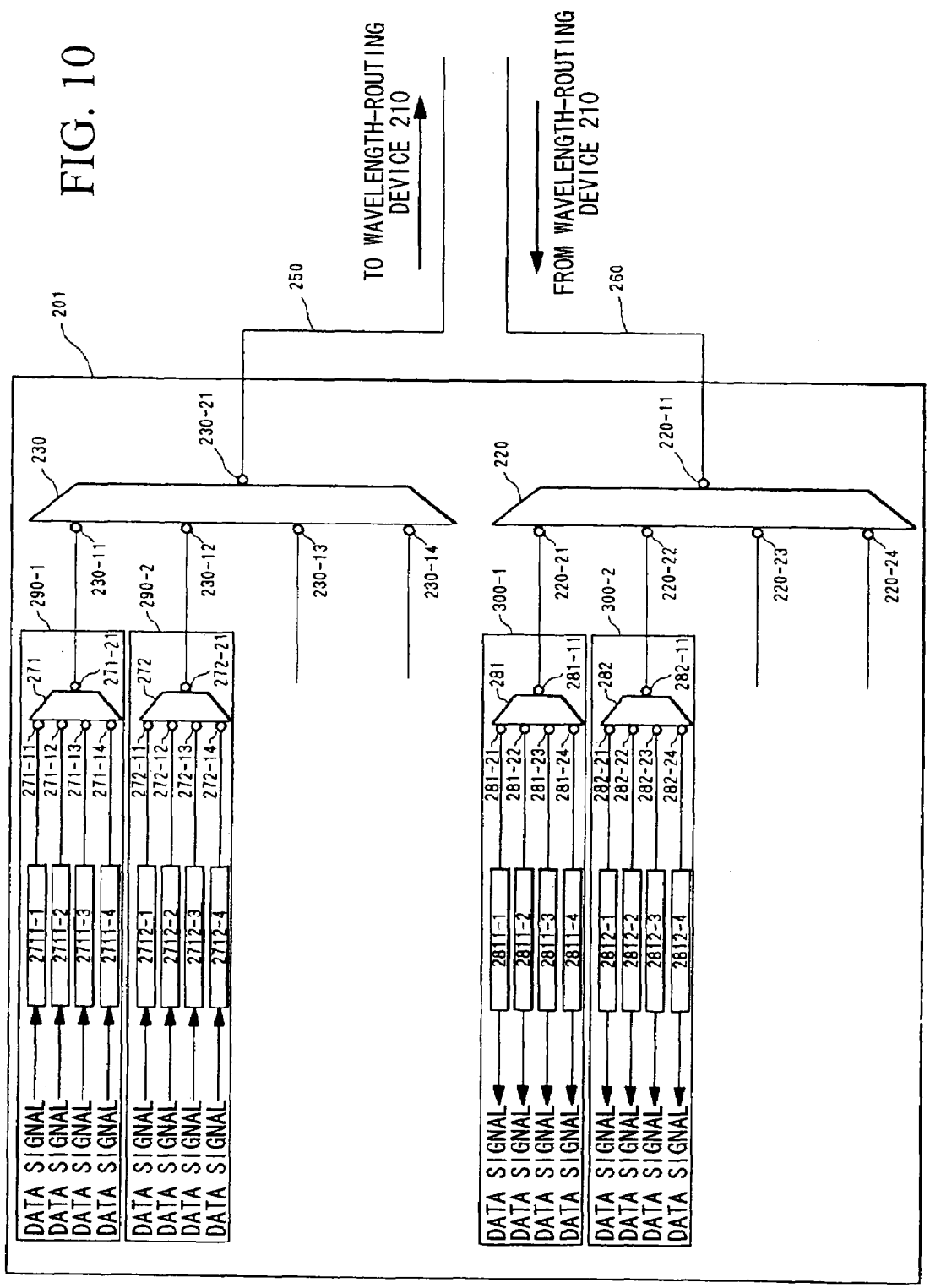
FIG. 10 is a block diagram for a communication node of the second embodiment according to the present invention, for explanation of a structural example after increase of an optical transceiver section of a different wavelength band.

For example, FIG. 10 is an example in which another optical transmission section 290-2 and another optical reception section 300-2 of a further wavelength band have been added to each of the communication nodes 200-1 through 200-4 of the second embodiment shown in FIG. 9. By doing this, two optical paths are established between the respective communication nodes.

Yet further, although in FIG. 10 an optical transceiver section for a wavelength band was added to all of the communication nodes 200-1 through 200-4, it would also be possible to add a wavelength band only between those communication nodes for which it is desired to add a communication band. For example, an initial optical communication network structure may be supposed which is made up from the communication node 200-1 through the communication node 200-4 as shown in FIG. 9, and each of the communication nodes 200-1 through 200-4 has established an optical path at the wavelength band $\lambda B_1 \pm \Delta \lambda_1$ for performing communication.

Figure 11:
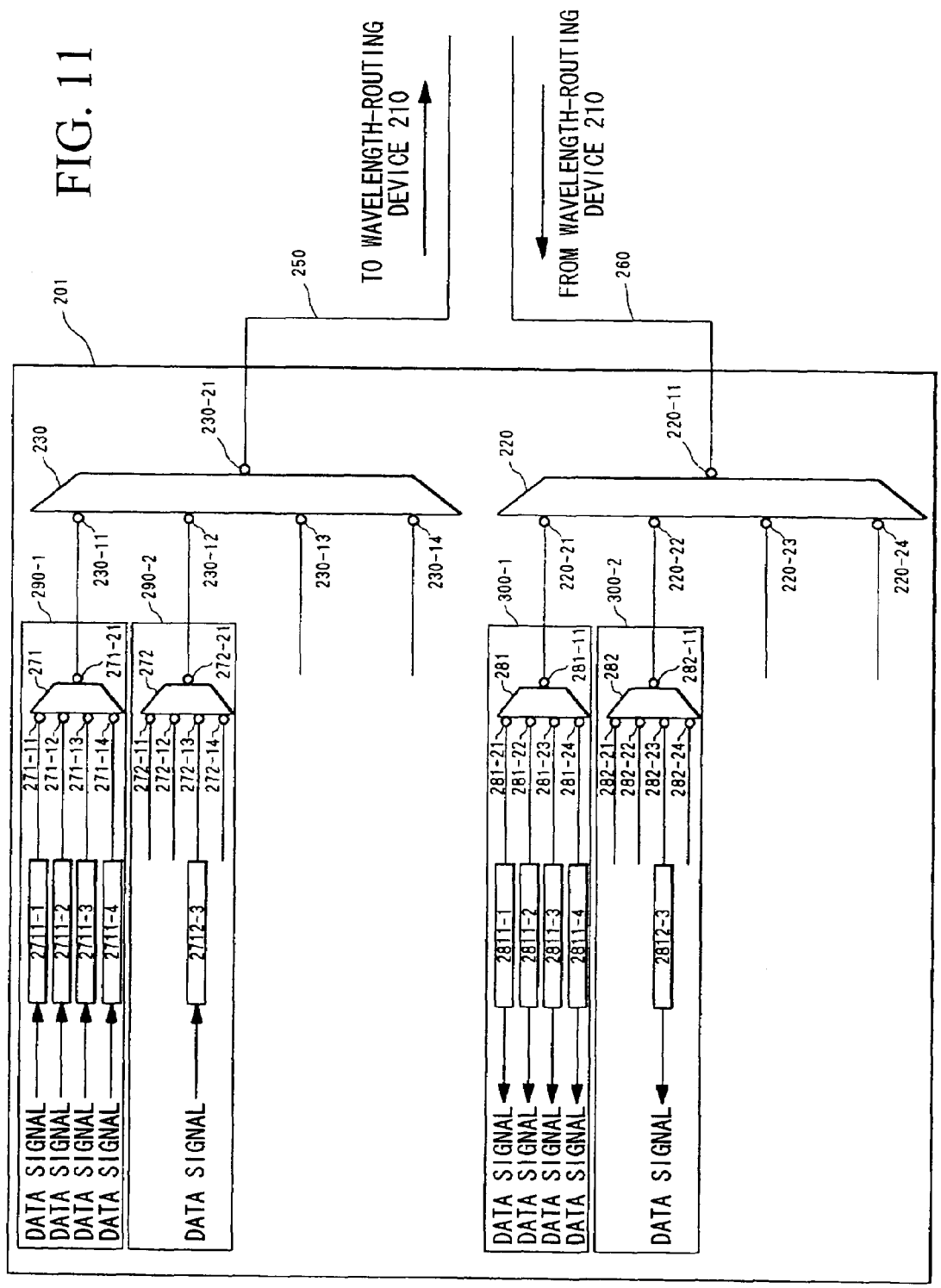
FIG. 11 is a block diagram for a communication node of the second embodiment according to the present invention, for explanation of a structural example after increase of an optical transceiver section of a different wavelength band.

Subsequently, if an additional communication band (an optical path) between the communication node 200-1 and the communication node 200-3 has become necessary, it would be acceptable to add, only to the communication node 200-1 and to the communication node 200-3, the optical transmission section 290-2 and the optical reception section 300-2 of the wavelength band $\lambda B_p \pm \Delta \lambda_p$ in which only the optical transmitter 2712-3 and the optical receiver 2812-3 which are necessary for communication between the communication node 200-1 and the communication node 200-3 are implemented as shown in FIG. 11. It should be understood that, in FIG. 11, by way of example, the case p=2 is shown.

The Third Embodiment

Figure 12:
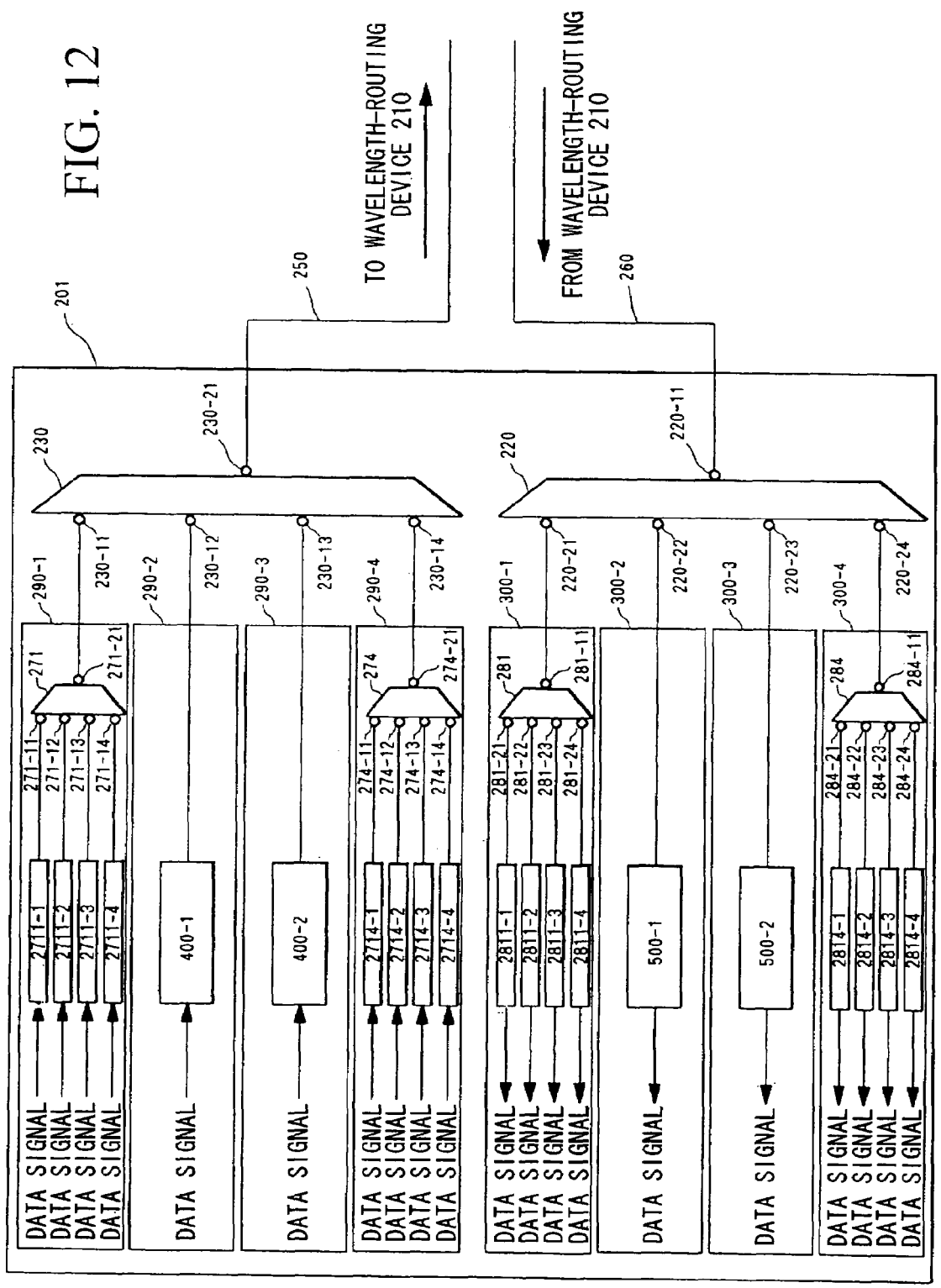
FIG. 12 is a block diagram showing a structural example of an optical transceiver section of a communication node of the third embodiment according to the present invention.

Next, the third embodiment according to the present invention will be explained with reference to FIG. 12. It should be understood that, in FIG. 12, to structural elements which are the same as in the first embodiment described above, the same reference symbols are affixed, and their explanation will be curtailed. In this embodiment, for each of the communication nodes 200-1 through 200-4, wavelength-tunable optical light source integrated optical transmitters 400-1 and 400-2 are implemented in the optical transmission section 290-2 and the optical transmission section 290-3, respectively, and moreover optical receivers 500-1 and 500-2 are implemented in the optical reception section 300-2 and the optical reception section 300-3, respectively.

The output port of the wavelength-tunable optical light source integrated optical transmitter 400-1 is connected to the input port 230-12 of the wavelength-band multiplexer 230, while the output port of the wavelength-tunable optical light source integrated optical transmitter 400-2 is connected to the input port 230-13 of the wavelength-band multiplexer 230.

The wavelength-tunable optical light source integrated optical transmitter 400-1 can output light of the wavelengths $\lambda 21$, $\lambda 22$, $\lambda 23$, and $\lambda 24$ belonging to the wavelength band $\lambda B_2 \pm \Delta \lambda_2$, and moreover the wavelength-tunable optical light source integrated optical transmitter 400-2 can output light of the wavelengths $\lambda 31$, $\lambda 32$, $\lambda 33$, and $\lambda 34$ belonging to the wavelength band $\lambda B_3 \pm \Delta \lambda_3$.

Furthermore, the input port of the optical receiver 500-1 is connected to the output port 220-22 of the wavelength-band demultiplexer 220, while the input port of the optical receiver 500-2 is connected to the output port 220-23 of the wavelength-band demultiplexer 220.

Accordingly, each of the communication nodes 200-1 through 200-4 can increase the number of the optical paths by setting the wavelengths of the optical signals which are outputted from the wavelength-tunable optical light source integrated optical transmitters 400-1 and 400-2 to values for routing the optical signals to the communication nodes for which it is required to establish optical paths by the wavelength-routing device 210.

Specifically, if the communication node 200-1 performs communication with the communication node 200-3 by using an optical signal of a wavelength which belongs to the wavelength band $\lambda B_2 \pm \Delta \lambda_2$, the wavelength of the optical signal S13-2 which is outputted from the wavelength-tunable optical light source integrated optical transmitter 400-1 of the communication node 200-1 is set to $\lambda 23$. This optical signal S13-2 is routed by the wavelength-routing device 210, and is received by the optical receiver 500-1 of the communication node 200-3. Furthermore, if the communication node 200-1 performs communication with the communication node 200-4 by using an optical signal of a wavelength which belongs to the wavelength band $\lambda B_3 \pm \Delta \lambda_3$, the wavelength of the optical signal S14-3 which is outputted from the wavelength-tunable optical light source integrated optical transmitter 400-2 of the communication node 200-1 is set to $\lambda 34$. This optical signal S14-3 is routed by the wavelength-routing device 210, and is received by the optical receiver 500-2 of the communication node 200-4.

As described above, by providing an optical transmission section which is equipped with a wavelength-tunable optical light source integrated optical transmitter in the communication nodes 200-1 through 200-4, it becomes possible to flexibly select a communication node which communicates in a wavelength band to which the optical transmission section belongs.

As the above-described wavelength-tunable optical light source integrated optical transmitters 400-1 and 400-2, it is possible to use, for example, a distributed feedback semiconductor laser, or a multi electrode distributed reflector semiconductor laser, or the like. Furthermore, for a distributed feedback semiconductor laser, by equipping it with a means for varying its temperature, it is possible to vary the wavelength of the optical signal which is output from the semiconductor laser according to its temperature; while, with a multi electrode distributed reflector semiconductor laser, by equipping it with a means for varying the value of the energizing electrical current, it is possible to vary the wavelength of the optical signal which is output from the semiconductor laser according to the value of the current flow.

It should be understood that the above-described embodiment is no more than a concrete example of the present invention, and that the present invention is not limited only to the structure of the above-described embodiment. For example, although in the above-described embodiment the explanation was made by taking, by way of example, both the number of communication nodes and the number N of device input ports and device output ports of the wavelength-routing device as being 4, this is not to be considered as being limitative; it goes without saying that any value of N will be acceptable, provided that it is an integer greater than or equal to 2.

The Fourth Embodiment

Next, the fourth embodiment according to the present invention will be explained with reference to FIG. 13. It should be understood that, in FIG. 13, to structural elements which are the same as in the first embodiment described above, the same reference symbols are affixed, and their explanation will be curtailed. In this embodiment, for each of the communication nodes 200-1 through 200-4, transmission modules 310 are implemented in the optical transmission section 290-a (where a is an integer from 1 through 4), and reception modules 311 are implemented in the optical reception section 300-a.

The structures of the transmission modules 310 and the reception modules 311 are shown in FIGS. 14A through 14H.

In FIGS. 14A through 14H, 301 are optical transmitters, 302 is a wavelength division multiplexer, 303 is a wavelength division demultiplexer, 304 are optical receivers, 305 are wavelength-tunable optical light source integrated optical transmitters, 306 is an optical coupler, 307 are wavelength-tunable filters, and 308 is an optical splitter. There are four types of transmission modules 310-1 through 310-4, and there are four types of reception modules 311-1 through 311-4.

In the following, the structures of the transmission modules from 310-1 through 310-4 and of the reception modules from 311-1 through 311-4 will be explained in detail.

In the transmission module 310-1, two or more streams of transmitted data are converted into optical signals of wavelengths which are determined by respectively different optical transmitters 301, and these are wavelength division multiplexed and are outputted by the wavelength division multiplexer 302. In the reception module 311, the wavelength division multiplexed optical signals which have been inputted are demultiplexed by wavelength by the wavelength division demultiplexer 303, and are converted into received signals by the respective optical receivers 304. In the subsequent discussion, the combination of this transmission module 310-1 and this reception module 311-1 will be termed a first transceiving module. It should be understood that, in this first transceiving module, according to requirements, it will also be acceptable to reduce the number of the optical transmitters 301 and the optical receivers 304.

In the transmission module 310-2, a single stream of transmitted data is converted into an optical signal of a wavelength determined by the optical transmitter 301, and is outputted. In the reception module 311-2, the optical signal of a single wavelength which is inputted is converted by the optical receiver 304 into a received signal. In the subsequent discussion, the combination of this transmission module 310-2 and this reception module 311-2 will be termed a second transceiving module.

In the transmission module 310-3, a single stream of transmitted data is converted into an optical signal of a wavelength which is determined by the wavelength-tunable optical light source integrated optical transmitter 305, and is outputted. In the reception module 311-3, the optical signal of a single wavelength which is inputted is converted by the optical receiver 304 into a received signal. In the subsequent discussion, the combination of this transmission module 310-3 and this reception module 311-3 will be termed a third transceiving module.

Figure 14A:
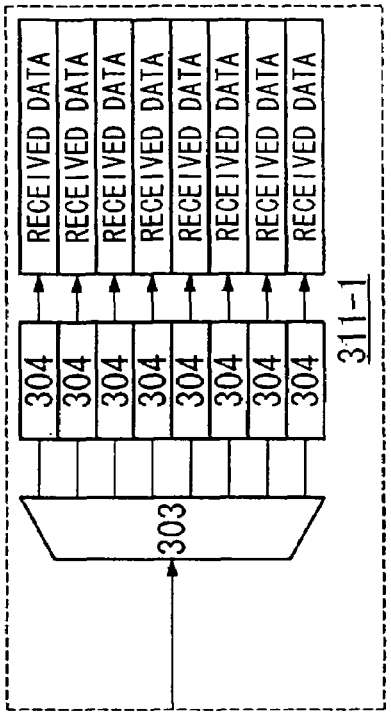
FIGS. 14A through 14H are block diagrams showing the structure of a transmission module and a reception module in the fourth embodiment according to the present invention.
Figure 14B:
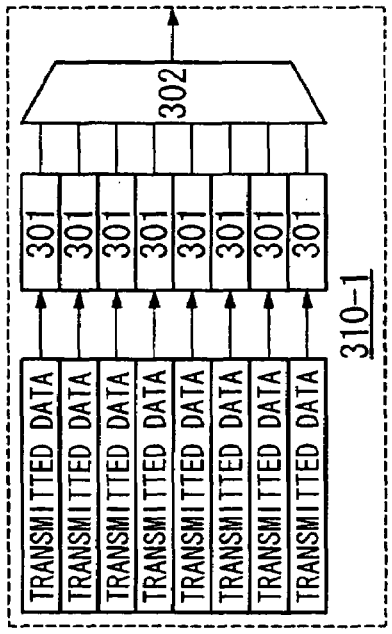
Figure 14C:
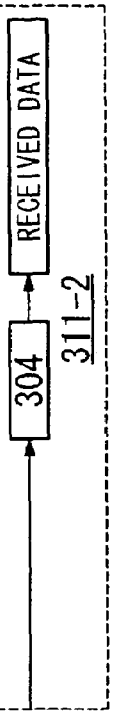
Figure 14D:
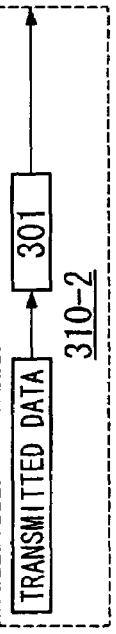
Figure 14E:
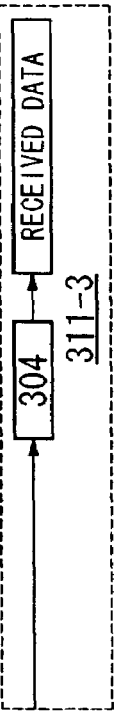
Figure 14F:
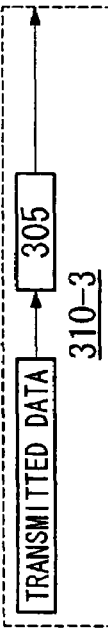
Figure 14G:
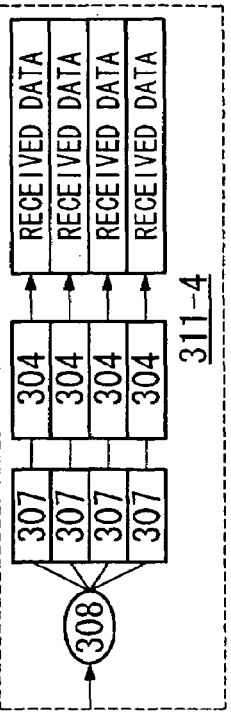
Figure 14H:
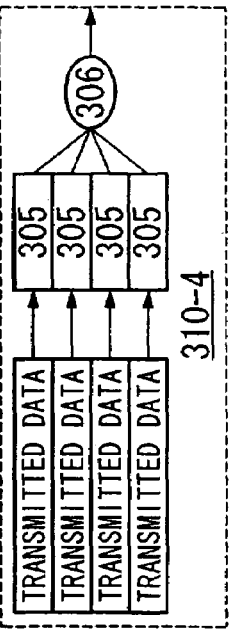

In the transmission module 310-4, two or more streams of transmitted data are converted into optical signals of respectively different wavelengths which are determined by the N (where N is an integer greater than or equal to 2) wavelength-tunable optical light source integrated optical transmitters 305, and are combined by the optical coupler 306 and are outputted. In the reception module 311-4, the multiplexed optical signal of N or fewer wavelengths which is inputted is distributed into N routes by the optical splitter 308. These distributed optical signals are made into an optical signal of a single wavelength by the wavelength-tunable filters 307 each of which only transmits a signal of a single wavelength, and are respectively converted into received signals by the optical receivers 304. In FIGS. 14G and 14H the case is shown in which N is 4, but the value of N is not to be considered as being limited by this. In the subsequent discussion, the combination of this transmission module 310-4 and this reception module 311-4 will be termed a fourth transceiving module.

In this embodiment, at an optical transmission section 290-a (where a is an integer from 1 through 4) and an optical reception section 300-a of each communication node which send and receive signals of the same wavelength band, either any one of the first through the fourth transceiving modules may be provided, or alternatively none may be provided. In these cases, it is not absolutely necessary for the transceiving module at another communication node which transmits and receives signals of the same wavelength band to be the same.

Figure 15:
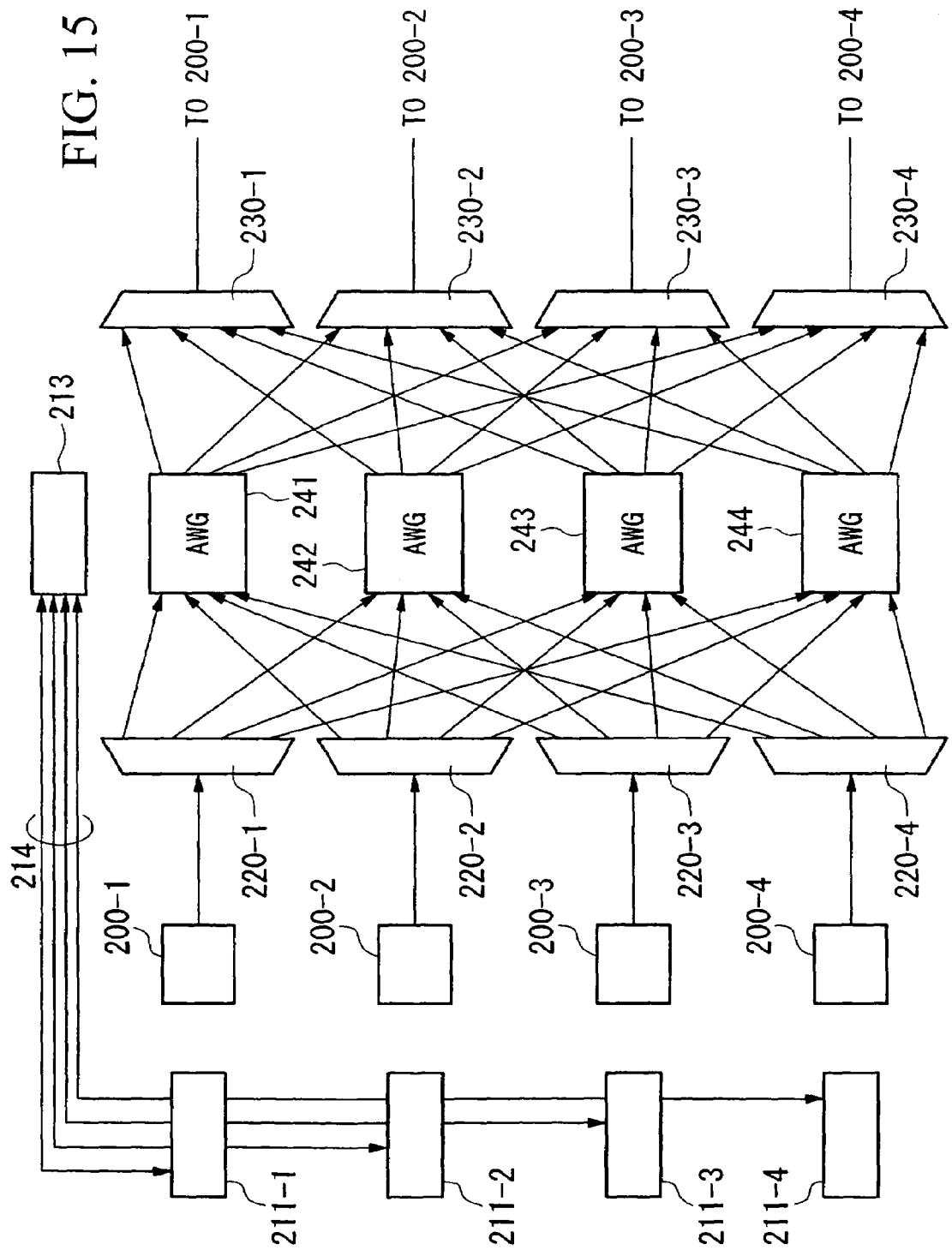
FIG. 15 is a block diagram showing the connection relationship of a control device for transceiver and an optical path management device, in the fourth embodiment according to the present invention.

FIG. 15 is a figure showing the structure of the control system which performs the control of this embodiment. In this figure, 211-1 through 211-4 are control devices for transceiver, 213 is an optical path management device, 214 is a communication circuit (network), 200-1 through 200-4 are communication nodes, 220-1 through 220-4 are wavelength-band demultiplexers, 230-1 through 230-4 are wavelength-band multiplexers, and 241, 242, 243 and 244 are 4×4 arrayed-waveguide gratings.

The control devices for transceiver 211-1 through 211-4 are connected to the four communication nodes 200-1 to 200-4, and perform control of the optical transceiving modules. This control of the optical transceiving modules is performed based upon control signals which are received from the optical path management device 213. A drive signal or a stop signal is transmitted to the optical transmitter 301 which is to be the object of control, a drive signal, a stop signal, or an output wavelength control signal is transmitted to the wavelength-tunable optical light source integrated optical transmitter 305, a transmission wavelength band control signal is transmitted to the wavelength-tunable filters 307, and thereby the optical transceiving module is controlled.

Figure 16:
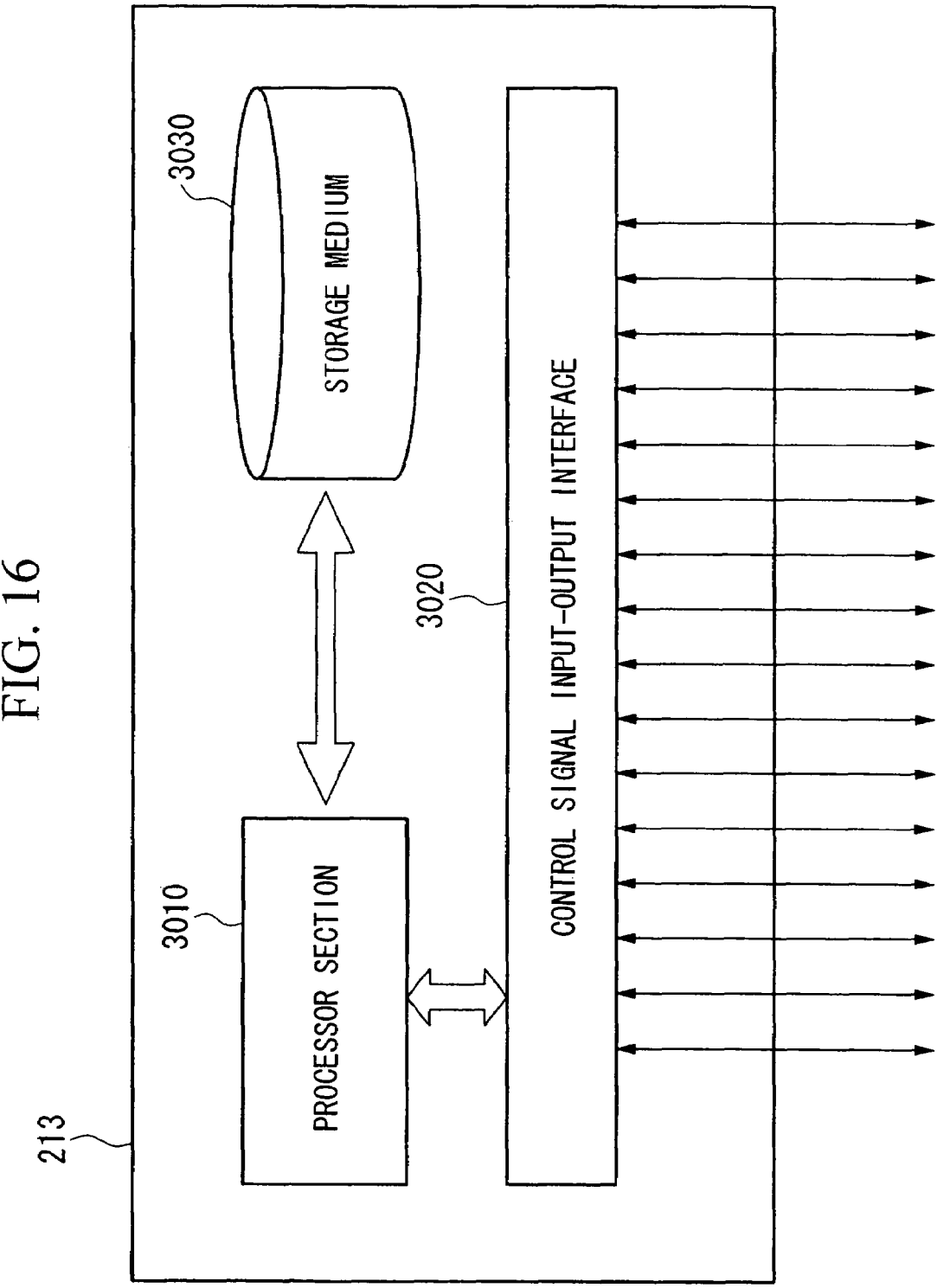
FIG. 16 is a block diagram showing the structure of an optical path management device in the fourth embodiment according to the present invention.

The optical path management device 213 performs management of the optical path which will be described hereinafter. In order to do this, the optical path management device 213 is connected with the control devices for transceiver 211-1 through 211-4 via the communication circuit 214, and sends and receives control signals to and from them. The internal structure of this optical path management device 213 is shown in FIG. 16. Mainly, this optical path management device 213 is made up from a processor section 3010, a storage medium 3030, and a control signal input-output interface 3020. In this embodiment memory is utilized as the storage medium, but anything may be used as the storage medium, provided that information can be read from it and written to it.

In the optical path management device 213, databases which maintain the types of the transceiving modules which are implemented at each communication node, and the states of the optical transmitters within the transceiving modules, the wavelength-tunable optical light source integrated optical transmitters, and the wavelength-tunable filters are held in the storage medium 3030.

When additionally providing or canceling a path between communication nodes based upon these databases with the optical path management device 213, it is decided by the processor section 3010 which of the optical transmitters, wavelength-tunable optical light source integrated optical transmitters, and wavelength-tunable filters at each of the communication nodes should be controlled or not. The results of these decisions are transmitted via the control signal input-output interface 3020 to the control devices for transceiver 211-1 through 211-4 as control signals, and controls the optical transceiving modules so as to be able to additionally provide or to cancel the desired optical path. Furthermore, the optical path management device 213, for each wavelength band, creates and maintains a database in which the optical paths between communication nodes are recorded.

FIG. 17 shows an example of a database, in which a table is shown which relates to the wavelength band $\lambda B_1 \pm \Delta\lambda_1$. It should be understood that, in FIG. 17, "TLD" means a wavelength-tunable optical light source (Tunable Laser Diode).

Each row of the database corresponds to a respective one of the communication nodes, and maintains the state of the transmitters which are included in the communication node. In FIG. 17, the first row corresponds to the communication node 200-1, the second row corresponds to the communication node 200-2, the third row corresponds to the communication node 200-3, and the fourth row corresponds to the communication node 200-4.

Each column of the database maintains information which is related to the optical transmitters of the respective communication nodes.

The fifth column of the database maintains the types of the transceiving modules which are implemented at the communication nodes. In FIG. 17, the case is shown in which a first transceiving module is implemented at the communication node 200-1, a second transceiving module is implemented at the communication node 200-2, a third transceiving module is implemented at the communication node 200-3, and a fourth transceiving module is implemented at the communication node 200-4.

The sixth column maintains the numbers of the wavelength-tunable optical light source integrated optical transmitters which are implemented at the communication nodes. In FIG. 17, the case is shown in which no wavelength-tunable optical light source integrated optical transmitters are implemented at the communication node 200-1 and at the communication node 200-2, while a single wavelength-tunable optical light source integrated optical transmitter is implemented at the communication node 200-3, and two wavelength-tunable optical light source integrated optical transmitters are implemented at the communication node 200-4.

The seventh column maintains, among the wavelength-tunable optical light source integrated optical transmitters which are implemented at the communication nodes, the number thereof which are actually being used. In FIG. 17, the case is shown in which no wavelength-tunable optical light source integrated optical transmitters are being used at the communication node 200-1 and at the communication node 200-2, one wavelength-tunable optical light source integrated optical transmitter is being used at the communication node 200-3, and one wavelength-tunable optical light source integrated optical transmitter is being used at the communication node 200-4.

The upper entries in the first through the fourth columns maintain the optical wavelengths for transmitting signals to the respective communication nodes 200-1, 200-2, 200-3, and 200-4, while the lower entries therein maintain the states of the optical transmitters for sending signals to these respective communication nodes 200-1, 200-2, 200-3, and 200-4. If a first or a second transceiving module is implemented, the state of the optical transmitter which is maintained shown in the lower entries is one of: "NA" which shows the state in which no optical transmitter which sends a signal to the relevant communication node is implemented; or "OFF" which shows the state in which an optical transmitter which sends a signal to the relevant communication node is implemented but is not being used; or "ON" which shows the state in which an optical transmitter which sends a signal to the relevant communication node is implemented and is being used. Furthermore, if a third or a fourth transceiving module is implemented, it is one of "OFF" which shows the state in which no wavelength-tunable optical light source integrated optical transmitter which sends an optical signal at a wavelength which sends a signal to the relevant communication node exists, or the "number of the wavelength-tunable optical light source integrated optical transmitter", which shows that a wavelength-tunable optical light source integrated optical transmitter exists which sends an optical signal at a wavelength which sends a signal to the relevant communication node, and which specifies the relevant wavelength-tunable optical light source integrated optical transmitter.

In the management of the optical paths between the communication nodes, the optical path management device 213 refers to and changes the database when establishing a new optical path between communication nodes and when stopping an already existing optical path between communication nodes, and controls the control devices for transceiver 211-1 through 211-4 via the communication circuit 214.

First, the operation of the optical path management device 213 when an optical path is newly established between a communication node 200-x and a communication node 200-y (where both x and y are integers greater than or equal to 1 and less than or equal to 4). Here, one example of the trigger for establishment of an optical path between the communication node 200-x and the communication node 200-y is an explicit command for optical path establishment via input from the operator of this system to a console not shown in the figures which is connected to the optical path management device 213. Furthermore, another example of such trigger is that the optical path management device receives monitor information of communication traffic within the system, and that it decides to establish a new optical path between the communication nodes based upon this information.

The optical path management device 213 searches, from among the four databases which are provided for each of the wavelength bands, a database in which, for both the x-th row and the y-th row, the entry in the fifth column is "1" or "2", or the entry in the fifth column is "3" or "4" and the entry in the sixth column is greater than the entry in the seventh column. Next, within the applicable databases, it searches for the databases in which the lower entries both in the x-th row and the y-th column and in the y-th row and the x-th column are "OFF". If the result of this search is that a plurality of databases are applicable, then it obtains its search results based upon some type of priority ranking; for example, based upon a priority ranking in which a database which corresponds to a shorter wavelength band is accorded priority.

The optical path management device 213, along with transmitting a command for establishing an optical path between the communication node 200-x and the communication node 200-y upon the wavelength band which corresponds to the database which was obtained as the result of the search via the communication circuit 214 to the control devices for transceiver 211-x and 211-y, also updates the database.

The signal which is transmitted to the control device for transceiver 211-x will now be explained in concrete terms by way of an example. If the communication node 200-x is implemented with the first or the second transceiving module, then a signal is transmitted for creating a drive signal for the optical transmitter 301 which outputs the wavelength which is maintained in the upper entry of the x-th row and the y-th column of the database. At the same time, "ON" is written into the lower entry of the x-th row and the y-th column of the database. If the communication node 200-x is implemented with the third transceiving module, a signal is transmitted for creating a transmission wavelength setting signal which sets the wavelength which is outputted by the wavelength-tunable optical light source integrated optical transmitter 305 to the wavelength which is maintained in the upper entry of the x-th row and the y-th column of the database. At the same time, a signal is transmitted for creating a drive signal for the wavelength-tunable optical light source integrated optical transmitter 305. Furthermore, at the same time, "1" is written into the lower entry of the x-th row and the y-th column of the database, and "1" is written into the seventh row entry. If the communication node 200-x is implemented with the fourth transceiving module, a signal is transmitted for creating a transmission wavelength setting signal which sets the wavelength which is outputted by the wavelength-tunable optical light source integrated optical transmitter 305 of the lowest number among the ones of the wavelength-tunable optical light source integrated optical transmitters 305 which are unused to the wavelength which is maintained in the upper entry of the x-th row and the y-th column of the database. At the same time, a signal is transmitted for creating a drive signal for the wavelength-tunable optical light source integrated optical transmitter 305. Moreover, a signal is transmitted for creating a transmission wavelength band control signal which sets the transmission wavelength band of the wavelength-tunable filter 307 which is paired with the wavelength-tunable optical light source integrated optical transmitter 305 to the wavelength which is maintained in the upper entry of the x-th row and the y-th column of the database. At the same time as the above tasks, the number of the wavelength-tunable optical light source integrated optical transmitter which has been driven is written into the lower entry in the x-th row and the y-th column of the database, and 1 is added to the seventh row entry.

It should be understood that, when searching the databases, if no applicable database exists, the fact that it is not possible to add an optical path is transmitted to the source of the request.

Next, the operation of the optical path management device 213 will be explained when a requirement has arisen to cancel the optical path between a communication node 200-xx and a communication node 200-yy (where xx and yy are both integers which are greater than or equal to 1 and less than or equal to 4) between which an optical path is already established. Here, one example of the trigger for cancellation of the optical path between the communication node 200-xx and the communication node 200-yy is an explicit command for optical path cancellation via input from the operator of this optical communication network system to a console not shown in the figures which is connected to the optical path management device 213. Furthermore, another example of such trigger is that the optical path management device receives monitor information of communication traffic within the system, and that it decides to cancel the new optical path between the communication nodes based upon this information.

The optical path management device 213 searches, from among the four databases which are provided for each of the wavelength bands, a database in which the lower entry in the xx-th row and the yy-th column and the lower entry in the yy-th row and the xx-th column are both "ON" or both of them are the number of wavelength-tunable optical light source integrated optical transmitters. If the result of this search is that a plurality of databases are applicable, then it obtains its search results based upon some type of priority ranking; for example, based upon a priority ranking in which a database which corresponds to a shorter wavelength band is accorded priority.

The optical path management device 213, along with transmitting a command for canceling the optical path between the communication node 200-xx and the communication node 200-yy upon the wavelength band which corresponds to the database which was obtained as the result of the search via the communication circuit 214 to the control devices for transceiver 211-xx and 211-yy, also updates the database.

The signal which is transmitted to the control device for transceiver 211-xx will now be explained in concrete terms by way of an example. If the communication node 200-xx is implemented with the first or the second transceiving module, a signal is transmitted for creating a cancellation signal for the optical transmitter 301 which outputs the wavelength which is maintained in the upper entry of the xx-th row and the yy-th column of the database. At the same time, "OFF"

is written into the lower entry of the xx-th row and the yy-th column of the database. If the communication node 200-xx is implemented with the third transceiving module, a signal is transmitted for creating a cancellation signal for the wavelength-tunable optical light source integrated optical transmitter 305. At the same time, "OFF" is written into the lower entry in the xx-th row and the yy-th column of the database, and "0" is written into the seventh row. If the communication node 200-x is implemented with the fourth transceiving module, a signal is transmitted for creating a cancellation signal for the wavelength-tunable optical light source integrated optical transmitter 305 whose number is written in the lower entry in the xx-th row and the yy-th column of the database. At the same time, "OFF" is written into the lower entry in the xx-th row and the yy-th column of the database, and 1 is subtracted from the seventh row entry.

It should be understood that, when searching the databases, if no applicable database exists, the fact that it is not possible to cancel the optical path is transmitted to the source of the request.

It is possible to manage the optical paths between the communication nodes by doing as described above. It should be understood that the management method for the optical paths between the communication nodes need not absolutely necessarily be according to this embodiment; any method which is able to implement the same functions will be acceptable, and such a method is also to be considered as being included within the scope of the present invention.

For example, it would also be acceptable to implement the function of the optical path management device 213 in any one of the control devices for transceiver 211-1 through 211-4, and to omit the optical path management device 213.

Next, the theory of the optimal wavelength control and management method of an optical path which are applied to this embodiment will be explained in detail with reference to examples according to the fifth through seventh embodiments.

It should be understood that here the objects which are taken for control and management are the wavelength-tunable optical light source integrated optical transmitters 400-1 and 400-2. Attention is directed to the wavelength bands with which the wavelength-tunable optical light source integrated optical transmitters 400-1 and 400-2 are equipped, in other words to the wavelength bands $\lambda B_2 \pm \Delta \lambda_2$ and $\lambda B_3 \pm \Delta \lambda_3$. That is, for at least the wavelength bands which are the objects of control and management, it is presupposed that all of the communication nodes are provided with wavelength-tunable optical light source integrated optical transmitters. To put it in another manner, with regard to the wavelength bands which are not the objects of control and management, there is no specific constraint on optical transmitters and optical receivers which are provided in the respective communication nodes. For this reason, it is not necessary for the structures of the transmitters and the receivers to be the same at all of the communication nodes.

Furthermore, in this explanation of the theory, each of the wavelength bands $\lambda B_2 \pm \Delta \lambda_2$ and $\lambda B_3 \pm \Delta \lambda_3$ is treated as a single wavelength, and the wavelength-band demultiplexer 220 and the wavelength-band multiplexer 230 are respectively treated as a wavelength division demultiplexing circuit 1 and a wavelength division multiplexing circuit 2. Yet further, the 4×4 arrayed-waveguide gratings 241 through 244 are treated as optical matrix switches 3 and 6. At this time, controlling the wavelengths transmitted by the wavelength-tunable optical light source integrated optical transmitters 400-1 and 400-2 within the corresponding wavelength bands corresponds to controlling the optical paths of the matrix switches in the following explanation.

The Fifth Embodiment

FIG. 18 is a figure showing the fifth embodiment according to the present invention. In this figure, 1-1, 1-2, ... 1-N are wavelength division demultiplexing circuits, 2-1, 2-2, ... 2-N are wavelength division multiplexing circuits, 3-1, 3-2, ... 3-m are optical matrix switches, 4-1, 4-2, ... 4-N are input optical fibers, 5-1, 5-2, ... 5-N are output optical fibers, 11-1, 11-2, ... 11-N are control devices for transceiver, 12 is an optical matrix switch control device, 13 is an optical path management device, and 14 is a communication circuit (a network).

Here, although it is possible to utilize a circuit which employs an arrayed-waveguide grating or a dielectric multilayer filter as the wavelength division demultiplexing circuit and the wavelength division multiplexing circuit, the particular method by which they are implemented is of no importance, provided that the same functions are implemented. Furthermore although, as the optical matrix switches, it is possible to employ optical switches which use the thermo-optic effect, waveguide type switches, MEMS optical switches, bubble optical switches, N input N output arrayed-waveguide gratings, or the like, the particular method by which they are implemented is of no importance, provided that the same functions are implemented. Yet further, the particular method by which the entire structure is implemented is of no importance, provided that the same input and output characteristics are implemented.

The control devices for transceiver 11-1 through 11-N are respectively connected to transceivers (not shown in the figures) of N communication nodes, and they perform control of the wavelength and the like of the optical signals which are transmitted and received by these transceivers.

The optical matrix switch control device 12 is connected to the optical matrix switches 3-1 through 3-N, and performs control of the optical paths between the input and output ports of each of the optical matrix switches 3-1 through 3-N.

The optical path management device 13 is connected to the control devices for transceiver 11-1 through 11-N and to the optical matrix switch control device 12 via the communication circuit 14, and performs transmission and reception of information signals and management of the optical path based upon the present invention, as will be described hereinafter.

In the following, the optical path management method of the present invention will be explained by taking, as an example, the case in which the number of input optical fibers and output optical fibers is 8, and the number of multiplexed wavelengths is 4. However, the scale of the optical communication network system to which the present invention can be applied is not to be considered as being limited by this.

Based upon the numbers of the input optical fibers and the output optical fibers and the number of multiplexed wavelengths, four 8-input 8-output optical matrix switches are provided in the optical communication network system. It will be supposed that numbers 1 through 4 are appended to these four optical matrix switches which specify their respective mutually differing priority rankings, and furthermore that numbers 1 through 8 are appended to the groups of a communication node, an input optical fiber along which passes the output signal of the communication node, an input port of the optical matrix switch which is connected to the input optical fiber, the output optical fiber along which passes an input signal to the communication node, and an output port of the optical matrix switch which is connected to the output optical fiber.

The optical path management device 13 creates and maintains a database (not shown in the figures) in which the optical paths for each of the optical matrix switches are recorded.

FIGS. 19A through 19D are figures showing an example of the database which consists of tables which respectively correspond to the four optical matrix switches.

In these four tables, the number in the first row specifies the priority ranking of the optical matrix switch, while the number in the second column specifies the number of the destination communication node of the optical path which is established between the destination communication node and the communication node specified by the number of the first column via the optical matrix switch. Furthermore, here, for communication nodes which are not used in the relevant optical matrix switches, "0" is recorded as the number of the destination communication node of the optical path.

In the management of the optical paths between the input optical fibers and the output optical fibers (between the input communication nodes and the destination communication nodes of the optical path), it becomes necessary to refer to and to change the database when establishing a new optical path, when canceling an already existing optical path, and when changing over an optical path between the optical matrix switches.

First, the operation of the optical path management device 13 will be explained when a requirement has arisen newly to establish an optical path between the xx-th communication node and the yy-th communication node.

The flow of the processing of the optical path management device when establishing a new optical path as described above is shown in FIG. 20.

The optical path management device 13 searches in the database for an optical matrix switch which is not in use by both the xx-th communication node and the yy-th communication node in the order from the data which corresponds to the optical matrix switch which has the priority ranking whose number is the lowest (in the step S1). For example, in the state of the databases shown in FIGS. 19A through 19D, if a requirement has arisen newly to establish an optical path between the communication node 3 and the communication node 4, the second optical matrix switch whose priority ranking number is the smallest is obtained as the search result, from among the optical matrix switches which are not used by both the communication node 3 and the communication node 4.

When a search result is obtained (YES in the step S2), the optical path management device 13 transmits (in the step S3) a command for newly establishing an optical path according to the search result to the control devices for transceiver 11 of the xx-th communication node and of the yy-th communication node and the optical matrix switch control device 12, via the communication circuit 14, here, it transmits a command to execute communication by an optical signal of the wavelength λ2 to the control devices for transceiver of the communication node 3 and of the communication node 4, and it causes an optical path to be established in the optical matrix switch control device 12 between the third input port and the fourth output port of the second optical matrix switch, and moreover, along with transmitting the command to cause an optical path to be established between the fourth input port and the third output port, it registers the optical path which has newly been established in the database (in the step S4), here, writes 4 as the destination communication node of the optical path of the input communication node 3 in the table which corresponds to the second optical matrix switch, and writes 3 as the destination communication node of the optical path of the input communication node 4.

Next, the operation of the optical path management device 13 will be explained, when the necessity for an optical path which is already established between the xxx-th communication node and the yyy-th communication node has ceased.

Figure 21:
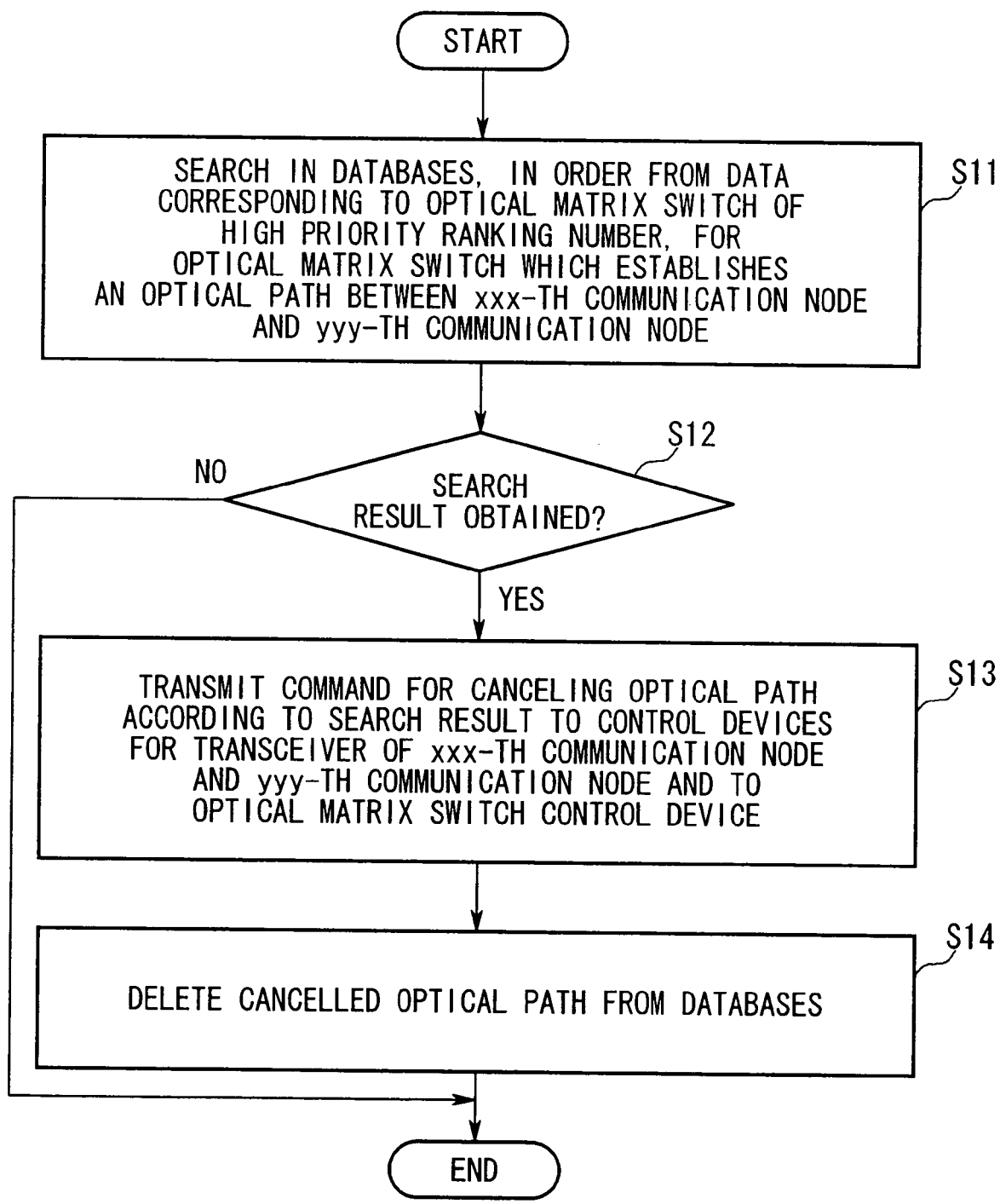
FIG. 21 is a flowchart of the processing of the optical path management device of the fifth embodiment according to the present invention.

The flow of the processing of the optical path management device when canceling an already existing optical path as described above is shown in FIG. 21.

The optical path management device 13 searches in the database, for an optical matrix switch which establishes an optical path between the xxx-th communication node and the yyy-th communication node in the order from the data which corresponds to the optical matrix switch which has the priority ranking whose number is the highest (in the step S11). For example if, in the state of the databases shown in FIGS. 19A through 19D, the optical path between the communication node 1 and the communication node 3 has become unnecessary, the fourth optical matrix switch whose priority ranking number is the highest is the search result, among the optical matrix switches which establish optical paths between the communication node 1 and the communication node 3.

When a search result is obtained (YES in the step S12), the optical path management device 13 transmits (in the step S13) a command for canceling an optical path according to the search result to the control-devices for transceiver 11 of the xxx-th communication node and of the yyy-th communication node and the optical matrix switch control device 12, via the communication circuit 14; here, it transmits a command to stop communication by an optical signal of the wavelength λ4 to the control devices for transceiver of the communication node 1 and of the communication node 3, and it causes the optical path in the optical matrix switch control device 12 between the first input port and the third output port of the fourth optical matrix switch to be cancelled, and moreover, along with transmitting the command to cause the optical path to be cancelled between the third input port and the first output port, it deletes the optical path which has been cancelled from the database (in the step S14), here, writes 0 as the destination communication node of the optical path of the input communication node 1 in the table which corresponds to the fourth optical matrix switch, and writes 0 as the destination communication node of the optical path of the input communication node 3.

Next, the operation of the optical path management device 13 when changing over an optical path between the optical matrix switches will be explained.

Figure 22:
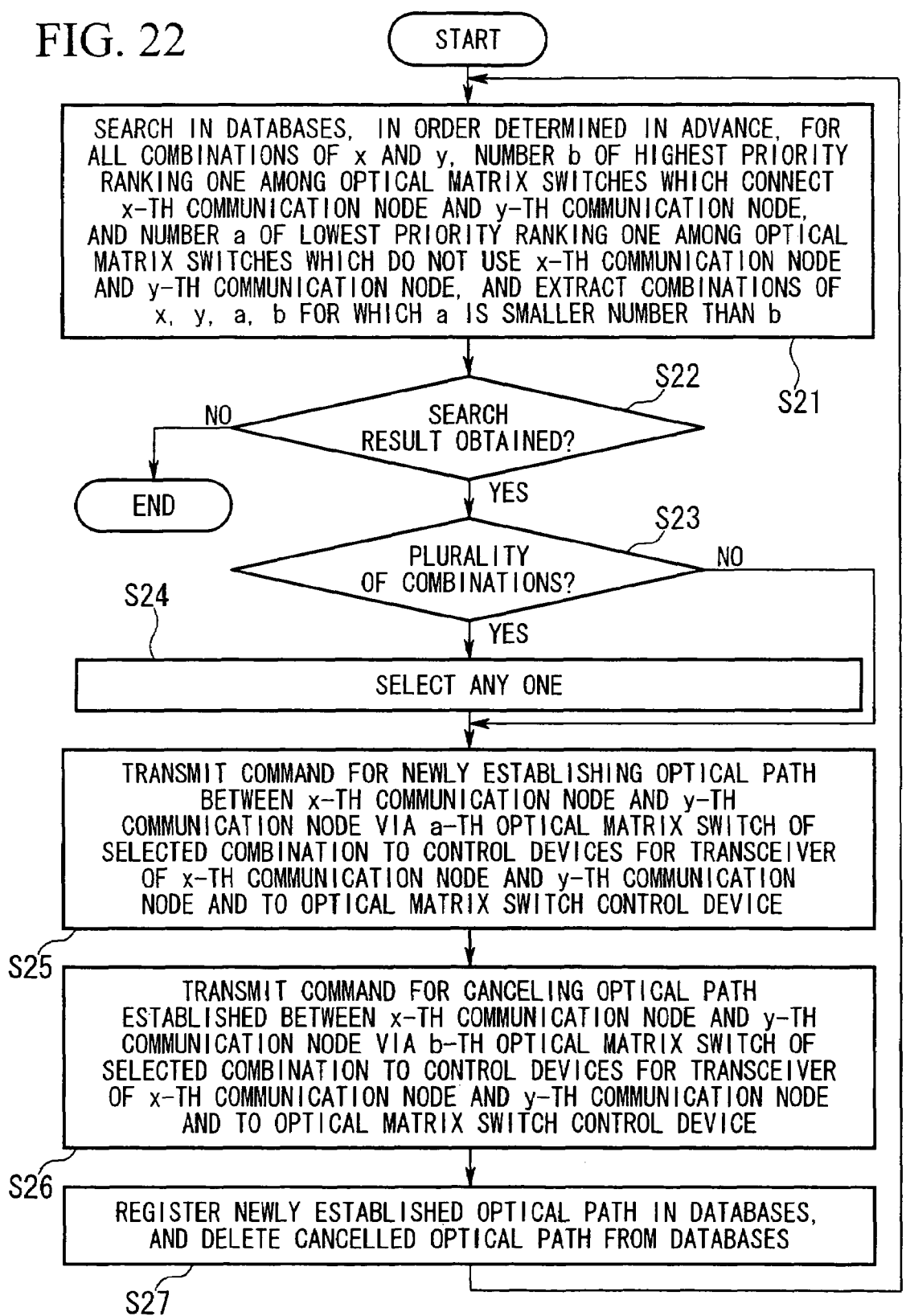
FIG. 22 is a flowchart of the processing of the optical path management device of the fifth embodiment according to the present invention.

The flow of the processing of the optical path management device when changing over an optical path between the optical matrix switches as described above is shown in FIG. 22.

The optical path management device 13 searches, in an order which is determined in advance for all the combinations of x and y, the number b of the one of the highest priority ranking among the optical matrix switches which establish optical paths between the x-th communication node and the y-th communication node, and the number a of the one of the lowest priority ranking among the optical matrix switches which does not use the x-th communication node and the y-th communication node, and extracts the combinations of x, y, a, and b for which the number a is smaller than the number b (in the step S21). For example, in the state of the database shown in FIGS. 19A through 19D, it extracts (x, y, a, b)=(2, 5, 1, 2), (2, 8, 1, 3), and (1, 3, 2, 4).

Next, if the search result as now described is obtained (YES in the step S22), the optical path management device 13, if there is one combination which has thus been extracted (NO in the step S23), selects it, while, if there are several (YES in the step S23), selects any one thereof (in the step S24), and performs changing over of the optical path.

In other words, it transmits a command for newly establishing an optical path between the x-th communication node and the y-th communication node via the a-th optical matrix switch of the selected group to the control devices for transceiver 11 of the x-th communication node and of the y-th communication node and the optical matrix switch control device 12 via the communication circuit 14 (in the step S25). Subsequently, it transmits a command for canceling the optical path between the x-th communication node and the y-th communication node via the b-th optical matrix switch of the selected group to the control devices for transceiver 11 of the x-th communication node and of the y-th communication node and the optical matrix switch control device 12 via the communication circuit 14 (in the step S26). Next, it updates the database; in other words, along with registering the optical path which has newly been established in the database, it also deletes from the database the optical path which has been cancelled (in the step S27).

At this time, the reason for first establishing the optical path via the a-th optical matrix switch is in order not to interrupt the optical path between the communication node x and the communication node y.

When the changing over of the optical path has ended, the combinations of (x, y, a, b) which meet the previously described conditions are again extracted, and changing over of the optical path is performed. This task is repeated until no combinations of (x, y, a, b) which meet the previously described conditions come to be extracted.

It should be understood that, a state in which the optical paths are not arranged will not be generated only by establishing a new optical path with the above-described method. However, it is desirable to perform changing over of the optical paths between the optical matrix switches after cancellation of an already existing optical path, since there is a possibility of causing a state in which the optical paths are not arranged after cancellation of an already existing optical path.

If the management of the optical paths between the communication nodes is performed by doing the above, the optical paths between the communication nodes come to be always in an arranged state, and it is possible to enhance the efficiency of use of the optical cross connect devices.

It should be understood that the management method for the optical paths between the communication nodes need not absolutely necessarily be according to this embodiment; it will be sufficient for it to be able to implement the same functions, and such a type of method is also included within the scope of the present invention.

The Sixth Embodiment

Figure 23:
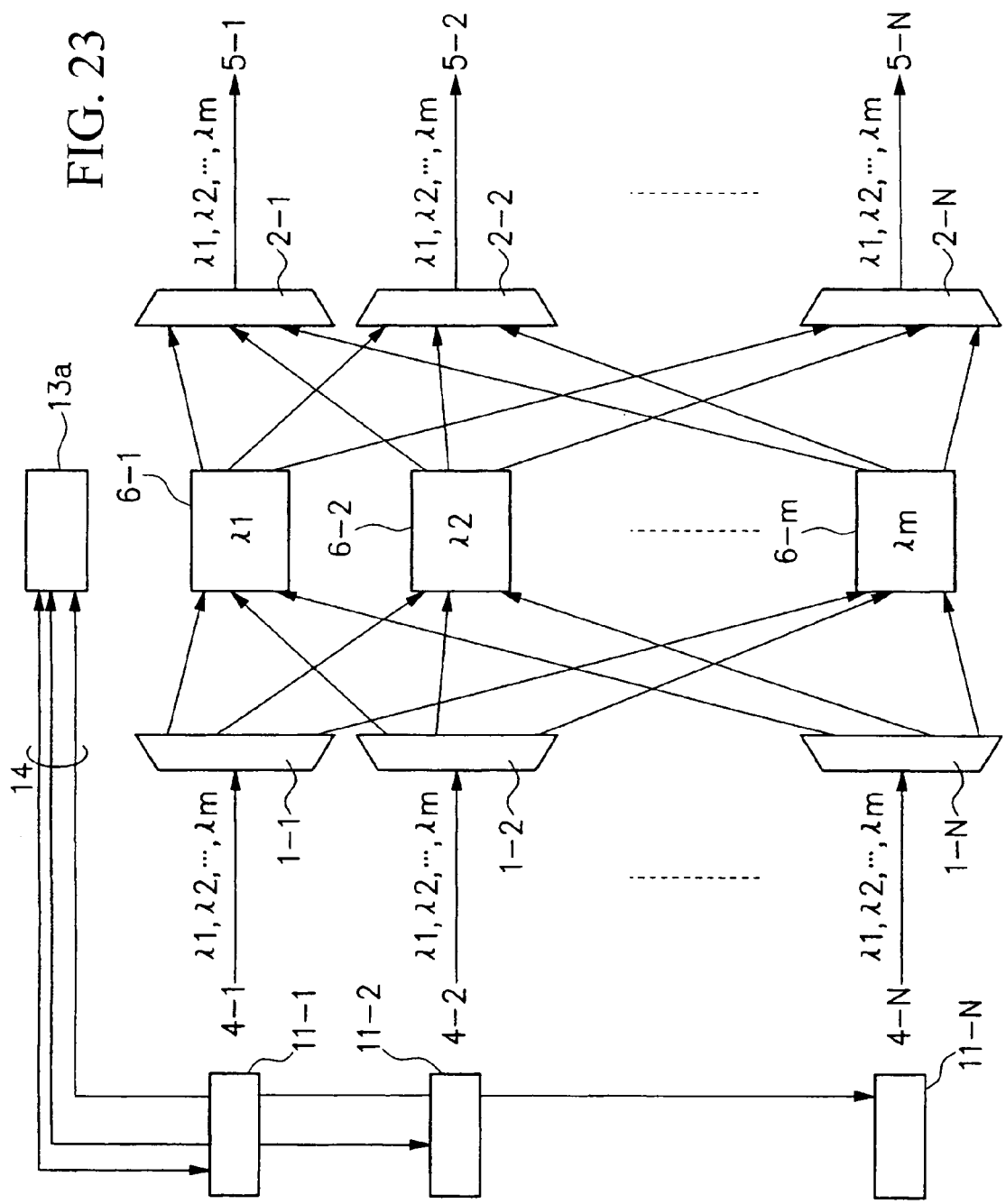
FIG. 23 is a structural diagram showing the sixth embodiment according to the present invention.

FIG. 23 is a figure showing the sixth embodiment according to the present invention, and this figure shows an example in which, in the fifth embodiment, along with utilizing the passive optical matrix switch, the optical matrix switch control device is omitted.

In detail, in this figure, 6-1, 6-2, . . . 6-m are passive optical matrix switches, in which an optical signal which has been inputted from a certain input port is outputted from a different output port, according to the physical nature of this optical signal. As an example, the case may be considered in which an N input N output arrayed-waveguide gratings are utilized for these optical matrix switches. At this time, if a wavelength division demultiplexing circuit 1 and a wavelength division multiplexing circuit 2 are supposed to handle signals over a sufficiently wide wavelength band $\Delta\lambda$ as signals of the same wavelength, the wavelengths of the optical signals which are inputted to the arrayed-waveguide grating may be supposed to be different within the range of $\Delta\lambda$, and, due to the input-output characteristic of an arrayed-waveguide grating, an optical signal which has been inputted from a certain input port is outputted from a different output port according to the physical nature of the optical signal which is inputted, i.e. according to its wavelength. Accordingly, in this embodiment, an optical path management device, for example 13a, as a command for establishing or for canceling an optical path, only performs command to the control devices for transceiver 11-1 through 11-N of a wavelength of the optical signal to start or to stop transmission and reception by the transceivers of the communication nodes. It should be understood that the other structures and operations of this embodiment are the same as in the case of the fifth embodiment.

The Seventh Embodiment

Figure 24:
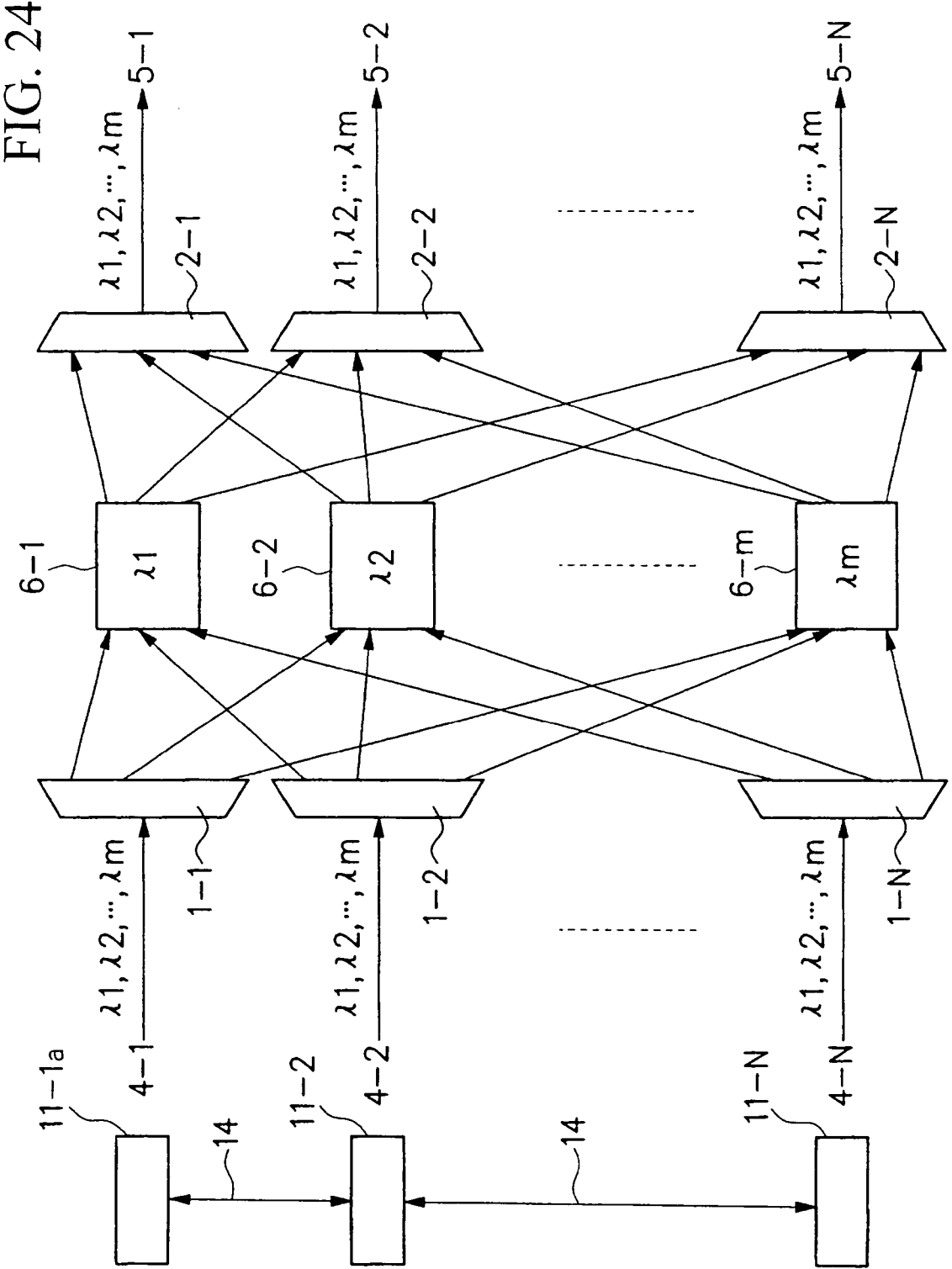
FIG. 24 is a structural diagram showing the seventh embodiment according to the present invention.
Figure 28:
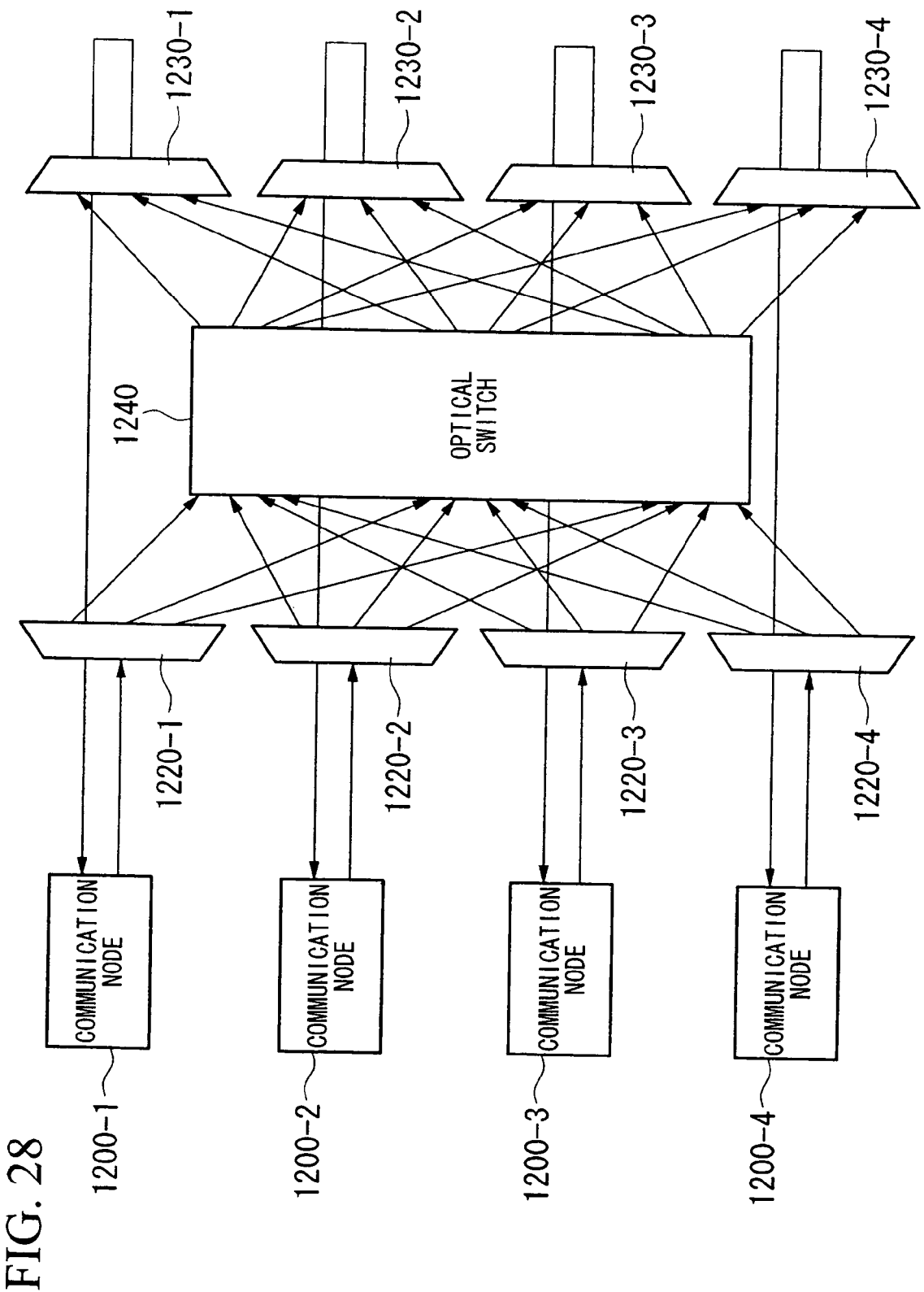
FIG. 28 is a block diagram showing a structural example of a conventional optical network system which takes advantage of a wavelength-band.
Figure 29:
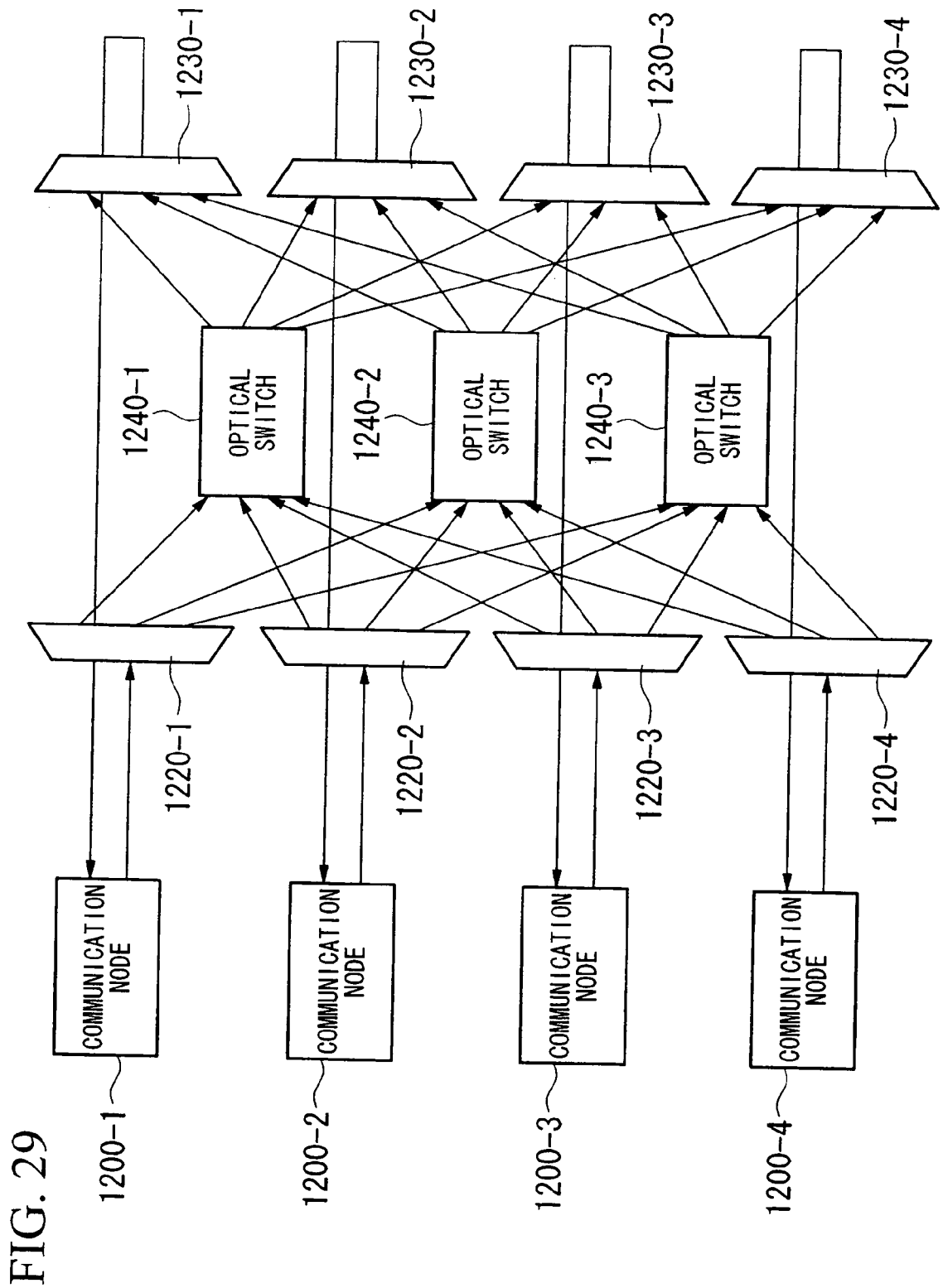
FIG. 29 is a block diagram showing another structural example of a conventional optical network system which takes advantage of a wavelength-band.
Figure 30:
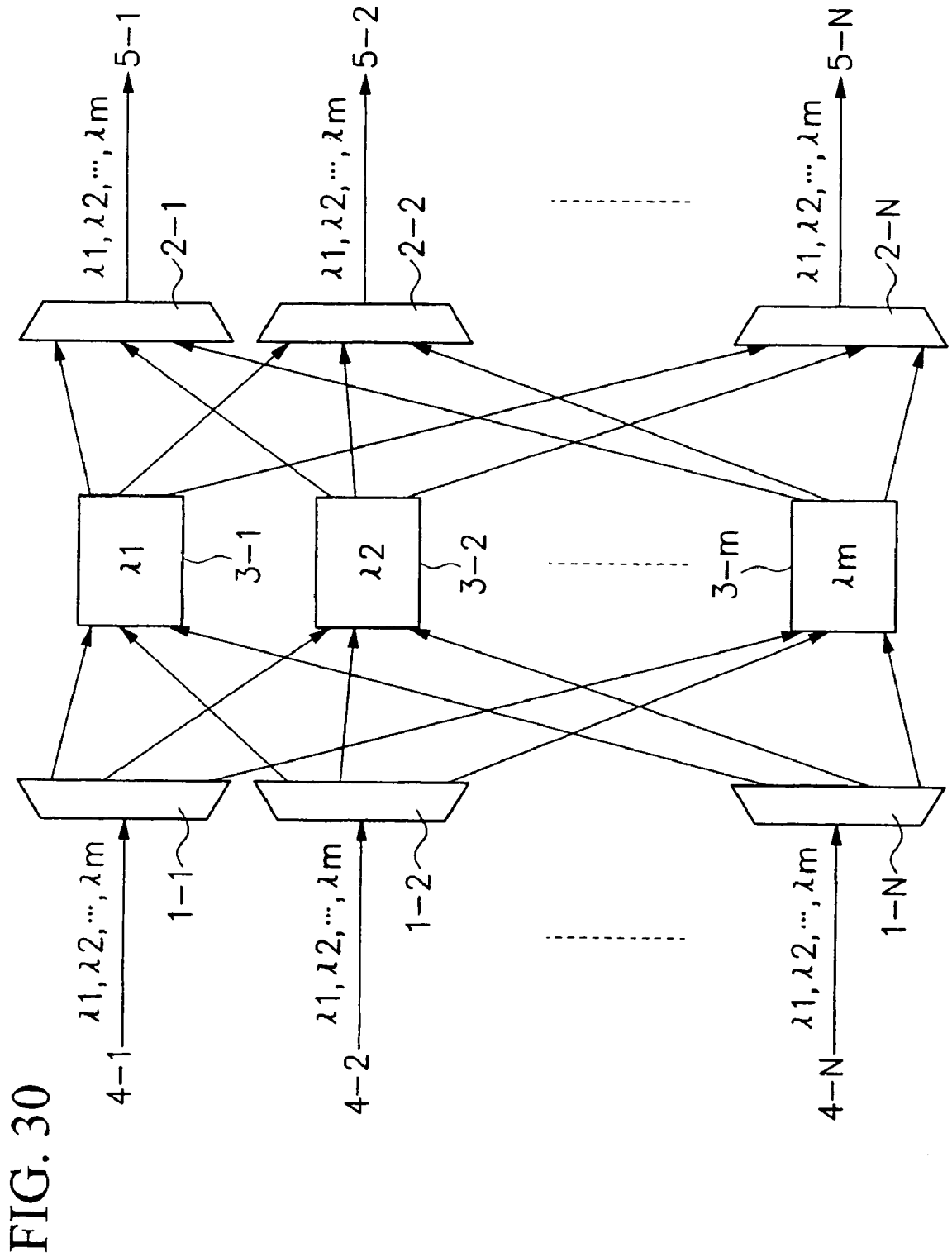
FIG. 30 is a structural diagram showing an example of a conventional optical cross connect device.
Figure 32D:
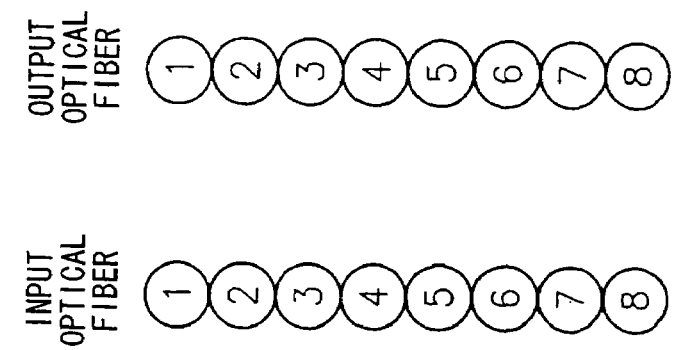
FIGS. 32A through 32D are explanatory figures showing an example of optical paths between input optical fibers and output optical fibers, when the optical paths are arranged.
Figure 32C:
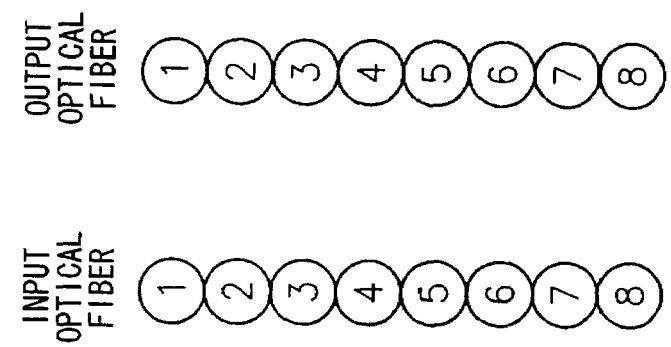
Figure 32B:
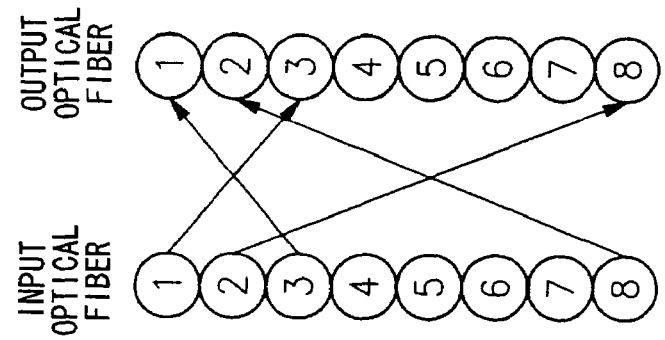
Figure 32A:
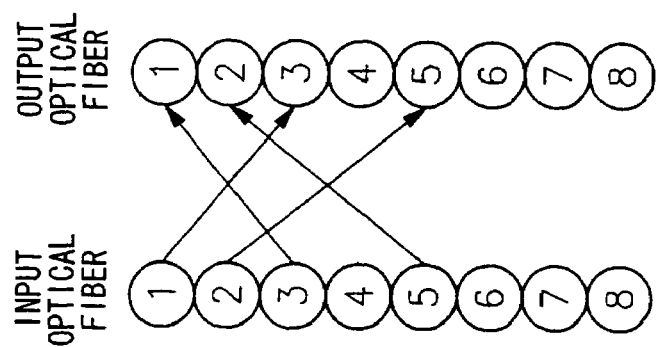

FIG. 24 is a figure showing the seventh embodiment according to the present invention; and, in this figure, there is shown an example in which, in the sixth embodiment, the function of an optical path management device is implemented by one among the N control devices for transceiver.

That is to say, in this figure, 11-1a is a control device for transceiver which implements the function of the optical path management device 13a which was explained with regard to the sixth embodiment, and this is connected via communication circuits 14 with the other control devices for transceiver 11-2 through 11-N and sends and receives information thereby, and performs management of the optical path in the same manner as in the case of the sixth embodiment. It should be understood that the other structure and operations of this embodiment are the same as in the case of the fifth and the sixth embodiments.

It should be understood that it would also be acceptable to record a program for implementing the wavelength control and management of optical paths which has been explained above for the fourth through the seventh embodiments upon a recording medium which is capable of being read by a computer, and to arrange for the program which is written upon this recording medium to be read and executed by a computer system.

Here, the computer system includes an operating system and hardware such as peripheral devices and the like. Furthermore, if the WWW system is taken advantage of, the computer system also includes a home page presentation environment (or a home page display environment).

Yet further, a recording medium which can be read by a computer includes a transportable medium such as a flexible disk, an opto-magnetic disk, a ROM, a CD-ROM or the like, or a storage device which is housed within a computer system such as a hard disk or the like. Even further, the recording medium which can be read by a computer includes a medium upon which the program is stored for a certain time period, such as a volatile memory (RAM) internal to a computer system which constitutes a server or a client, when the program has been transmitted via a network such as the internet or the like, or via a communication circuit such as a telephone circuit or the like.

Moreover, the above-described program may acceptably be transmitted from a computer system in which this program is stored upon a storage device or the like to another computer system via a transmission medium or via a transmission wave through a transmission medium. Here, a transmission medium which transmits the program includes a medium which is provided with the function of transmitting information, such as a network (a communication network) such as the internet or the like, or a communication circuit (a communication line) such as a telephone circuit or the like. Yet further, the above-described program may acceptably be one for implementing a portion of the above-described functions. Even further, it would be acceptable for it to be a so-called differential file (differential program) which is able to implement the above-described functions in combination with a program which is already recorded upon the computer system.

INDUSTRIAL APPLICABILITY

According to the present invention, in an optical communication network system which takes advantage of a plurality of communication nodes and wavelength-routing to establish communication between these communication nodes by route control according to the wavelength of an optical signal, an arrayed-waveguide grating is provided independently for each wavelength band in a wavelength-routing device, and wavelength-band multiplexing of the wavelength bands and wavelength-band demultiplexing of the wavelength bands are performed in the communication nodes and in the wavelength-routing device. Accordingly, it is possible to form one optical path between the communication nodes for each wavelength band. As a result, although with the conventional technique in which only one optical path is established between communication nodes there is a difficulty in establishing a plurality of optical paths between the communication nodes, by applying the structure of the present invention, it is possible to form, at a maximum, the same number of optical paths between the communication nodes as the number of wavelength bands, so that it is possible to easily increase the transmission capacity between the communication nodes. Furthermore, with the optical communication network system of the present invention, when increasing the number of optical paths, it will be sufficient to add the required equipment only between the communication nodes for which this increase of the number of optical paths is required, so that the extremely excellent and beneficial effect is obtained that the flexibility and the economy are both superb. Yet further, with a conventional optical communication system in which the optical paths are formed between the communication nodes for each wavelength-band, when the number of communication nodes exceeds the number of the wavelength-bands, it is necessary to pass via a different communication node. In contrast, according to the present invention, it is possible to implement an optical communication network system which provides full mesh connectivity in which optical paths between all the communication nodes are provided. Accordingly, even if the number of communication nodes exceeds the number of the wavelength-bands, it is not necessary to pass via a different communication node. Furthermore, according to the present invention, in an optical cross connect device which is formed by a combination of a plurality of small scale optical matrix switches, the optical paths between the communication nodes are always arranged, so that it is possible to enhance the efficiency of utilization of the optical cross connect device.

The invention claimed is:

1. An optical communication network system comprising:
a plurality of communication nodes;
a wavelength-routing device which establishes communication between the communication nodes based upon route control according to the wavelength of an optical signal; and
an optical transmission line which forms a communication path which connects the communication nodes and the wavelength-routing device,
wherein the wavelength-routing device comprises:
N device input ports, where N being an integer greater than or equal to 2, which are connected via the optical transmission line to the communication nodes;
N device output ports which are connected via the optical transmission line to the communication nodes;
a plurality of wavelength-band demultiplexers which are provided to each of the N device input ports, and each has a single input port and a plurality of output ports, and the input port is connected to one of the device input ports;
a plurality of wavelength-band multiplexers which are provided to each of the N device output ports, and each has a plurality of input ports and a single output port, and the output port is connected to one of the device output ports; and
R K×K arrayed-waveguide gratings, where R being an integer greater than or equal to J and J being an integer greater than or equal to 2, which have K input ports and K output ports, where K being an integer that satisfies K=N, which have wavelength-routing characteristics in which optical signals having different wavelengths which are inputted to one input port are output at different output ports depending on the wavelengths of the inputted optical signals and in which optical signals having different wavelengths which are outputted from one output port are optical signals which have been inputted to different input ports, and
wherein the wavelength-band demultiplexers comprise a means which demultiplexes by wavelength band a wavelength division multiplexed signal in which a respective predetermined number of wavelengths have been wavelength division multiplexed for each wavelength band which is transmitted from the communication nodes, where wavelength band=central wavelength $\lambda B_m \pm$ wavelength band width $\Delta\lambda_m$, with $\lambda B_m + \Delta\lambda_m = \lambda B_{m+1} - \Delta\lambda_{m+1}$, where $1 = m = R-1$, with m being an integer, and outputs the results at different output ports,
the wavelength-band multiplexers comprise a means which multiplexes optical signals which have been inputted from the plurality of input ports for each wavelength band and which outputs a wavelength division multiplexed signal in which a predetermined number of wavelengths have been wavelength division multiplexed at the output port,
K×K arrayed-waveguide gratings are provided with a wavelength-routing characteristic for each wavelength band of central wavelength $\lambda B_1 \pm$ wavelength band width $\Delta\lambda_1$, central wavelength $\lambda B_2 \pm$ wavelength band width $\Delta\lambda_2$ ($\lambda B_1 + \Delta\lambda_1 < \lambda B_2 - \Delta\lambda_2$), central wavelength $\lambda B_3 \pm$ wavelength band width $\Delta\lambda_3$ ($\lambda B_2 + \Delta\lambda_2 < \lambda B_3 - \Delta\lambda_3$), . . . , central wavelength $\lambda B_R \pm$ wavelength band width $\Delta\lambda_R$ ($\lambda B_{R-1} + \Delta\lambda_{R-1} < \lambda B_R - \Delta\lambda_R$), the output ports of the wavelength-band demultiplexers which are respectively connected to the N device input ports are one to one connected to the input ports of the K×K arrayed-waveguide gratings which have wavelength-routing characteristics at the wavelength bands of the optical signals which are outputted from the output ports of the wavelength-band demultiplexers, and the output ports of the K×K arrayed-waveguide gratings are one to one connected to the input ports of any one of the plurality of wavelength-band multiplexers which can multiplex optical signals of wavelengths which belong to the wavelength bands of the optical signals which are outputted from the output ports of the K×K arrayed-waveguide gratings.

2. An optical communication network system as described in claim 1, wherein each of the communication nodes comprises:

a J×1 wavelength-band multiplexer, where J being an integer greater than or equal to 2, which has J input ports IP [1], IP [2], IP [3], ... IP [J] and a single output port, and output at the single output port optical signals of wavelengths which belong to the wavelength bands of central wavelength $\lambda B_1 \pm$ wavelength band width $\Delta\lambda_1$, central wavelength $\lambda B_2 \pm$ wavelength band width $\alpha\lambda_2$, central wavelength $\lambda B_3 \pm$ wavelength band width $\Delta\lambda_3$, ..., central wavelength $\lambda B_J \pm$ wavelength band width $\Delta\lambda_J$, which are inputted to the respective J input ports, where $\lambda B_m + \Delta\lambda_m = \lambda B_{m+1} - \Delta\lambda_{m+1}$, for $1 = m = j-1$, where m being an integer;

a plurality of wavelength division multiplexers which are provided at each of the input ports IP [1], IP [2], IP [3], ... IP [J] of the J×1 wavelength-band multiplexer, and which have two or more input ports and one output port, with the output ports being connected to the input ports of the J×1 wavelength-band multiplexer; and a plurality of optical transmitters which are connected to the input ports of the wavelength division multiplexers, and which emit light of wavelengths which belong to wavelength bands of central wavelengths, $\lambda B_m \pm$ wavelength band width $\Delta\lambda m$, and wherein the output port of the J×1 wavelength-band multiplexer is connected via an optical waveguide to the device input ports of the wavelength-routing device.

3. An optical communication network system as described in claim 1 or claim 2, wherein each of the communication nodes comprises:

a 1×J wavelength-band demultiplexer, where J being an integer greater than or equal to 2, which has J output ports OP[1], OP[2], OP[3], ... OP[J] and a single input port, and which outputs at the J output ports optical signals of wavelengths which belong to the wavelength band widths which are inputted to the single input port of central wavelength $\lambda B_1 \pm$ wavelength band width $\Delta\lambda_1$, central wavelength $\lambda B_2 \pm$ wavelength band width $\Delta\lambda_2$, central wavelength $\lambda B_3 \pm$ wavelength band width $\Delta\lambda_3$, ..., central wavelength $\lambda B_J \pm$ wavelength band width $\Delta\lambda_J$, where $\lambda B_m + \Delta\lambda_m = \lambda B_{m+1} - \Delta\lambda_{m+1}$, where m being an integer;

a plurality of wavelength division demultiplexers which are provided to each of the output ports OP[1], OP[2], OP[3], ... OP[J] of the 1×J wavelength-band demultiplexer, each of which has two or more output ports and a single input port, and the input port is connected to one of the output ports of the 1×J wavelength-band demultiplexer; and a plurality of optical receivers which are connected to the output ports of the wavelength division demultiplexers, and wherein the single input port of the 1×J wavelength-band demultiplexer is connected via an optical waveguide to one of the device output ports of the wavelength-routing device.

4. An optical communication network system as described in claim 1, wherein each of the communication nodes comprises:

a J×1 wavelength-band multiplexer, where J being an integer greater than or equal to 2, which has J input ports IP [1], IP [2], IP [3], ... IP [J] and a single output port, and outputs at the single output port optical signals of wavelengths which belong to the wavelength bands of central wavelength $\lambda B_1 \pm$ wavelength band width $\Delta\lambda_1$, central wavelength $\lambda B_2 \pm$ wavelength band width $\Delta\lambda_2$, central wavelength $\lambda B_3 \pm$ wavelength band width $\Delta\lambda_3$, ..., central wavelength $\lambda B_J \pm$ wavelength band width $\Delta\lambda_J$, which are inputted to each of the J input ports, where $\lambda B_m + \Delta\lambda_m = \lambda B_{m+1} - \Delta\lambda_{m+1}$, for $1 = m = J-1$, where m being an integer;

at least one wavelength-tunable optical light source integrated optical transmitter which is connected to any one of the input ports IP [1], IP [2], IP [3], ... IP [J] of the J×1 wavelength-band multiplexer, which is provided with a wavelength-tunable optical light source which can be set to a wavelength within a wavelength band which belongs to the input port which is connected, and which outputs light of the wavelength;

a plurality of wavelength division multiplexers which are provided to each of the input ports of the J×1 wavelength-band multiplexer, other than the input port to which the wavelength-tunable optical light source integrated optical transmitter is connected, and which have two or more input ports and one output port, with the output port being connected to one of the input ports of the J×1 wavelength-band multiplexer;

a plurality of optical transmitters which are connected to the input ports of the wavelength division multiplexer, and which emit light of wavelength which belongs to a wavelength band of central wavelength $\lambda Bm \pm$ wavelength band width $\Delta\lambda m$;

a 1×J wavelength-band demultiplexer, where J being an integer greater than or equal to 2, which has J output ports OP[1], OP[2], OP[3], ... OP[J] and a single input port, and the outputs at the J output ports optical signals of wavelengths which belong to the wavelength band widths of central wavelength $\lambda B_1 \pm$ wavelength band width $\Delta\lambda_1$, central wavelength $\lambda B_2 \pm$ wavelength band width $\Delta\lambda_2$, central wavelength $\lambda B_3 \pm$ wavelength band width $\Delta\lambda_3$, ..., central wavelength $\lambda B_J \pm$ wavelength band width $\Delta\lambda_J$, which are inputted to the single input port, where $\lambda B_m + \Delta\lambda_m = \lambda B_{m+1} - \Delta\lambda_{m+1}$, for $1 = m = J$, where m being an integer;

an optical receiver which is connected to that output port, among the output ports OP[1], OP[2], OP[3], ... OP[J] of the 1×J wavelength-band demultiplexer, which belongs to the wavelength band to which the wavelength-tunable optical light source integrated optical transmitter is provided, and which receives an optical signal of the wavelength which is outputted from the wavelength-tunable optical light source integrated optical transmitter;

a plurality of wavelength division demultiplexers which are provided to each of the output ports of the 1×J wavelength-band demultiplexer, except for the output port to which the optical receiver is connected, which have two or more output ports and a single input port, and the input port is connected to one of the output ports of the 1×J wavelength-band demultiplexer; and a plurality of optical receivers which are connected to the output ports of the wavelength division demultiplexers, and wherein the single input port of the 1×J wavelength-band demultiplexer is connected via an optical waveguide to one of the device output ports of the wavelength-routing device.

5. An optical communication network system as described in claim 4, further comprising an optical path management means which controls an optical path between two different communication nodes, and wherein if at least one group of the wavelength-tunable optical light source integrated optical transmitters exists which are provided to all the communication nodes and which output optical signals of the same wavelength band, and if there are K wavelength bands, where K being an integer greater than or equal to 2, which belong to the input ports of the J×1 wavelength-band multiplexer which are connected to the wavelength-tunable optical light source integrated optical transmitters, the optical path management means assigns mutually different priority rankings from 1 to K to the wavelength bands which belong to the input ports of the J×1 wavelength-band multiplexer which are connected to the wavelength-tunable optical light source integrated optical transmitters, and when, among the wavelength bands which belong to the input ports of the J×1 wavelength-band multiplexer which are connected to the wavelength-tunable optical light source integrated optical transmitters, the highest numbered priority ranking among the wavelength bands for which optical paths exist between x-th communication node and y-th communication node is number b, and the lowest numbered priority ranking among the wavelength bands for which an optical path whose start point is the x-th communication node, an optical path whose end point is the x-th communication node, an optical path whose start point is the y-th communication node, and an optical path whose end point is the y-th communication node do not exist is number a, and the number a is smaller than the number b, the optical path management means establishes an optical path between the x-th communication node and the y-th communication node upon the wavelength band of a-th priority ranking, and thereafter controls ON/OFF and an oscillation wavelength of the wavelength-tunable optical light source integrated optical transmitter so as to cancel the optical path which was established between the x-th communication node and the y-th communication node upon the wavelength band of b-th priority ranking.

6. An optical communication network system as described in claim 5, further comprising:

a database which records an optical path for each wavelength band;

a first search means which, when a requirement has arisen newly to establish an optical path between xx-th communication node and yy-th communication node, searches in the database, in order from data which correspond to a wavelength band whose priority ranking is the lowest, for a wavelength band which is not in use by the xx-th communication node and the yy-th communication node;

a first transmission means which transmits to the optical path management means a command for establishing an optical path according to the result of searching by the first search means;

a second search means which, when a requirement for an optical path which is already established between xxx-th communication node and yyy-th communication node has ceased, searches in the database, in order from data which correspond to a wavelength band whose priority ranking is the highest, for a wavelength band upon which an optical path is established between the xxx-th communication node and the yyy-th communication node;

a second transmission means which transmits to the optical path management means a command for canceling an optical path according to the result of searching by the second search means;

an extraction means which searches in the database the number b of the highest priority ranking among the wavelength bands upon which optical paths are established between the x-th communication node and the y-th communication node, and the number a of the lowest priority ranking among the wavelength bands upon which an optical path whose start point is the x-th communication node, an optical path whose end point is the x-th communication node, an optical path whose start point is the y-th communication node, and an optical path whose end point is the y-th communication node do not exist, for all the combinations of x and y in a predetermined order, and extracts combinations of x, y, a, and b for which the number a is smaller than the number b;

a third transmission means which, when an applicable combination exists, transmits to the optical path management means a command for establishing an optical path using the a-th wavelength band between the x-th communication node and the y-th communication node, and thereafter transmits to the optical path management means a command for canceling an optical path using the b-th wavelength band between the x-th communication node and the y-th communication node; and a database update means which registers an optical path which has been newly established in the database, and deletes an optical path which has been cancelled from the database.

7. An optical communication network system as described in claim 1, wherein the K×K arrayed-waveguide gratings have cyclic-wavelength characteristics.

8. A wavelength-routing device which is provided to an optical communication network system comprising a plurality of communication nodes and an optical transmission line which forms a communication path, connected with the communication nodes by the optical transmission line, and which establishes communication between the communication nodes based upon route control according to the wavelength of an optical signal, the wavelength-routing device comprising:

N device input ports, where N being an integer greater than or equal to 2, which are connected via the optical transmission line to the communication nodes;

N device output ports which are connected via the optical transmission line to the communication nodes;

a plurality of wavelength-band demultiplexers which are provided to each of the N device input ports, and each has a single input port and a plurality of output ports, and the input port is connected to one of the device input ports;

a plurality of wavelength-band multiplexers which are provided to each of the N device output ports, and each has a plurality of input ports and a single output port, and the output port is connected to one of the device output ports; and R K×K arrayed-waveguide gratings, where R being an integer greater than or equal to J and J being an integer greater than or equal to 2, which have K input ports and K output ports, where K being an integer that satisfies K=N, which have wavelength-routing characteristics in which optical signals having different wavelengths which are inputted to one input port are output at different output ports depending on the wavelengths of the inputted optical signals and in which optical signals having different wavelengths which are outputted from one output port are optical signals which have been inputted to different input ports, and wherein the wavelength-band demultiplexers comprise a means which demultiplexes by wavelength band a wavelength division multiplexed signal in which a predetermined number of wavelengths have been wavelength division multiplexed for each wavelength band which is transmitted from the communication nodes, where wavelength band=central wavelength $\lambda B_m \pm$ wavelength band width $\Delta\lambda_m$ with $\lambda B_m + \Delta\lambda_m = \lambda B_{m+1} - \Delta\lambda_{m+1}$, where $1 \leq m \leq R-1$, with m being an integer, and outputs the results at different output ports, the wavelength-band multiplexers comprise a means which multiplexes optical signals which have been inputted from the plurality of input ports for each wavelength band and which outputs a wavelength division multiplexed signal in which a predetermined number of wavelengths have been wavelength division multiplexed at the output port, the K×K arrayed-waveguide gratings are provided with a wavelength-routing characteristic for each wavelength band of central wavelength $\lambda B_1 \pm$ wavelength band width $\Delta\lambda_1$, central wavelength $\lambda B_2 \pm$ wavelength band width $\Delta\lambda_2$ ($\lambda B_1 + \Delta\lambda_1 < \lambda B_2 - \Delta\lambda_2$), central wavelength $\lambda B_3 \pm$ wavelength band width $\Delta\lambda_3$ ($\lambda B_2 + \Delta\lambda_2 < \lambda B_3 - \Delta\lambda_3$), . . . , central wavelength $\lambda B_R \pm$ wavelength band width $\Delta\lambda_R$ ($\lambda B_{R-1} + \Delta\lambda_{R-1} < \lambda B_R - \Delta\lambda_R$), the output ports of the wavelength-band demultiplexers which are respectively connected to the N device input ports are one to one connected to the input ports of the K×K arrayed-waveguide gratings which have wavelength-routing characteristics at the wavelength bands of the optical signals which are outputted from the output ports of the wavelength-band demultiplexers, and the output ports of the K×K arrayed-waveguide gratings are one to one connected to the input ports of any one of the plurality of wavelength-band multiplexers which can multiplex optical signals of wavelengths which belong to the wavelength bands of the optical signals which are outputted from the output ports of the K×K arrayed-waveguide gratings.

9. An optical path management device which controls an optical path between two different communication nodes in an optical communication network system which comprises a plurality of communication nodes, a wavelength-routing device which establishes communication between the communication nodes based upon route control according to the wavelength of an optical signal, and an optical transmission line which forms a communication path which connects the communication nodes and the wavelength-routing device wherein the wavelength-routing device comprises:

N device input ports, where N being an integer greater than or equal to 2, which are connected via the optical transmission line to the communication nodes;

N device output ports which are connected via the optical transmission line to the communication nodes;

a plurality of wavelength-band demultiplexers which are provided to each of the N device input ports, and each has a single input port and a plurality of output ports, and the input port is connected to one of the device input ports;

a plurality of wavelength-band multiplexers which are provided to each of the N device output ports, and each has a plurality of input ports and a single output port, and the output port is connected to one of the device output ports; and R K×K arrayed-waveguide gratings, where R being an integer greater than or equal to J and J being an integer greater than or equal to 2, which have K input ports and K output ports, where K being an integer that satisfies K=N, which have wavelength-routing characteristics in which optical signals having different wavelengths which are inputted to one input port are output at different output ports depending on the wavelengths of the inputted optical signals and in which optical signals having different wavelengths which are outputted from one output port are optical signals which have been inputted to different input ports, and wherein the wavelength-band demultiplexers comprise a means which demultiplexes by wavelength band a wavelength division multiplexed signal in which a predetermined number of wavelengths have been wavelength division multiplexed for each wavelength band which is transmitted from the communication nodes, wherein wavelength band=central wavelength $\lambda B_m \pm$ wavelength band width $\Delta\lambda_m$, with $\lambda B_m + \Delta\lambda_m = \lambda B_{m+1} - \Delta\lambda_{m+1}$, where $1 \leq m \leq R-1$, with m being an integer, and outputs the results at different output ports, the wavelength-band multiplexers comprise a means which multiplexes optical signals which have been inputted from the plurality of input ports for each wavelength band and which outputs a wavelength division multiplexed signal in which a predetermined number of wavelengths have been wavelength division multiplexed at the output port, the K×K arrayed-waveguide gratings are provided with a wavelength-routing characteristic for each wavelength band of central wavelength $\lambda B_1 \pm$ wavelength band width $\Delta\lambda_1$, central wavelength $\lambda B_2 \pm$ wavelength band width $\Delta\lambda_2$ ($\lambda B_1 + \Delta\lambda_1 < \lambda B_2 - \Delta\lambda_2$), central wavelength $\lambda B_3 \pm$ wavelength band width $\Delta\lambda_3$ ($\lambda B_2 + \Delta\lambda_2 < \lambda B_3 - \Delta\lambda_3$), . . . , central wavelength $\lambda B_R \pm$ wavelength band width $\Delta\lambda_R$ ($\lambda B_{R-1} + \Delta\lambda_{R-1} < \lambda B_R - \Delta\lambda_R$), the output ports of the wavelength-band demultiplexers which are respectively connected to the N device input ports are one to one connected to the input ports of the K×K arrayed-waveguide gratings which have wavelength-routing characteristics at the wavelength bands of the optical signals which are outputted from the output ports of the wavelength-band demultiplexers, and the output ports of the K×K arrayed-waveguide gratings are one to one connected to the input ports of any one of the plurality of wavelength-band multiplexers which can multiplex optical signals of wavelengths which belong to the wavelength bands of the optical signals which are outputted from the output ports of the K×K arrayed-waveguide gratings, and each of the communication nodes comprises:

a J×1 wavelength-band multiplexer, where J being an integer greater than or equal to 2, which has J input ports IP [1], IP [2], IP [3], . . . IP [J] and a single output port, and outputs at the single output port optical signals of wavelengths which belong to the wavelength bands of central wavelength $\lambda B_1 \pm$ wavelength band width $\Delta \lambda_1$, central wavelength $\lambda B_2 \pm$ wavelength band width $\Delta \lambda_2$, central wavelength $\lambda B_3 \pm$ wavelength band width $\Delta \lambda_3$, . . . , central wavelength $\lambda B_J \pm$ wavelength band width $\Delta \lambda_J$, which are inputted to each of the J input ports, where $\lambda B_m + \Delta \lambda_m = \lambda B_{m+1} - \Delta \lambda_{m+1}$, for $1 = m = J-1$, where m being an integer;

at least one wavelength-tunable optical light source integrated optical transmitter which is connected to any one of the input ports IP [1], IP [2], IP [3], . . . IP [J] of the J×1 wavelength-band multiplexer, which is provided with a wavelength-tunable optical light source which can be set to a wavelength within a wavelength band which belongs to the input port which is connected, and which outputs light of the wavelength;

a plurality of wavelength division multiplexers which are provided to each of the input ports of the J×1 wavelength-band multiplexer, other than the input port to which the wavelength-tunable optical light source integrated optical transmitter is connected, and which have two or more input ports and one output port, with the output port being connected to one of the input ports of the J×1 wavelength-band multiplexer;

a plurality of optical transmitters which are connected to the input ports of the wavelength division multiplexer, and which emit light of wavelength which belongs to a wavelength band of central wavelength $\lambda Bm \pm$ wavelength band width $\Delta \lambda m$;

a 1×J wavelength-band demultiplexer, where J being an integer greater than or equal to 2, which has J output ports OP[1], OP[2], OP[3], . . . OP[J] and a single input port, and outputs at the J output ports optical signals of wavelengths which belong to the wavelength band widths of central wavelength $\lambda B_1 \pm$ wavelength band width $\Delta \lambda_1$, central wavelength $\lambda B_2 \pm$ wavelength band width $\Delta \lambda_2$, central wavelength $\lambda B_3 \pm$ wavelength band width $\Delta \lambda_3$, . . . , central wavelength $\lambda B_J \pm$ wavelength band width $\alpha \lambda_J$, which are inputted to the single input port, where $\lambda B_m + \Delta \lambda_m = \lambda_{m+1} - \Delta \lambda_{m+1}$, for $1 = m = J$, where m being an integer;

an optical receiver which is connected to that output port, among the output ports OP[1], OP[2], OP[3], . . . OP[J] of the 1×J wavelength-band demultiplexer, which belongs to the wavelength band to which the wavelength-tunable optical light source integrated optical transmitter is provided, and which receives an optical signal of the wavelength which is outputted from the wavelength-tunable optical light source integrated optical transmitter;

a plurality of wavelength division demultiplexers which are provided to each of the output ports of the 1×J wavelength-band demultiplexer, except for the output port to which the optical receiver is connected, which have two or more output ports and a single input port, and the input port is connected to one of the output ports of the 1×J wavelength-band demultiplexer; and a plurality of optical receivers which are connected to the output ports of the wavelength division demultiplexers; and wherein the single input port of the 1×J wavelength-band demultiplexer is connected via an optical waveguide to one of the device output ports of the wavelength-routing device, and wherein the optical path management device comprises:

a means which, if at least one group of the wavelength-tunable optical light source integrated optical transmitters exists which are provided to all the communication nodes and which output optical signals of the same wavelength band, and if there are K wavelength bands, where K being an integer greater than or equal to 2, which belong to the input ports of the J×1 wavelength-band multiplexer which are connected to the wavelength-tunable optical light source integrated optical transmitters, assigns mutually different priority rankings from 1 to K to the wavelength bands which belong to the input ports of the J×1 wavelength-band multiplexer which are connected to the wavelength-tunable optical light source integrated optical transmitters;

a means which detects that, among the wavelength bands which belong to the input ports of the J×1 wavelength-band multiplexer which are connected to the wavelength-tunable optical light source integrated optical transmitters, the highest numbered priority ranking among the wavelength bands of optical paths between x-th communication node and y-th communication node is number b, and the lowest numbered priority ranking among the wavelength bands which are not used for an optical path whose start point is the x-th communication node, an optical path whose end point is the x-th communication node, an optical path whose start point is the y-th communication node, and an optical path whose end point is the y-th communication node is number a, and the number a is smaller than the number b; and a means which, if it has been detected that the number a is smaller than the number b, establishes an optical path between the x-th communication node and the y-th communication node upon the wavelength band of a-th priority ranking, and thereafter controls ON/OFF and an oscillation wavelength of the wavelength-tunable optical light source integrated optical transmitter so as to cancel the optical path which was established between the x-th communication node and the y-th communication node upon the wavelength band of b-th priority ranking.

10. An optical path management method which controls an optical path between two different communication nodes in an optical communication network system which comprises a plurality of communication nodes, a wavelength-routing device which establishes communication between the communication nodes based upon route control according to the wavelength of an optical signal, and an optical transmission line which forms a communication path which connects the communication nodes and the wavelength-routing device, wherein the wavelength-routing device comprises:

N device input ports, where N being an integer greater than or equal to 2, which are connected via the optical transmission line to the communication nodes;

N device output ports which are connected via the optical transmission line to the communication nodes;

a plurality of wavelength-band demultiplexers which are provided to each of the N device input ports, and each has a single input port and a plurality of output ports, and the input port is connected to one of the device input ports;

a plurality of wavelength-band multiplexers which are provided to each of the N device output ports, and each has a plurality of input ports and a single output port, and the output port is connected to one of the device output ports; and R K×K arrayed-waveguide gratings, where R being an integer greater than or equal to J and J being an integer greater than or equal to 2, which have K input ports and K output ports, where K being an integer that satisfies K=N, which have wavelength-routing characteristics in which optical signals having different wavelengths which are inputted to one input port are output at different output ports depending on the wavelengths of the inputted optical signals and in which optical signals having different wavelengths which are outputted from one output port are optical signals which have been inputted to different input ports, wherein the wavelength-band demultiplexers comprise a means which demultiplexes by wavelength band a wavelength division multiplexed optical signal in which a predetermined number of wavelengths have been wavelength division multiplexed for each wavelength band which is transmitted from the communication nodes, where wavelength band=central wavelength $\lambda B_m \pm$ wavelength band width $\Delta \lambda_m$, with $\lambda B_m + \Delta \lambda_m = \lambda B_{m+1} - \Delta \lambda_{m+1}$, where $1=m=R-1$, with m being an integer, and outputs the results at different output ports, the wavelength-band multiplexers comprise a means which multiplexes optical signals which have been inputted from the plurality of input ports for each wavelength band and which outputs a wavelength division multiplexed signal in which a predetermined number of wavelengths have been wavelength division multiplexed at the output port, the K×K arrayed-waveguide gratings are provided with a wavelength-routing characteristic for each wavelength band of central wavelength $\lambda B_1 \pm$ wavelength band width $\Delta \lambda_1$, central wavelength $\lambda B_2 \pm$ wavelength band width $\Delta \lambda_2$ ($\lambda B_1 + \Delta \lambda_1 < \lambda B_2 - \Delta \lambda_2$), central wavelength $\lambda B_3 \pm$ wavelength band width $\Delta \lambda_3$ ($\lambda B_2 + \Delta \lambda_2 < \lambda B_3 - \Delta \lambda_3$), . . . , central wavelength $\lambda B_R \pm$ wavelength band width $\Delta \lambda_R$ ($\lambda B_{R-1} + \Delta \lambda_{R-1} < \lambda B_R - \Delta \lambda_R$), the output ports of the wavelength-band demultiplexers which are respectively connected to the N device input ports are one to one connected to the input ports of the K×K arrayed-waveguide gratings which have wavelength-routing characteristics at the wavelength bands of the optical signals which are outputted from the output ports of the wavelength-band demultiplexers, and the output ports of the K×K arrayed-waveguide gratings are one to one connected to the input ports of any one of the plurality of wavelength-band multiplexers which can multiplex optical signals of wavelengths which belong to the wavelength bands of the optical signals which are outputted from the output ports of the K×K arrayed-waveguide gratings, and each of the communication nodes comprises:

a J×1 wavelength-band multiplexer, where J being an integer greater than or equal to 2, which has J input ports IP [1], IP [2], IP [3], . . . IP [J] and a single output port, and outputs at the single output port optical signals of wavelengths which belong to the wavelength bands of central wavelength $\lambda B_1 \pm$ wavelength band width $\Delta \lambda_1$, central wavelength $\lambda B_2 \pm$ wavelength band width $\Delta \lambda_2$, central wavelength $\lambda B_3 \pm$ wavelength band width $\Delta \lambda_3$, . . . , central wavelength $\lambda B_J \pm$ wavelength band width $\Delta \lambda_J$, which are inputted to each of the J input ports, where $\lambda B_m + \Delta \lambda_m = \lambda B_{m+1} - \Delta \lambda_{m+1}$, for $1=m=J-1$, where m being an integer;

at least one wavelength-tunable optical light source integrated optical transmitter which is connected to any one of the input ports IP [1], IP [2], IP [3], . . . IP [J] of the J×1 wavelength-band multiplexer, which is provided with a wavelength-tunable optical light source which can be set to a wavelength within a wavelength band which belongs to the input port which is connected, and which outputs light of the wavelength;

a plurality of wavelength division multiplexers which are provided to each of the input ports of the J×1 wavelength-band multiplexer, other than the input port to which the wavelength-tunable optical light source integrated optical transmitter is connected, and which have two or more input ports and one output port, with the output port being connected to one of the input ports of the J×1 wavelength-band multiplexer;

a plurality of optical transmitters which are connected to the input ports of the wavelength division multiplexer, and which emit light of wavelength which belongs to a wavelength band of central wavelength $\lambda B_m \pm$ wavelength band width $\Delta \lambda m$;

a 1×J wavelength-band demultiplexer, where J being an integer greater than or equal to 2, which has J output ports OP[1], OP[2], OP[3], . . . OP[J] and a single input port, and outputs at the J output ports optical signals of wavelengths which belong to the wavelength band widths of central wavelength $\lambda B_1 \pm$ wavelength band width $\Delta \lambda_1$, central wavelength $\lambda B_2 \pm$ wavelength band width $\Delta \lambda_2$, central wavelength $\lambda B_3 \pm$ wavelength band width $\Delta \lambda_3$, . . ., central wavelength $\lambda B_J \pm$ wavelength band width $\Delta \lambda_J$, which are inputted to the single input port, where $\lambda B_m + \Delta \lambda_m = \lambda B_{m+1} - \Delta \lambda_{m+1}$, for $1=m=J$, where m being an integer;

an optical receiver which is connected to that output port, among the output ports OP[1], OP[2], OP[3], . . . OP[J] of the 1×J wavelength-band demultiplexer, which belongs to the wavelength band to which the wavelength-tunable optical light source integrated optical transmitter is provided, and which receives an optical signal of the wavelength which is outputted from the wavelength-tunable optical light source integrated optical transmitter;

a plurality of wavelength division demultiplexers which are provided to each of the output ports of the 1×J wavelength-band demultiplexer, except for the output port to which the optical receiver is connected, which have two or more output ports and a single input port, and the input port is connected to one of the output ports of the 1×J wavelength-band demultiplexer; and a plurality of optical receivers which are connected to the output ports of the wavelength division demultiplexers, and wherein the single input port of the 1×J wavelength-band demultiplexer is connected via an optical waveguide to one of the device output ports of the wavelength-routing device, and the optical path management method comprises:

a step of, if at least one group of the wavelength-tunable optical light source integrated optical transmitters exists which are provided to all the communication nodes and which output optical signals of the same wavelength band, and if there are K wavelength bands, where K being an integer greater than or equal to 2, which belong to the input ports of the J×1 wavelength-band multiplexer which are connected to the wavelength-tunable optical light source integrated optical transmitters, assigning mutually different priority rankings from 1 to K to the wavelength bands which belong to the input ports of the J×1 wavelength-band multiplexer which are connected to the wavelength-tunable optical light source integrated optical transmitters;

a step of, when, among the wavelength bands which belong to the input ports of the J×1 wavelength-band multiplexer which are connected to the wavelength-tunable optical light source integrated optical transmitter, the highest numbered priority ranking among the wavelength bands for which an optical path exists between x-th communication node and y-th communication node is number b, and the lowest numbered priority ranking among the wavelength bands for which an optical path whose start point is the x-th communication node, an optical path whose end point is the x-th communication node, an optical path whose start point is the y-th communication node, and an optical path whose end point is the y-th communication node do not exist is number a, and the number a is smaller than the number b; and controlling ON/OFF and an oscillation wavelength of the wavelength-tunable optical light source integrated optical transmitter so as to establish an optical path between the x-th communication node and the y-th communication node upon the wavelength band of a-th priority ranking; and a step of establishing an optical path between the x-th communication node and the y-th communication node upon the wavelength band of the a-th priority ranking, and thereafter controlling ON/OFF and the oscillation wavelength of the wavelength-tunable optical light source integrated optical transmitter so as to cancel the optical path which was established between the x-th communication node and the y-th communication node upon the wavelength band of b-th priority ranking.

11. An optical path management program which causes a computer to execute the steps of the optical path management method as described in claim 10.

12. A recording medium which can be read by a computer, upon which the optical path management program as described in claim 11 is recorded.

* * * * *